(12) United States Patent
Greene et al.

(10) Patent No.: US 11,351,735 B2
(45) Date of Patent: Jun. 7, 2022

(54) SENSORS FOR THREE-DIMENSIONAL PRINTING SYSTEMS AND METHODS

(71) Applicant: HOLO, INC., Newark, CA (US)

(72) Inventors: Richard M. Greene, San Rafael, CA (US); Jonathan Pomeroy, Oakland, CA (US); Pierre Lin, San Francisco, CA (US); Carlo Quinonez, Oakland, CA (US)

(73) Assignee: Holo, Inc., Newark, CA (US)

( * ) Notice: Subject to any disclaimer, the term of this patent is extended or adjusted under 35 U.S.C. 154(b) by 0 days.

(21) Appl. No.: 17/355,394

(22) Filed: Jun. 23, 2021

(65) Prior Publication Data

US 2021/0387420 A1    Dec. 16, 2021

Related U.S. Application Data

(63) Continuation of application No. PCT/US2019/068413, filed on Dec. 23, 2019.

(60) Provisional application No. 62/785,104, filed on Dec. 26, 2018.

(51) Int. Cl.
| | |
|---|---|
| *B29C 64/393* | (2017.01) |
| *B33Y 10/00* | (2015.01) |
| *B33Y 30/00* | (2015.01) |
| *B33Y 50/02* | (2015.01) |
| *B29C 64/124* | (2017.01) |
| *B29K 505/00* | (2006.01) |
| *B29K 509/02* | (2006.01) |

(52) U.S. Cl.
CPC .......... *B29C 64/393* (2017.08); *B29C 64/124* (2017.08); *B33Y 10/00* (2014.12); *B33Y 30/00* (2014.12); *B33Y 50/02* (2014.12); *B29K 2505/00* (2013.01); *B29K 2509/02* (2013.01)

(58) Field of Classification Search
None
See application file for complete search history.

(56) References Cited

U.S. PATENT DOCUMENTS

| | | |
|---|---|---|
| 4,252,887 A | 2/1981 | Dessauer |
| 4,269,933 A | 5/1981 | Pazos |
| 4,801,477 A | 1/1989 | Fudim |

(Continued)

FOREIGN PATENT DOCUMENTS

| | | |
|---|---|---|
| CN | 1418974 A | 5/2003 |
| CN | 1916034 A | 2/2007 |

(Continued)

OTHER PUBLICATIONS

U.S. Appl. No. 16/202,039 Office action dated Nov. 1, 2021.

(Continued)

*Primary Examiner* — Monica A Huson
*Assistant Examiner* — Kelsey C Grace
(74) *Attorney, Agent, or Firm* — Wilson Sonsini Goodrich & Rosati

(57) ABSTRACT

The present disclosure provides methods and systems for printing a three-dimensional (3D) object. The methods may comprise providing, adjacent to a build surface, a film comprising a polymeric precursor. A sensor may be used to determine a profile of the film. The profile may be indicative of a quality of the film. If the profile meets a quality threshold, at least a portion of the film may be exposed to light to initiate formation of a polymeric material from the polymeric precursor, thereby printing at least a portion of the 3D object.

28 Claims, 11 Drawing Sheets

(56) References Cited

U.S. PATENT DOCUMENTS

| | | |
|---|---|---|
| 4,814,370 A | 3/1989 | Kramer et al. |
| 4,961,154 A | 10/1990 | Pomerantz et al. |
| 5,006,364 A | 4/1991 | Fan |
| 5,096,530 A | 3/1992 | Cohen |
| 5,137,662 A | 8/1992 | Hull et al. |
| 5,143,668 A | 9/1992 | Hida et al. |
| 5,182,056 A | 1/1993 | Spence et al. |
| 5,184,307 A | 2/1993 | Hull et al. |
| 5,236,326 A | 8/1993 | Grossa |
| 5,248,456 A | 9/1993 | Evans, Jr. et al. |
| 5,330,701 A | 7/1994 | Shaw et al. |
| 5,474,719 A | 12/1995 | Fan et al. |
| 5,531,958 A | 7/1996 | Krueger |
| 5,545,367 A | 8/1996 | Bae et al. |
| 5,656,297 A | 8/1997 | Bernstein et al. |
| 5,676,745 A | 10/1997 | Kelly et al. |
| 5,877,270 A | 3/1999 | Takayama et al. |
| 5,902,537 A | 5/1999 | Almquist et al. |
| 5,922,507 A | 7/1999 | Van et al. |
| 5,998,496 A | 12/1999 | Hassoon et al. |
| 6,090,865 A | 7/2000 | Dudman et al. |
| 6,093,761 A | 7/2000 | Schofalvi et al. |
| 6,100,007 A | 8/2000 | Pang et al. |
| 6,204,316 B1 | 3/2001 | Schofalvi et al. |
| 6,259,962 B1 | 7/2001 | Gothait |
| 6,376,585 B1 | 4/2002 | Schofalvi et al. |
| 6,399,010 B1 | 6/2002 | Guertin et al. |
| 6,658,314 B1 | 12/2003 | Gothait |
| 6,664,354 B2 | 12/2003 | Savu et al. |
| 6,780,472 B2 | 8/2004 | Hamrock et al. |
| 6,833,043 B1 | 12/2004 | Parsonage et al. |
| 6,846,862 B2 | 1/2005 | Schofalvi et al. |
| 6,850,334 B1 | 2/2005 | Gothait |
| 6,852,781 B2 | 2/2005 | Savu et al. |
| 7,022,410 B2 | 4/2006 | Tonapi et al. |
| 7,079,915 B2 | 7/2006 | Huang et al. |
| 7,101,618 B2 | 9/2006 | Coggio et al. |
| 7,173,778 B2 | 2/2007 | Jing et al. |
| 7,195,472 B2 | 3/2007 | John |
| 7,209,797 B2 | 4/2007 | Kritchman et al. |
| 7,223,826 B2 | 5/2007 | Ali et al. |
| 7,267,850 B2 | 9/2007 | Coggio et al. |
| 7,288,469 B2 | 10/2007 | Sharma et al. |
| 7,288,514 B2 | 10/2007 | Scheuing et al. |
| 7,332,217 B2 | 2/2008 | Coggio et al. |
| 7,417,099 B2 | 8/2008 | Savu et al. |
| 7,433,627 B2 | 10/2008 | German et al. |
| 7,438,846 B2 | 10/2008 | John |
| 7,491,441 B2 | 2/2009 | Pokorny et al. |
| 7,511,008 B2 | 3/2009 | Scheuing et al. |
| 7,575,847 B2 | 8/2009 | Jing et al. |
| 7,632,560 B2 | 12/2009 | Filippini et al. |
| 7,662,896 B2 | 2/2010 | Savu et al. |
| 7,718,264 B2 | 5/2010 | Klun et al. |
| 7,845,930 B2 | 12/2010 | Shkolnik et al. |
| 7,907,878 B2 | 3/2011 | Takagi et al. |
| 7,912,411 B2 | 3/2011 | Takagi et al. |
| 7,961,154 B2 | 6/2011 | Qi et al. |
| 8,110,135 B2 | 2/2012 | El-Siblani |
| 8,133,551 B2 | 3/2012 | Claes |
| 8,147,966 B2 | 4/2012 | Klun et al. |
| 8,372,330 B2 | 2/2013 | El-Siblani et al. |
| 8,372,913 B2 | 2/2013 | Claes |
| 8,394,313 B2 | 3/2013 | Shkolnik et al. |
| 8,476,398 B2 | 7/2013 | Klun et al. |
| 8,551,285 B2 | 10/2013 | Ho et al. |
| 8,623,264 B2 | 1/2014 | Rohner et al. |
| 8,696,971 B2 | 4/2014 | Boot et al. |
| 8,716,377 B2 | 5/2014 | Taden et al. |
| 8,729,211 B2 | 5/2014 | Klun et al. |
| 8,734,715 B2 | 5/2014 | Miller et al. |
| 8,741,203 B2 | 6/2014 | Liska et al. |
| 8,753,464 B2 | 6/2014 | Khanna |
| 8,753,714 B2 | 6/2014 | Cheung et al. |
| 8,801,418 B2 | 8/2014 | El-Siblani et al. |
| 8,829,070 B2 | 9/2014 | Morita et al. |
| 8,859,642 B2 | 10/2014 | Miyamoto |
| 8,916,335 B2 | 12/2014 | Kitano et al. |
| 9,108,358 B1 | 8/2015 | Herloski et al. |
| 9,120,270 B2 | 9/2015 | Chen et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,306,218 B2 | 4/2016 | Pyun et al. |
| 9,360,757 B2 | 6/2016 | Desimone et al. |
| 9,367,049 B2 | 6/2016 | Jariwala et al. |
| 9,415,418 B2 | 8/2016 | Sreenivasan et al. |
| 9,452,567 B2 | 9/2016 | Syao et al. |
| 9,453,142 B2 | 9/2016 | Rolland et al. |
| 9,486,944 B2 | 11/2016 | El-Siblani et al. |
| 9,492,969 B2 | 11/2016 | Spadaccini et al. |
| 9,498,920 B2 | 11/2016 | Desimone et al. |
| 9,527,244 B2 | 12/2016 | El-Siblani et al. |
| 9,533,450 B2 | 1/2017 | El-Siblani et al. |
| 9,561,623 B2 | 2/2017 | El-Siblani et al. |
| 9,567,439 B1 | 2/2017 | Pyun et al. |
| 9,598,606 B2 | 3/2017 | Rolland et al. |
| 9,676,963 B2 | 6/2017 | Rolland et al. |
| 9,718,096 B2 | 8/2017 | Sreenivasan et al. |
| 9,782,934 B2 | 10/2017 | Willis et al. |
| 9,796,138 B2 | 10/2017 | Liska et al. |
| 9,833,839 B2 | 12/2017 | Gibson et al. |
| 9,975,295 B2 | 5/2018 | Rolland et al. |
| 9,975,296 B2 | 5/2018 | El-Siblani et al. |
| 9,982,164 B2 | 5/2018 | Rolland et al. |
| 9,987,653 B2 | 6/2018 | Sreenivasan et al. |
| 9,987,804 B2 | 6/2018 | El-Siblani et al. |
| 9,993,974 B2 | 6/2018 | DeSimone et al. |
| 10,011,076 B2 | 7/2018 | El-Siblani et al. |
| 10,016,938 B2 | 7/2018 | DeSimone et al. |
| 10,072,921 B2 | 9/2018 | Fu et al. |
| 10,073,424 B2 | 9/2018 | Lin et al. |
| 10,150,280 B2 | 12/2018 | Aghababaie et al. |
| 10,166,725 B2 | 1/2019 | Willis et al. |
| 10,213,956 B2 | 2/2019 | Willis et al. |
| 10,245,785 B2 | 4/2019 | Adzima |
| 10,354,445 B2 | 7/2019 | Greene et al. |
| 10,421,233 B2 | 9/2019 | Lin et al. |
| 10,464,259 B2 | 11/2019 | Lin et al. |
| 10,882,251 B2 | 1/2021 | Lin et al. |
| 10,935,891 B2 | 3/2021 | Lin et al. |
| 2001/0035597 A1 | 11/2001 | Grigg et al. |
| 2003/0043360 A1 | 3/2003 | Farnworth |
| 2003/0114936 A1 | 6/2003 | Sherwood et al. |
| 2004/0138049 A1 | 7/2004 | Yasrebi et al. |
| 2004/0187714 A1 | 9/2004 | Napadensky et al. |
| 2006/0054039 A1 | 3/2006 | Kritchman et al. |
| 2006/0163774 A1 | 7/2006 | Abels et al. |
| 2006/0257785 A1 | 11/2006 | Johnson |
| 2007/0264481 A1 | 11/2007 | Desimone et al. |
| 2008/0169586 A1 | 7/2008 | Hull et al. |
| 2008/0181977 A1 | 7/2008 | Sperry et al. |
| 2008/0252682 A1 | 10/2008 | Hernandez et al. |
| 2009/0020901 A1 | 1/2009 | Schillen et al. |
| 2009/0130449 A1 | 5/2009 | El-Siblani |
| 2009/0196946 A1 | 8/2009 | Kihara et al. |
| 2009/0304952 A1 | 12/2009 | Kritchman |
| 2010/0028994 A1 | 2/2010 | Desimone et al. |
| 2010/0029801 A1 | 2/2010 | Moszner et al. |
| 2010/0125356 A1 | 5/2010 | Shkolnik et al. |
| 2010/0173096 A1 | 7/2010 | Kritchman et al. |
| 2011/0089610 A1 | 4/2011 | El-Siblani et al. |
| 2011/0181941 A1 | 7/2011 | Henningsen |
| 2011/0182805 A1 | 7/2011 | Desimone et al. |
| 2011/0287185 A1 | 11/2011 | Felstead et al. |
| 2011/0310370 A1 | 12/2011 | Rohner et al. |
| 2011/0318595 A1 | 12/2011 | Breiner et al. |
| 2012/0046376 A1 | 2/2012 | Loccufier et al. |
| 2012/0107625 A1 | 5/2012 | Smith et al. |
| 2012/0195994 A1 | 8/2012 | El-Siblani et al. |
| 2013/0000553 A1 | 1/2013 | Hoechsmann et al. |
| 2013/0001834 A1 | 1/2013 | El-Siblani et al. |
| 2013/0056910 A1 | 3/2013 | Houbertz-Krauss et al. |
| 2013/0123988 A1 | 5/2013 | Jariwala et al. |

(56) References Cited

U.S. PATENT DOCUMENTS

| | | |
|---|---|---|
| 2013/0252178 A1 | 9/2013 | McLeod et al. |
| 2013/0336884 A1 | 12/2013 | Desimone et al. |
| 2014/0084517 A1 | 3/2014 | Sperry et al. |
| 2014/0265032 A1 | 9/2014 | Teicher et al. |
| 2014/0339741 A1 | 11/2014 | Aghababaie et al. |
| 2014/0361463 A1 | 12/2014 | Desimone et al. |
| 2015/0019000 A1 | 1/2015 | Nakamura |
| 2015/0064298 A1 | 3/2015 | Syao |
| 2015/0072293 A1 | 3/2015 | DeSimone et al. |
| 2015/0077215 A1 | 3/2015 | Ranky et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0183168 A1 | 7/2015 | Liverman et al. |
| 2015/0202805 A1 | 7/2015 | Saruhashi et al. |
| 2015/0224710 A1 | 8/2015 | El-Siblani et al. |
| 2015/0231828 A1 | 8/2015 | El-Siblani et al. |
| 2015/0231831 A1 | 8/2015 | El-Siblani |
| 2015/0273632 A1 | 10/2015 | Chen |
| 2015/0287169 A1 | 10/2015 | Ueda et al. |
| 2015/0290881 A1 | 10/2015 | Ederer et al. |
| 2015/0328839 A1 | 11/2015 | Willis et al. |
| 2015/0331402 A1 | 11/2015 | Lin et al. |
| 2015/0343745 A1 | 12/2015 | Pesek et al. |
| 2015/0344682 A1 | 12/2015 | Ganapathiappan et al. |
| 2015/0360419 A1 | 12/2015 | Willis et al. |
| 2016/0023403 A1 | 1/2016 | Ramos et al. |
| 2016/0023467 A1 | 1/2016 | Din et al. |
| 2016/0046075 A1 | 2/2016 | DeSimone et al. |
| 2016/0059484 A1 | 3/2016 | Desimone et al. |
| 2016/0059486 A1 | 3/2016 | Desimone et al. |
| 2016/0059487 A1 | 3/2016 | Desimone et al. |
| 2016/0067921 A1 | 3/2016 | Willis et al. |
| 2016/0121547 A1 | 5/2016 | Kobayashi |
| 2016/0122539 A1 | 5/2016 | Okamoto et al. |
| 2016/0131974 A1 | 5/2016 | Abe et al. |
| 2016/0136889 A1 | 5/2016 | Rolland et al. |
| 2016/0141535 A1 | 5/2016 | Snaith et al. |
| 2016/0158889 A1 | 6/2016 | Carter et al. |
| 2016/0160077 A1 | 6/2016 | Rolland et al. |
| 2016/0164031 A1 | 6/2016 | Pieper et al. |
| 2016/0167301 A1 | 6/2016 | Cole et al. |
| 2016/0170218 A1 | 6/2016 | Johnson et al. |
| 2016/0193786 A1 | 7/2016 | Moore et al. |
| 2016/0200052 A1 | 7/2016 | Moore et al. |
| 2016/0214321 A1 | 7/2016 | Tow et al. |
| 2016/0271870 A1 | 9/2016 | Brown, Jr. |
| 2016/0271875 A1 | 9/2016 | Brown, Jr. |
| 2016/0303793 A1 | 10/2016 | Ermoshkin et al. |
| 2016/0303795 A1 | 10/2016 | Liu et al. |
| 2016/0325493 A1 | 11/2016 | DeSimone et al. |
| 2016/0332386 A1 | 11/2016 | Kuijpers |
| 2016/0368054 A1 | 12/2016 | Ng et al. |
| 2016/0368210 A1 | 12/2016 | Chen et al. |
| 2016/0368221 A1 | 12/2016 | Ueda et al. |
| 2017/0015058 A1 | 1/2017 | Ueda et al. |
| 2017/0021562 A1 | 1/2017 | El-Siblani et al. |
| 2017/0022312 A1 | 1/2017 | Liu et al. |
| 2017/0028644 A1 | 2/2017 | Evans et al. |
| 2017/0080641 A1 | 3/2017 | El-Siblani |
| 2017/0087765 A1 | 3/2017 | Rundlett et al. |
| 2017/0087769 A1 | 3/2017 | Lancaster-Larocque et al. |
| 2017/0106399 A1 | 4/2017 | Sreenivasan et al. |
| 2017/0106603 A1 | 4/2017 | Pobihun |
| 2017/0113406 A1 | 4/2017 | Chen et al. |
| 2017/0113416 A1 | 4/2017 | DeSimone et al. |
| 2017/0120326 A1 | 5/2017 | Heikkila et al. |
| 2017/0120515 A1 | 5/2017 | Rolland et al. |
| 2017/0151718 A1 | 6/2017 | Rolland et al. |
| 2017/0173881 A1 | 6/2017 | Dachs, II et al. |
| 2017/0182708 A1 | 6/2017 | Lin et al. |
| 2017/0210077 A1 | 7/2017 | Ermoshkin et al. |
| 2017/0239887 A1 | 8/2017 | Rolland et al. |
| 2017/0246660 A1 | 8/2017 | Thompson et al. |
| 2017/0246804 A1 | 8/2017 | El-Siblani et al. |
| 2017/0291356 A1 | 10/2017 | Adachi et al. |
| 2017/0297099 A1 | 10/2017 | Gibson et al. |
| 2017/0334129 A1 | 11/2017 | Ebert et al. |
| 2017/0342182 A1 | 11/2017 | Pesek et al. |
| 2017/0369633 A1 | 12/2017 | Caruso et al. |
| 2018/0001552 A1 | 1/2018 | Dachs, II et al. |
| 2018/0001581 A1 | 1/2018 | Patel et al. |
| 2018/0015669 A1 | 1/2018 | Moore et al. |
| 2018/0044448 A1 | 2/2018 | Moser et al. |
| 2018/0071977 A1 | 3/2018 | Tumbleston et al. |
| 2018/0079865 A1 | 3/2018 | Pyun et al. |
| 2018/0100037 A1 | 4/2018 | Pyun |
| 2018/0105649 A1 | 4/2018 | Pyun et al. |
| 2018/0126630 A1 | 5/2018 | Panzer et al. |
| 2018/0126631 A1 | 5/2018 | Nauka et al. |
| 2018/0133959 A1 | 5/2018 | Moore et al. |
| 2018/0162047 A1 | 6/2018 | Gibson et al. |
| 2018/0162048 A1 | 6/2018 | Gibson et al. |
| 2018/0194066 A1 | 7/2018 | Ramos et al. |
| 2018/0200948 A1 | 7/2018 | Kuijpers et al. |
| 2018/0208686 A1 | 7/2018 | Pyun et al. |
| 2018/0333912 A1 | 11/2018 | Lin et al. |
| 2018/0333913 A1 | 11/2018 | Lin et al. |
| 2018/0348646 A1 | 12/2018 | Lin et al. |
| 2018/0361666 A1 | 12/2018 | Adzima |
| 2019/0126533 A1 | 5/2019 | Thompson |
| 2019/0134886 A1 | 5/2019 | Willis et al. |
| 2019/0134899 A1 | 5/2019 | Mueller et al. |
| 2019/0176398 A1 | 6/2019 | Adzima |
| 2019/0210285 A1 | 7/2019 | Tomioka et al. |
| 2019/0212572 A1 | 7/2019 | Tomioka |
| 2019/0224918 A1 | 7/2019 | Zheng |
| 2019/0322033 A1 | 10/2019 | Willis et al. |
| 2020/0031044 A1 | 1/2020 | Lin et al. |
| 2020/0316865 A1 | 10/2020 | Adzima |

FOREIGN PATENT DOCUMENTS

| | | |
|---|---|---|
| CN | 101956091 A | 1/2011 |
| CN | 102171305 B | 7/2013 |
| CN | 103317140 A | 9/2013 |
| CN | 104609859 A | 5/2015 |
| CN | 104890245 A | 9/2015 |
| CN | 105081325 A | 11/2015 |
| CN | 105729812 A | 7/2016 |
| CN | 105922587 A | 9/2016 |
| CN | 104725050 B | 1/2017 |
| CN | 205889910 U | 1/2017 |
| CN | 104923781 B | 3/2017 |
| CN | 107573058 A | 1/2018 |
| CN | 110914058 A | 3/2020 |
| DE | 3926869 A1 | 2/1991 |
| EP | 3194145 A2 | 7/2017 |
| JP | 2010030322 A | 2/2010 |
| JP | 2017210620 A | 11/2017 |
| JP | 6241944 B2 | 12/2017 |
| KR | 20170005209 A | 1/2017 |
| WO | WO-0140866 A2 | 6/2001 |
| WO | WO-0200569 A2 | 1/2002 |
| WO | WO-2007020634 A2 | 2/2007 |
| WO | WO-2014126830 A2 | 8/2014 |
| WO | WO-2015031227 A1 | 3/2015 |
| WO | WO-2015107066 A1 | 7/2015 |
| WO | WO-2016022336 A2 | 2/2016 |
| WO | WO-2016094827 A1 | 6/2016 |
| WO | WO-2016123499 A1 | 8/2016 |
| WO | WO-2017009368 A1 | 1/2017 |
| WO | WO-2017011533 A1 | 1/2017 |
| WO | WO-2017051084 A1 | 3/2017 |
| WO | WO-2017053783 A1 | 3/2017 |
| WO | WO-2017066546 A1 | 4/2017 |
| WO | WO-2017112483 A2 | 6/2017 |
| WO | WO-2017112682 A1 | 6/2017 |
| WO | WO-2017112751 A1 | 6/2017 |
| WO | WO-2017210298 A1 | 12/2017 |
| WO | WO-2017214007 A1 | 12/2017 |
| WO | WO-2018006018 A1 | 1/2018 |
| WO | WO-2018006029 A1 | 1/2018 |
| WO | WO-2018047479 A1 | 3/2018 |

(56) References Cited

FOREIGN PATENT DOCUMENTS

| WO | WO-2018081053 A1 | 5/2018 |
| WO | WO-2018094131 A1 | 5/2018 |
| WO | WO-2018102341 A1 | 6/2018 |
| WO | WO-2018106472 A1 | 6/2018 |
| WO | WO-2018213356 A1 | 11/2018 |
| WO | WO-2018232175 A1 | 12/2018 |
| WO | WO-2020139858 | 7/2020 |

OTHER PUBLICATIONS

U.S. Appl. No. 16/539,333 Notice of Allowance dated Sep. 9, 2021.

Amine photochemical coinitiators, [online] [Retrieved on Aug. 4, 2014]; Retrieved from the Internet URL: httQ://www.sigmaaldrich.com/materials-science/material-scienceproducts. htrnl?TablePage=20204246; 2 pages.

"Anilox." Wikipedia, Wikimedia Foundation, May 16, 2018, en.wikipedia.org/wiki/Anilox.

Benoit, et al. Development of a universal alkoxyamine for 'living' free radical polymerizations. J. Am. Chern. Soc., 121 (1999): 3904-3920.

Berg, et al. A dual-cure, solid-state photoresist combining a thermoreversible Diels-Alder network and a chain growth acrylate network. Macromolecules, 47.10 (2014): 3473-3482.

"Capabilities." Technical Coatings International Capabilities, Mar. 14, 2017, http://www.tciinc.com/capabilities/.

Chen, et al. Novel multifunctional hyperbranched polymeric photoinitiators with built-in amine coinitiators for UV curing. J. Mater. Chern., 17 (2007): 3389-3392.

Coenen. Industry trends are boosting Jet Printing. 2015.

Corrales, et al. Free radical macrophotoinitiators: an overview on recent advances. Journal of Photochemistry and Photobiology A: Chemistry, 159 (2003): 103-114.

Deckers, et al. Additive Manufacturing of Ceramics: A Review, J. Ceram. Sci. Tech., 05 [04] 245-260 (2014).

Dendukuri, et al. Continuous-Flow Lithography for High-Throughput Microparticle Synthesis. Nature Materials, 5 (May 2006): 365-369.

EP18801929.3 Extended European Search Report dated Feb. 17, 2021.

EP18816953.6 European Search Report dated May 18, 2021.

Essemtec AG. Essemtec—Spider—Compact High Speed Jetter and Dispenser. YouTube Web Video. Published on Jul. 5, 2016. 2 pages. URL https://www.youtube.com/watch?v=NpgBurid2wU.

Essemtec AG. Essemtec Scorpion—Versatile High Speed Jetting of Solder Paste and Glue. YouTube Web Video. Published on Nov. 13, 2014. 2 pages. URL https://www.youtube.com/watch?v=SZ-Kq2Gkm5Y.

Fairbanks, et al. Photoinitiated polymerization ofPEG-diacrylate with lithium phenyl-2,4,6-trimethylbenzoylphosphinate: polymerization rate and cytocompatibility. Biomaterials, 30 (2009): 6702-6707.

"Final Office action dated Jan. 7, 2019 for U.S. Appl. No. 14/967,055".

"Flexography." Wikipedia, Wikimedia Foundation, May 23, 2018, en.wikipedia.org/wiki/Flexography.

GB1809886.3 Office Action dated May 16, 2019.

German, et al. Injection Molding of Metals and Ceramics. Metal Powder Industries Federation, 1997.

Gonsalvi, et al. Novel synthetic pathways for bis(acyl)phosphine oxide photoinitiators. Angew. Chern. Int. Ed., 51 (2012): 7895-7897.

Green, Industrial photoinitiators—a technical guide, CRC Press, © 2010 Taylor and Francis Group, LLC, 191 pages.

Houben. Equipment for printing of high viscosity liquids and molten metals. Universiteit Twente. Sep. 27, 2012.

Ikemura, et al. Design of a new dental adhesive-effect of a water-soluble sodium acyl phosphine oxide with crown ether on adhesion to dental hard tissues. Dental Materials Journal, 28.3 (2009): 267-276.

Kloxin, et al. Photodegradable hydro gels for dynamic tuning of physical and chemical properties. Science, 324 (2009): 59-63.

Kyzen. Stencil Cleaning & Misprinted PCB Cleaners. 2018. http://www.kyzen.com/electronics-manufacturing-cleaning/stencils-and-misprints/.

Lambert, et al. Design considerations for mask projection microstereolithography systems. (Jun. 22, 2016) [online] (retrieved from https://sffsymposium.engr.utexas.edu/Manuscripts/2013/2013-09-Lambert.pdf), 20 pages.

Lee, et al. Solvent Compatibility of Poly(dimethylsiloxane)-Based Microfluidic Devices, Anal. Chem. 75 (2003): 6544-6554.

Massey, L. Permeability Properties of Plastics and Elastomers—A Guide to Packaging and Barrier Materials. Published Jan. 1, 2003. pp. 1-5, 19-29.

Matyjaszewski, et al. Atom transfer radical polymerization. Chern. Rev., 101 (2001): 2921-2990.

McDonald, et al. Fabrication ofmicrofluidic systems in poly(dimethylsiloxane). Electrophoresis, 21(2000): 27-40.

Miller. Slot Die Coating Technology. Aug. 3, 2009.

Moad, et al. Living radical polymerization by the RAFT process. Aust. J. Chern., 58 (2005): 379-410.

Murata, et al. Photopolymerization-induced phase separation in binary blends of photocurable/linear polymers. Polymer. vol. 43, Issue 9, Apr. 2002, pp. 2845-2859.

Myiconnect007. Taiyo's Inkjet Solder Mask Applied with Meyer Burger's PIXDRO IP410 Printer. YouTube Web Video. Published on Feb. 13, 2015. 2 pages. URL https://www.youtube.com/watch?v=jm_JteEkQWE.

Organic photoinitiators, [online] [Retrieved on Aug. 4, 2014]; Retrieved from the Internet URL: httQ://www.sigmaaldrich.com/materials-science/material-scienceproducts.html?TablePage=16374997; 1 page.

Otsu, et al. Polymer design by iniferter technique in radical polymerization: synthesis of AB and ABA block copolymers containing random and alternating copolymer se_guences. Polymer Journal, 17.1 (1985): 97-104.

Pan, et al. Rapid manufacturing in minutes: the development of a mask projection stereolithography process for high-speed fabrication. Proceedings of the ASME 2012 International Manufacturing Science and Engineering Conferences, Jun. 4-8, 2012, Notre Dame, Indiana, US, 10 pages.

PCT/US2018/032837 International Search Report and Written Opinion dated Sep. 24, 2018.

PCT/US2018/037630 International Search Report and Written Opinion dated Oct. 3, 2018.

PCT/US2019/068413 Search Report & Written Opinion dated Apr. 23, 2020.

Pinnau, et al. Gas and vapor properties of amorphous perfluorinated copolymer membranes based on 2,2-bistrifluoromethyl-4,5-difluoro-1,3-dioxole/tetrafluoroethylene. Journal of Membrane Science, 109: 125-133 (1996).

RAFT agents, [online] [Retrieved on Aug. 4, 2014]; Retrieved from the Internet URL: h!!Q://www. sigmaaldrich.com/materials-science/material-sc ienceproducts. htrnl?TablePage=l03936134; 4 pages.

"Reverse Roll Coating." Wikipedia, Wikimedia Foundation, Apr. 10, 2018, en.wikipedia.org/wiki/Reverse_roll_coating.

Scott, et al. Two-color single-photon photoinitiation and photoinhibition for subdiffraction photolithography. Science, 324 (2009): 913-917.

"Screen Printing." Wikipedia, Wikimedia Foundation, May 17, 2018, en.wikipedia.org/wiki/Screen_printing#1960s_to_present.

"Spin Coating." Wikipedia, Wikimedia Foundation, Apr. 10, 2018, en.wikipedia.org/wiki/Spin_coating.

Szczepanski, et al. A new approach to network heterogeneity: Polymerization Induced Phase Separation in photo-initiated, free-radical methacrylic systems. Polymer (Guildf). Sep. 28, 2012;53(21):4694-4701.

Temel, et al. Synthesis of main chain polymeric benzophenone photoinitiator via thiol-ene click chemistry and its use in free radical polymerization. J. Polym. Sci. A: Polym. Chern., 48 (2010): 5306-5312.

(56) References Cited

OTHER PUBLICATIONS

Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.
Unknown author, "Teflon™ AF amorphous fluoroplastic resins," (Jun. 22, 2016) [online] (retrieved from https://www.chemours.com/Teflon_Industrial/en_us/assets/downloads/teflon-af-product-information.pdf), 3 pages.
U.S. Appl. No. 15/983,962 Notice of Allowance dated Dec. 20, 2018.
U.S. Appl. No. 16/016,253 Notice of Allowance dated Aug. 18, 2020.
U.S. Appl. No. 16/016,253 Notice of Allowance dated Oct. 2, 2020.
U.S. Appl. No. 15/374,734 Notice of Allowance dated Aug. 4, 2021.
U.S. Appl. No. 14/711,703 Notice of Allowance dated Jun. 8, 2017.
U.S. Appl. No. 14/711,703 Office Action dated Apr. 22, 2016.
U.S. Appl. No. 14/711,703 Office Action dated Dec. 1, 2016.
U.S. Appl. No. 14/848,162 Notice of Allowance dated Oct. 3, 2018.
U.S. Appl. No. 14/848,162 Office Action dated Jun. 5, 2018.
U.S. Appl. No. 14/848,162 Office Action dated Sep. 18, 2017.
U.S. Appl. No. 14/967,055 Office Action dated May 19, 2017.
U.S. Appl. No. 14/967,055 Office Action dated Jan. 7, 2019.
U.S. Appl. No. 14/967,055 Office Action dated Jul. 12, 2018.
U.S. Appl. No. 14/967,055 Office Action dated Nov. 1, 2017.
U.S. Appl. No. 15/374,734 Office Action dated Feb. 26, 2020.
U.S. Appl. No. 15/374,734 Office Action dated Sep. 4, 2020.
U.S. Appl. No. 15/919,124 Notice of Allowance dated Nov. 27, 2020.
U.S. Appl. No. 15/919,124 Office Action dated Jun. 25, 2020.
U.S. Appl. No. 15/983,962 Notice of Allowance dated Oct. 12, 2018.
U.S. Appl. No. 16/016,253 Office Action dated Feb. 21, 2019.
U.S. Appl. No. 16/016,253 Office Action dated Oct. 16, 2018.
U.S. Appl. No. 16/016,253 Office Action dated Oct. 21, 2019.
U.S. Appl. No. 16/016,257 Notice of Allowance dated Jul. 17, 2019.
U.S. Appl. No. 16/016,257 Office Action dated Mar. 21, 2019.
U.S. Appl. No. 16/016,257 Office Action dated Sep. 27, 2018.
U.S. Appl. No. 16/016,262 Notice of Allowance dated Jul. 5, 2019.
U.S. Appl. No. 16/016,262 Office Action dated Mar. 21, 2019.
U.S. Appl. No. 16/016,262 Office Action dated Sep. 28, 2018.
U.S. Appl. No. 16/049,288 Notice of Allowance dated Jan. 3, 2019.
U.S. Appl. No. 16/049,288 Office Action dated Oct. 11, 2018.
U.S. Appl. No. 16/202,039 Office Action dated Apr. 15, 2020.
U.S. Appl. No. 16/202,039 Office Action dated Aug. 27, 2020.
U.S. Appl. No. 16/276,148 Office Action dated May 20, 2019.
U.S. Appl. No. 16/276,148 Office Action dated Nov. 29, 2019.
U.S. Appl. No. 16/539,333 Office Action dated Jan. 7, 2021.
U.S. Appl. No. 16/539,333 Office Action dated Jul. 20, 2021.
U.S. Appl. No. 16/842,082 Office Action dated Jul. 22, 2021.
U.S. Appl. No. 15/374,734 Office Action dated Sep. 6, 2019.
Varma et al. Solution Combustion Synthesis of Nanoscale Materials. Chem Rev. Dec. 14, 2016;116(23):14493-14586.
Wei, et al. A highly efficient polyurethane-type polymeric photoinitiator containing in-chain benzophenone and coinitiator amine for photopolymerization of PU prepolymers. Macromol. Chem. Phys., 207 (2006): 2321-2328.
Yang, et al. Synthesis of 1,6-hexanediol diacrylate, 2010.
Yang, H. et al. "High Viscosity Jetting System for 3d Reactive Inkjet Printing." (2013).
Zhang, Teflon AF composite materials in membrane separation and molecular recognition in fluorous media. Ph.D. dissertation, University of Pittsburgh, 2013, 207 pages.

SENSORS FOR THREE-DIMENSIONAL PRINTING SYSTEMS AND METHODS

CROSS-REFERENCE

This application is a continuation of International Application No. PCT/US19/68413, filed Dec. 23, 2019, which claims the benefit of U.S. Patent Application No. 62/785,104, filed Dec. 26, 2018, which is entirely incorporated herein by reference.

BACKGROUND

Additive manufacturing techniques, such as three-dimensional (3D) printing, are rapidly being adopted as useful techniques for a number of different applications, including rapid prototyping and fabrication of specialty components. Examples of 3D printing include powder-based printing, fused deposition modeling (FDM), and stereolithography (SLA).

Photopolymer-based 3D printing technology (e.g., stereolithography) may produce a 3D structure in a layer-by-layer fashion by using light to selectively cure polymeric precursors into a polymeric material within a photoactive resin. Photopolymer-based 3D printers that use bottom up illumination may project light upwards through an optically transparent window of a vat containing photoactive resin to cure at least a portion of the resin. Such printers may build a 3D structure by forming one layer at a time, where a subsequent layer adheres to the previous layer.

SUMMARY

The present disclosure provides technologies relating to three-dimensional (3D) printing (e.g., stereolithography). 3D printing methods of the present disclosure may use at least one sensor to determine a profile and/or quality of a film (e.g., a film of a polymerizable liquid or resin) adjacent to a build surface. If such profile and/or quality meet a threshold, 3D printing may be initiated. The present disclosure also provides hardware configurations of one or more sensors for determining the profile and/or quality of the film prior to, during, and/or subsequent to exposing the film to light to control a photopolymerization process within the film, thereby printing a 3D structure.

Methods and systems of the present disclosure may provide various benefits and advantages. For example, quality control of a 3D printing process can be improved by evaluating a quality of a film of a polymerizable material (e.g., resin) adjacent to a build surface, and if necessary, re-print the film of the polymerizable material. In some cases, one or more parameters of the film deposition process may be modified prior to re-printing the film to improve the quality of the film to be deposited on a print window. In some cases, quality control of a printed portion of the 3D object can be achieved by evaluating a pattern of any excess polymerizable material remaining on the print window. Such pattern or a collection of such pattern may be useful as a negative image (e.g., a silhouette image) of the printed portion of the 3D object to assess whether or not the portion of the 3D object was printed in accordance to a computer model of the 3D object.

An aspect of the present disclosure provides a method for printing a three-dimensional (3D) object, comprising: (a) providing, adjacent to a build surface, a film comprising a polymeric precursor; (b) using a sensor to determine a profile of said film, which profile is indicative of a quality of said film; (c) determining if said profile meets a quality threshold; and (d) subsequent to (c), (1) if said profile meets a quality threshold, using a light source to expose at least a portion of said film to light to initiate formation of a polymeric material from said polymeric precursor, thereby printing at least a portion of said 3D object, or (2) if said profile does not meet said quality threshold, adjusting or redepositing said film.

In some embodiments, the method further comprises, in (b), (i) exposing the film to an additional light and (ii) using the sensor to detect at least a portion of the additional light that is transmitted through the film. In some embodiments, the light has a first wavelength and the additional light has a second wavelength, wherein the second wavelength is different than the first wavelength. In some embodiments, the light and the additional light are provided by a light source. In some embodiments, the light is provided by a light source and the additional light is provided by an additional light source.

In some embodiments, the method further comprises using an optical diffuser, located adjacent to the build surface and away from the film, to diffuse the additional light.

In some embodiments, the method further comprises, prior to (c), using the profile to identify a variation in the film with respect to a reference. In some embodiments, the quality threshold is a threshold of the variation in the film with respect to the reference. In some embodiments, the profile meets the quality threshold if the variation is below a threshold variation.

In some embodiments, the profile is an optical profile. In some embodiments, the optical profile is a transmittance profile. In some embodiments, the profile is a two-dimensional (2D) profile. In some embodiments, the method further comprises using the profile to determine a cross-sectional dimension of the film. In some embodiments, the profile is a thickness profile of the film.

In some embodiments, the film further comprises a plurality of particles, and the profile is a density profile of the plurality of particles in the film.

In some embodiments, the polymeric precursor encapsulates the plurality of particles. In some embodiments, the polymeric material encapsulates the plurality of particles. In some embodiments, the plurality of particles comprises at least one metal particle, at least one ceramic particle, or a combination thereof.

In some embodiments, (d)(1) is performed with a build head in contact with the film, and wherein, subsequent (d)(1), the build head is moved away from the build surface.

In some embodiments, subsequent to (d)(1), the method further comprises using the sensor to measure an additional profile of the film adjacent to the build surface. In some embodiments, the additional profile is a negative profile of the at least the portion of the 3D object. In some embodiments, the method further comprises providing an additional film adjacent to the build surface and using the sensor to determine a profile of the additional film, which profile is indicative of a quality of the additional film.

In some embodiments, the method further comprises, in (a), providing a deposition head adjacent to the build surface and moving the deposition head across the build surface to deposit the film adjacent to the build surface.

In some embodiments, the build surface comprises a print window, and the film comprising the polymeric precursor is provided adjacent to the print window. In some embodiments, in (d)(1), the light is directed through the print window to the film to initiate formation of the polymeric material from the polymeric precursor. In some embodiments, the film further comprises (i) a photoinitiator that initiates formation of the polymeric material from the polymeric precursor away from the print window, and (ii) a photoinhibitor that inhibits formation of the polymeric material from the polymeric precursor adjacent to the print window.

In some embodiments, the method further comprises, prior to (a), receiving or generating a computer model of the 3D object, wherein the at least the portion of the 3D object is in accordance to the computer model of the 3D object.

In some embodiments, the build surface is part of a vat that retains the film. In some embodiments, the build surface is part of an open platform that retains the film.

Another aspect of the present disclosure provides a system for printing a three-dimensional (3D) object, comprising: a build surface configured to retain a film comprising a polymeric precursor; a sensor in sensing communication with the build surface; a light source in optical communication with the build surface, wherein the light source is configured to provide light; and a controller comprising a circuit operatively coupled to the sensor and the light source, wherein the controller is configured to (i) use the sensor to determine a profile of the film, which profile is indicative of a quality of the film, (ii) determine if the profile meets a quality threshold, and (iii) subsequent to (ii), (1) if the profile meets a quality threshold, direct the light source to expose at least a portion of the film to the light to initiate formation of a polymeric material from the polymeric precursor, thereby printing at least a portion of the 3D object, or (2) if the profile does not meet the quality threshold, direct the film to be adjusted or redeposited.

In some embodiments, the controller is further configured to (i) expose the film to an additional light and (ii) use the sensor to detect at least a portion of the additional light that is transmitted through the film.

In some embodiments, the light has a first wavelength and the additional light has a second wavelength, wherein the second wavelength is different than the first wavelength. In some embodiments, the light source is configured to provide the additional light. In some embodiments, the system further comprises an additional light source configured to provide the additional light.

In some embodiments, the system further comprises an optical diffuser located adjacent to the build surface and away from the film, wherein the optical diffuser is configured to diffuse the additional light.

In some embodiments, during use, the film further comprises a plurality of particles. In some embodiments, during use, the polymeric precursor encapsulates the plurality of particles. In some embodiments, during use, the polymeric material encapsulates the plurality of particles. In some embodiments, during use, the plurality of particles comprises at least one metal particle, at least one ceramic particle, or a combination thereof.

In some embodiments, the system further comprises a build head configured to move relative to the build surface and hold the at least the portion of the 3D object.

In some embodiments, the system further comprises a deposition head adjacent to the build surface and configured to move across the build surface to deposit the film adjacent to the build surface. In some embodiments, the build surface comprises a print window configured to retain the film.

In some embodiments, during use, the film further comprises (i) a photoinitiator that initiates formation of the polymeric material from the polymeric precursor away from the print window, and (ii) a photoinhibitor that inhibits formation of the polymeric material from the polymeric precursor adjacent to the print window.

In some embodiments, the build surface is part of a vat that is configured to retain the film. In some embodiments, the build surface is part of an open platform that is configured to retain the film.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1A:
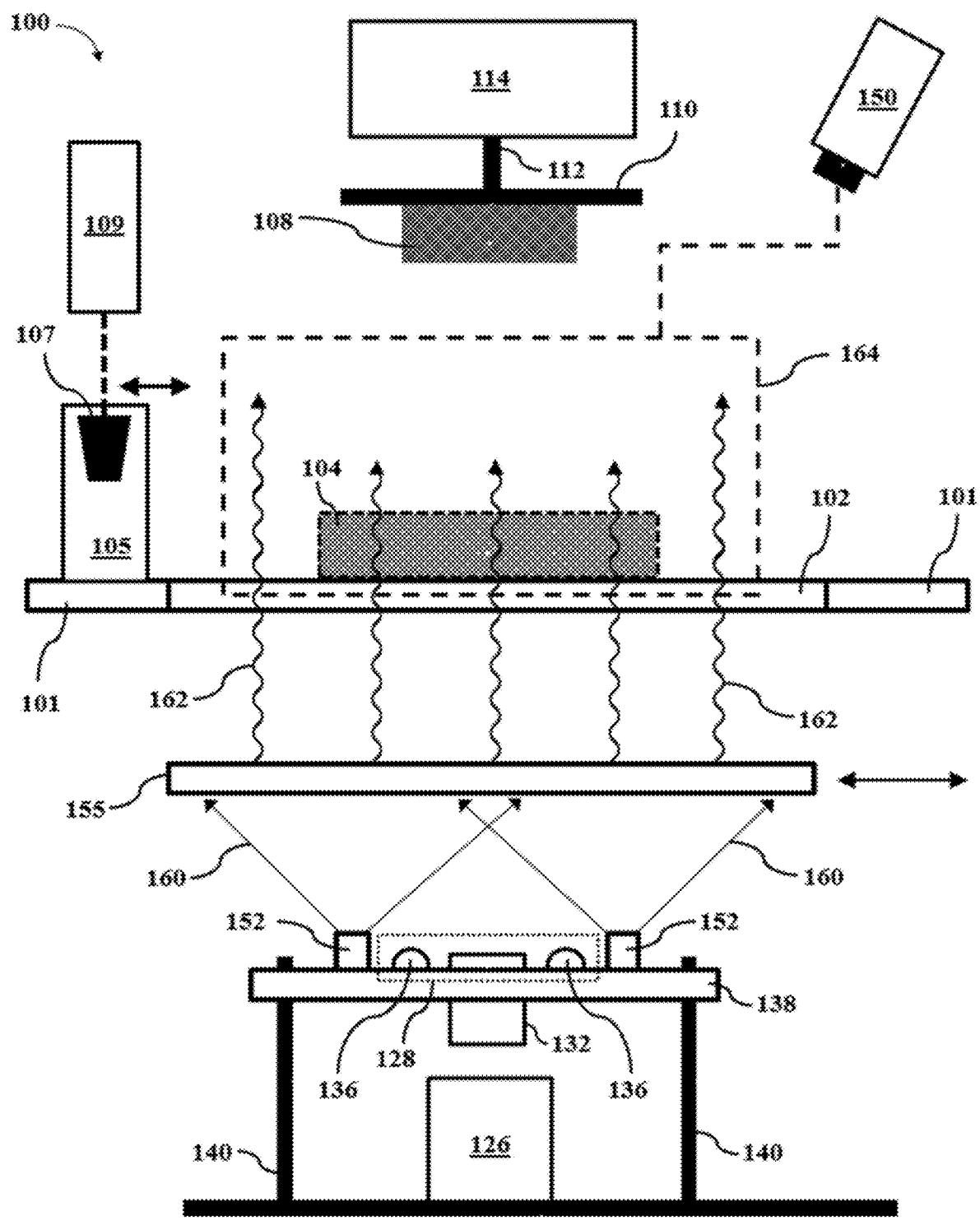
FIGS. 1A-1D show different configurations of a three-dimensional (3D) printing system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional object" (also "3D object"), as used herein, generally refers to an object or a part that is printed by 3D printing. The 3D object may be at least a portion of a larger 3D object or an entirety of the 3D object. The 3D object may be fabricated (e.g., printed) in accordance with a computer model of the 3D object.

The term "vat," as used herein, generally refers to a structure (e.g., a container, holder, reservoir, etc.) that holds a film (e.g., a layer of a material) during 3D printing. The material may be a liquid. The film may comprise a liquid (e.g., a polymerizable resin or resin mixture) usable for 3D printing. The liquid may have a viscosity that is sufficient to permit the liquid to remain on or adjacent to the bottom surface of the vat. The bottom surface of the vat may be referred to as a build surface (e.g., a print surface). One or more sides of the vat (e.g., a bottom or side surface) may include an optically transparent or semi-transparent window (e.g., glass or a polymer) to direct light through the window and to the film. The light may be directed to the film from a bottom or from one or more sides of the film. In some cases, the window may be precluded. In such a scenario, light may be provided to the film from above the vat.

The term "open platform," as used herein, generally refers to a structure that supports the film of the liquid (e.g., the film comprising the liquid usable for 3D printing) during 3D printing. The open platform may be a build surface (e.g., a print surface). The liquid may have a viscosity that is sufficient to permit the liquid to remain on or adjacent to the open platform during 3D printing. The open platform may be flat. The open platform may include an optically transparent or semi-transparent print window (e.g., glass or a polymer) to direct light through the window and to the film of the liquid. The open platform may have various shapes. The open platform may be a rectangle or a ring, for example.

The open platform may comprise one or more walls adjacent to the open platform, such as at least about 1, 2, 3, 4, 5, 6, 7, 8, 9, 10 or more walls. As an alternative, the open platform may comprise at most about 10, 9, 8, 7, 6, 5, 4, 3, 2, or 1 wall, or no walls. In some cases, the walls may enclose the open platform. During printing, a property (e.g., viscosity) of the liquid used for printing may be sufficient to keep the film of the liquid adjacent to the open platform without sufficient flow of the film of the liquid towards the one or more walls. In some examples, the walls prevent flow of the film of the liquid out of the open platform. In some cases, sides of the film of the liquid may not be in contact with any objects (e.g., one or more walls) during formation of the at least the portion of the 3D object.

The open platform may not have a side wall.

The open platform may include one or more sides (e.g., side walls) that are not bounded. For example, the open platform may not be vat or a container. The open platform may not be part of a vat or a container. The open platform may be a substrate or slab that does not have a depression (e.g., vat or container) for retaining a liquid. In such situations, the liquid may be sufficiently viscous such that the liquid remains on the open platform.

The term "film," as used herein" generally refers to a layer of a material (e.g., a viscous liquid) that is usable to print a 3D object. The film may have a uniform or non-uniform thickness across the film. The film may have an average thickness or a variation of the thickness that is below, within, or above a defined threshold (e.g., a value or a range). The average thickness or the variation of the thickness of the film may be detectable and/or adjustable during the 3D printing. An average (mean) thickness of the film may be an average of thicknesses from at least about 2, 3, 4, 5, 6, 7, 8, 9, 10, 15, 20, 30, 40, 50, 100, 200, 300, 400, 500, 1000, 2000, 3000, 4000, 5000, or more positions within the film. An average (mean) thickness of the film may be an average of thicknesses from at most about 5000, 4000, 3000, 2000, 1000, 500, 400, 300, 200, 100, 50, 40, 30, 20, 15, 10, 9, 8, 7, 6, 5, 4, 3, 2, or 1 position within the film. A variation of the thickness of the film may be a variance (i.e., sigma squared or "$\sigma^2$") or standard deviation (i.e., sigma or "$\sigma$") within a set of thicknesses from the at least about 2, 3, 4, 5, 6, 7, 8, 9, 10, 15, 20, 30, 40, 50, 100, 200, 300, 400, 500, 1000, 2000, 3000, 4000, 5000, or more positions within the film. A variation of the thickness of the film may be a variance or standard deviation within a set of thicknesses from the at most about 5000, 4000, 3000, 2000, 1000, 500, 400, 300, 200, 100, 50, 40, 30, 20, 15, 10, 9, 8, 7, 6, 5, 4, 3, 2, or 1 position within the film.

During 3D printing, one or more parameters (e.g., a speed of deposition of the film adjacent to a surface of the vat or the open platform, a speed of extrusion of the liquid from a nozzle onto the surface of the vat or the open platform, an amount of the liquid extruded onto the surface of the vat or the open platform, intensity and/or exposure time of one or more lights from one or more light sources, etc.) may be maintained or adjusted to maintain or improve print quality (e.g., a quality of the film prior to printing at least a portion of the 3D object, or the printed portion of the 3D object).

The film of the material that is usable to print the 3D object may or may not be re-deposited (e.g., adjacent to a surface of the vat or the open platform) prior to printing at least a portion of the 3D object. In some cases, the film of the material that is usable to print the 3D object may be removed and a new film of the material may be re-deposited prior to printing at least a portion of the 3D object. The material from the removed film may or may not be recycled to deposit the new film. In some examples, the film may be re-deposited until a desired (e.g., pre-determined) thickness, average thickness, or a variation of the thickness is obtained.

The material of the film may be a viscous liquid. In some cases, the viscous liquid may be referred to as a resin. An amount of the viscous liquid in the film of the viscous liquid that is deposited on the build surface may be adjustable during the 3D printing. The amount of the viscous liquid in the film may be detectable and/or adjustable during the 3D printing. In an example, an amount of the viscous liquid in a first film deposited to print a first layer of the 3D object may be the same or different than an amount of the viscous liquid in a second film deposited to print a second layer of the 3D object.

The viscous liquid may be dispensed from a nozzle and over a print window. The viscous liquid may have a viscosity sufficient to be self-supporting on the print window without flowing or sufficient flowing. A self-supporting film of the viscous liquid may not need one or more walls to support the film from one or more sides of the film. The self-supporting film of the viscous liquid may be capable of retaining a thickness and/or a shape of the film for a given amount of time (e.g., 0.1, 0.5, 1, 2, 3, 4, 5, 6, 7, 8, 9, 10 or more minutes) without one or more walls to support the film from one or more sides of the film. The viscosity of the viscous liquid may range between about 4,000 centipoise (cP) to about 2,000,000 cP. The viscous liquid may be pressed (e.g., by a blade or a build head) into a film of the viscous liquid on or over the print window. A thickness of the film of the viscous liquid may be adjustable. The viscous liquid may include a photoactive resin. The photoactive resin may include a polymerizable and/or cross-linkable component (e.g., a polymeric precursor) and a photoinitiator that activates curing of the polymerizable and/or cross-linkable component, to thereby subject the polymerizable and/or cross-linkable component to polymerization and/or cross-linking. The photoactive resin may include a photoinhibitor that inhibits curing of the polymerizable and/or cross-linkable component.

In some examples, the viscous liquid may include a plurality of particles (e.g., metal, non-metal, or both)—in such a case, the viscous liquid may be a slurry or a photopolymer slurry. The viscous liquid may be a paste. The plurality of particles may be added to the viscous liquid. The plurality of particles may be solids or semi-solids (e.g., gels). Examples of non-metal material include ceramic, polymeric, or composite material. The plurality of particles may be suspended throughout the viscous liquid. The plurality of particles in the viscous liquid may have a distribution that is monodisperse or polydisperse. In some examples, the viscous liquid may contain additional optical absorbers and/or non-photoreactive components (e.g., fillers, binders, plasticizers, etc.). The 3D printing may be performed with at least 1, 2, 3, 4, 5, 6, 7, 8, 9, 10 or more viscous liquids. A plurality of viscous liquids comprising different materials (e.g., different photoactive resin and/or different plurality of particles) may be used for printing a multi-material 3D object.

When a film of the viscous liquid is deposited (e.g., adjacent to a build surface of the vat or the open platform), the plurality of particles may be suspended throughout the film in a monodisperse distribution or a polydisperse distribution. The plurality of particles may be suspended across a line parallel to the build surface in a monodisperse distribution (e.g., a uniform density) or a polydisperse distribution (e.g., a non-uniform density). The plurality of particles may be suspected across a thickness or height of the film in a monodisperse distribution or a polydisperse distribution. A density of the plurality of particles across the thickness (e.g., along a z-axis perpendicular to the print surface) of the film at two or more positions across a surface (e.g., on a xy-plane parallel to the print surface) of the film may be uniform or non-uniform. Polydisperse distribution of the plurality of particles across the thickness of the film may be a result of the film deposition process and/or gravity that pulls down the plurality of particles within the film.

The term "particles," as used here, generally refers to any particulate material that may be melted or sintered (e.g., not completely melted). The particulate material may be in powder form. The particles may be inorganic materials. The inorganic materials may be metallic (e.g., aluminum or titanium), intermetallic (e.g., steel alloys), ceramic (e.g., metal oxides) materials, or any combination thereof. In some cases, the term "metal" or "metallic" may refer to both metallic and intermetallic materials. The metallic materials may include ferromagnetic metals (e.g., iron and/or nickel). The particles may have various shapes and sizes. For example, a particle may be in the shape of a sphere, cuboid, or disc, or any partial shape or combination of shapes thereof. The particle may have a cross-section that is circular, triangular, square, rectangular, pentagonal, hexagonal, or any partial shape or combination of shapes thereof. Upon heating, the particles may sinter (or coalesce) into a solid or porous object that may be at least a portion of a larger 3D object or an entirety of the 3D object. The 3D printing may be performed with at least about 1, 2, 3, 4, 5, 6, 7, 8, 9, 10 or more types of particles. As an alternative, the 3D printing may be performed with less than or equal to about 10, 9, 8, 7, 6, 5, 4, 3, 2, or 1 particle, or no particles.

The term "deposition head," as used herein, generally refers to a part that may move across an open platform. The deposition head may move across the open platform and deposit a film of a viscous liquid over a print window of the open platform. The film of the viscous liquid may have a uniform thickness across the print window. The thickness of the film may be adjustable. The deposition head may be coupled to a motion stage adjacent to the open platform. The deposition head may have at least one nozzle to dispense at least one liquid (e.g., viscous liquid) over the print window. The deposition head may have at least one wiper to form the layer of the viscous liquid or remove any excess viscous liquid from the print window. The deposition head may have at least one actuator to adjust a distance between the at least one wiper the print window. In some examples, the deposition head may have a slot die. The deposition head may retrieve any excess viscous liquid from the print window, contain the excess resin within the deposition head, and/or recycle the retrieved viscous liquid when printing subsequent portions of the 3D object. The deposition head may clean the print window.

The 3D printing may be performed with at least 1, 2, 3, 4, 5, 6, 7, 8, 9, 10 or more deposition heads. Each of a plurality of deposition heads may be in fluid communication with a separate source of viscous liquid. The plurality of deposition heads may be used to deposit and cure alternating films of different viscous liquids (e.g., different photoactive resins and/or different inorganic particles). Compartmentalizing different viscous liquids in separate sources and separate deposition heads may improve printing speed and prevent cross-contamination of the different viscous liquids.

The term "nozzle," as used herein, generally refers to a component of the deposition head that directs the viscous liquid towards the open platform comprising the window. The nozzle may include an opening for the viscous liquid to enter and an additional opening for the viscous liquid to exit. In some cases, the nozzle may not comprise any contraction or control mechanism to adjust flow of the viscous liquid towards the open platform. In some cases, the nozzle may comprise a contraction or control mechanism to adjust the flow of the viscous liquid towards the open platform.

The term "wiper," as used herein, generally refers to a part that may be in contact with a print window of an open platform, a viscous liquid, or another wiper. In some examples, the wiper may be a component of a deposition head. The wiper may be in contact with a viscous liquid to press the viscous liquid into a film. The wiper may be in contact with the print window to remove any excess viscous liquid. A distance between the wiper and the print window may be adjustable. In some examples, the wiper may be a component in a cleaning zone. The wiper may be in contact with another wiper to remove any excess viscous liquid. The wiper may have various shapes, sizes, and surface textures. The wiper may be a blade (e.g., a squeegee blade, a doctor blade), roller, or rod (e.g., wire wound rod), for example. The 3D printing may be performed with at least 1, 2, 3, 4, 5, 6, 7, 8, 9, 10 or more wipers. In some cases, the blade is part of the nozzle or attached to the nozzle.

In some cases, one or more lights (e.g., from one or more light sources) may be used to initiate (activate) curing of a portion of the film, thereby to print at least a portion of the 3D object. In some cases, one or more lights (e.g., from one or more light sources) may be used to inhibit (prevent) curing of a portion of the film adjacent to a surface of the film (e.g., a surface adjacent to one or more sides of the vat or a surface of the open platform). In some cases, one or more lights (e.g., from one or more light sources) may be used by one or more sensors to determine a profile and/or quality of the film.

The 3D printing may be performed with one wavelength. The 3D printing may be performed with at least about 2, 3, 4, 5, 6, 7, 8, 9, 10 or more wavelengths that are different. The 3D printing may be performed with at least about 1, 2, 3, 4, 5, 6, 7, 8, 9, 10 or more lights. The 3D printing may be performed with at least about 1, 2, 3, 4, 5, 6, 7, 8, 9, 10 or more light sources, and it may be desirable to prevent curing of a portion of the film adjacent to the surface of the film.

The one or more lights may comprise electromagnetic radiation. The term "electromagnetic radiation," as used herein, generally refers to one or more wavelengths from the electromagnetic spectrum including, but not limited to x-rays (about 0.1 nanometers (nm) to about 10.0 nm; or about $10^{18}$ Hertz (Hz) to about $10^{16}$ Hz), ultraviolet (UV) rays (about 10.0 nm to about 380 nm; or about $8\times10^{16}$ Hz to about $10^{15}$ Hz), visible light (about 380 nm to about 750 nm; or about $8\times10^{14}$ Hz to about $4\times10^{14}$ Hz), infrared (IR) light (about 750 nm to about 0.1 centimeters (cm); or about $4\times10^{14}$ Hz to about $5\times10^{11}$ Hz), and microwaves (about 0.1 cm to about 100 cm; or about $10^{8}$ Hz to about $5\times10^{11}$ Hz).

The one or more light sources may comprise an electromagnetic radiation source. The term "electromagnetic radiation source," as used herein, generally refers to a source that emits electromagnetic radiation. The electromagnetic radiation source may emit one or more wavelengths from the electromagnetic spectrum.

The term "photoinitiation," as used herein, generally refers to a process of subjecting a portion of a film of a liquid (e.g., viscous liquid) to a light to cure a photoactive resin in the portion of the film of the liquid. The light (photoinitiation light) may have a wavelength that activates a photoinitiator that initiates curing of a polymerizable and/or cross-linkable component in the photoactive resin.

The term "photoinhibition," as used herein, generally refers to a process of subjecting a portion of a film of a liquid (e.g., a viscous liquid) to a light to inhibit curing of a photoactive resin in the portion of the film of the liquid. The light (photoinhibition light) may have a wavelength that activates a photoinhibitor that inhibit curing of a polymerizable and/or cross-linkable component in the photoactive resin. The wavelength of the photoinhibition light and another wavelength of a photoinitiation light may be different. In some examples, the photoinhibition light and the photoinitiation light may be projected from the same optical source. In some examples, the photoinhibition light and the photoinitiation light may be projected from different optical sources.

The term "sensor," as used herein, generally refers to a device or a system that provides a feedback (e.g., light absorption spectroscopy, image, video, etc.) indicative of the 3D printing process, e.g., a feedback indicative of the film of the viscous liquid on the build surface. The sensor may be operatively coupled to a controller (e.g., a computer) that controls one or more operations (e.g., depositing the film of the viscous liquid onto the build surface) of the 3D printing. The controller may adjust the one or more operations of the 3D printing, based on the feedback provided by the sensor. The controller may adjust the operation(s) during the 3D printing, and thus such feedback may be a closed loop feedback. The sensor may provide the feedback (i) during calibration of the 3D printing system, (ii) prior to, during, and/or subsequent to depositing the film of the viscous liquid to be used for 3D printing, and/or (iii) prior to, during, or subsequent to solidifying (curing) at least a portion of the film of the viscous liquid to print at least a portion of the 3D object. The sensor may provide the feedback pre-fabrication or post-fabrication of the 3D object. The 3D printing may use at least about 1, 2, 3, 4, 5, 6, 7, 8, 9, 10, or more sensors. The 3D printing may use at most about 10, 9, 8, 7, 6, 5, 4, 3, 2, or 1 sensor.

Examples of the sensor may comprise a detector, vision system, computer vision, machine vision, imager, camera, electromagnetic radiation sensor (e.g., IR sensor, color sensor, etc.), proximity sensor, densitometer (e.g., optical densitometer), profilometer, spectrometer, pyrometer, force sensor (e.g., piezo sensor for pressure, acceleration, temperature, strain, force), motion sensor, magnetic field sensor (e.g., microelectromechanical systems), electric field sensor, chemical sensor, structured-light sensor, etc.

The sensor may be capable of detecting and/or analyzing one or more profiles of various components of the 3D printing system. The various components may be used (e.g., the print window) and/or generated (e.g., the film of viscous liquid) during the 3D printing process. The term "profile," as used herein, generally refers to a view (e.g., image or video) and/or electromagnetic spectrum with respect to such components. The view may be a side view, bottom-up view, or top-down view. The view may comprise an outline, silhouette, contour, shape, form, figure, structure of the components. The electromagnetic spectrum may be absorption, emission, and/or fluorescence spectrum of at least a portion of the electromagnetic radiation (e.g., IR radiation). The profiles may be indicative of one or more features of the components. In an example, the sensor may be capable of sensing or detecting and/or analyzing zero-dimensional (e.g., a single point), one-dimensional (1D), two-dimensional (2D), and/or 3D profiles (e.g., features) of the components.

The sensor may capture profiles of the build surface (e.g., a portion of the vat or the open platform), a surface of the build head that is configured to hold at least a portion of the 3D object during printing, or a surface of a previously deposited layer of the 3D object adjacent to the build head.

The feedback from the sensor may be one or more images of the film of the viscous liquid or any excess viscous liquid remaining on the build surface after printing at least a portion of the 3D object. The feedback from the sensor may be one or more videos (e.g., for a duration of time) of the film of the viscous liquid or the excess viscous liquid remaining on the build surface.

The feedback provided by the sensor may comprise one or more internal or external features (e.g., temperature, transparency or opacity, surface texture, thickness, shape, size, length, area, pattern, density of one or more particles embedded in the film, defects, etc.) of the film deposited on or adjacent to the build surface. In an example, the sensor provides such feedback of the film prior to solidifying (e.g., curing, polymerizing, cross-linking) a portion of the film into at least a portion of the 3D object. In another example, the sensor provides such feedback of any excess viscous liquid remaining on the print surface after the portion of the film is solidified (e.g., cured, polymerized, cross-linked) into the at least a portion of the 3D object and removed from the build surface (e.g., by the build head). The feedback may comprise the one or more internal or external features of at least a portion of a 3D object printed on the build head, or a portion of a non-printed 3D object on the build head onto which at least a portion of a 3D object is to be printed.

The sensor may be capable of measuring an energy that is emitted, reflected, or transmitted by a medium (e.g., the film of the viscous liquid on the build surface). The sensor may be capable of measuring an energy density, comprising: electromagnetic energy density, optical energy density, reflectance density, transmittance density, absorbance density, spectral density, luminescence (fluorescence, phosphorescence) density, and/or electron density. Such energy density may be indicative of an amount, concentration, and/or density of one or more components (e.g., one or more particles) within one or more points, lines, or areas within the film of the viscous liquid.

The sensor may be operatively coupled to a source of energy for sensing, wherein at least a portion of energy for sensing is measured by the sensor as a feedback indicative of the 3D printing process. Such energy for sensing may be electromagnetic radiation (e.g., from ambient light or from an electromagnetic radiation source) and/or electrons (e.g., from an electron beam). In an example, the sensor may be an IR sensor (e.g., an IR camera), and the source of energy may be an IR light source. In such a case, the IR sensor may detect at least a portion of the IR light from the IR light source that is being reflected by or transmitted from (i) the film of the viscous liquid adjacent to the build surface, or (ii) any excess viscous liquid remaining on the build surface. The IR light being reflected by or transmitted from the film of the viscous liquid or any excess viscous liquid may be zero-dimensional (a point), 1D (a line), or 2D (a plane).

A single sensor may be operatively coupled to a single source of energy for sensing. A single sensor may be operatively coupled to at least 2, 3, 4, 5, 6, 7, 8, 9, 10, or more sources of energy for sensing that are the same or different. A single sensor may be operatively coupled to at most 10, 9, 8, 7, 6, 5, 4, 3, or 2 sources of energy for sensing that are the same or different. A single source of energy for sensing may be operatively coupled to at least 2, 3, 4, 5, 6, 7, 8, 9, 10, or more sensors that are the same or different. A single source of energy for sensing may be operatively coupled to at most 10, 9, 8, 7, 6, 5, 4, 3, or 2 sensors that are the same or different.

One or more sensors and one or more sources of energy for sensing may be part of a same system (e.g., a single enclosed unit) or different systems. The one or more sensors may be disposed below, within, on, and/or over the build surface. The one or more sensors and the one or more sources of energy for sensing may be on a same side or opposite sides of a component of the 3D printing system (e.g., the window comprising the build surface, the film of the viscous liquid adjacent to the build surface, etc.). In some cases, the one or more sensors and the one or more sources of energy may be in contact with the window comprising the build surface, the film of the viscous liquid adjacent to the build surface, and/or any excess viscous liquid remaining on the build surface subsequent to printing a layer of the 3D object. In some cases, the one or more sensors and the one or more sources of energy may not be in contact with the window comprising the build surface, the film of the viscous liquid adjacent to the build surface, and/or any excess viscous liquid remaining on the build surface subsequent to printing a layer of the 3D object.

The sensor may not be in contact with the film of the viscous liquid while generating the feedback. The sensor may be in contact with the film of the viscous liquid while generating the feedback.

The sensor and/or the source of energy for sensing may be stationary with respect to the build surface (e.g., the print window). The sensor and/or the source of energy for sensing may be movable with respect to the build surface. Such movement may be a relative movement, and thus the moving piece may be the sensor, the source of energy for sensing, and/or the build surface.

The one or more sensors may be operatively coupled to a controller (e.g., a computer) capable of employing artificial intelligence (e.g., one or more machine learning algorithms) to analyze a database comprising a plurality of feedbacks indicative of various components of the 3D printing system, such as the film of the viscous liquid on the build surface or of any excess viscous liquid remaining on the build surface after printing a portion of the 3D object. One or more machine learning algorithms of the artificial intelligence may be capable of distinguishing or differentiating profiles (e.g., features) of a film of the viscous liquid on or adjacent to the build surface based on the database. Such features may comprise the film quality, film thickness, density of one or more components (e.g., one or more particles, etc.) in the film, or one or more defects (e.g., bubbles, wrinkles, pre-polymerized particulates, etc.).

The database may further comprise a plurality of training data sets that comprise example feedback indicative of the features of the film. The plurality of training data sets may allow the machine learning algorithm(s) to learn a plurality of parameters to generate one or more models (e.g., mathematical models, classifiers) that can be used to distinguish or differentiate the features of a new film of the viscous liquid received from the one or more sensors during the 3D printing. In an example, the feedback from a sensor may be an optical (e.g., IR) densitometry profile of the film of the viscous liquid. In such a case, the trained machine learning algorithm may be used to distinguish (i) a variation in optical density due to a height defect across the film, (ii) a variation in optical density due to voids (e.g., bubbles, streaks, etc.) in the film, and (iii) a variation in optical density due to a difference in the density of one or more particles (e.g., metal or ceramic particles) in the film.

In some cases, a series of machine learning algorithms may be connected as an artificial neural network to better recognize, categorize, and/or classify each feature of the film of the viscous liquid or each feature of any excess viscous liquid remaining on the build surface from the feedback of the one or more sensors. In some cases, an artificial intelligence system capable of acquiring, processing, and analyzing image and/or video feedbacks from the one or more sensors, and such system may be referred to as computer vision.

In some cases, the one or more machine learning algorithms may use deep learning algorithms. The deep learning algorithms may be capable of generating new classifications (e.g., categories, sub-categories, etc.) of one or more features of the viscous liquid or the film of the viscous liquid, based on a new feedback and a database comprising a plurality of previous feedbacks and example feedbacks. The deep learning algorithms may use the new classifications to distinguish or differentiate the features of the viscous liquid or the film of the viscous liquid.

The term "diffuser," as used herein, generally refers to a sheet (e.g., a plate) or a film (e.g., a laminate or coating on an optical lens or a window) that diffuses energy (e.g., light). The diffuser may scatter or filter the energy. In some cases, the diffuser may receive one or more electromagnetic radiations (e.g., IR lights) on a first side of the diffuser, then transmit scattered (e.g., distributed, evenly distributed, etc) electromagnetic radiations from a second side of the diffuser opposite the first side. The transmitted scattered electromagnetic radiations may form a flood electromagnetic radiation. The diffuser may eliminate bright spots corresponding to location(s) of one or more electromagnetic radiation sources. In some cases, flux of the scattered electromagnetic radiations from the diffuser may be independent of angle with respect to the diffuser and/or of position within a surface of the diffuser. The diffuser may diffuse the one or more electromagnetic radiations that are being received by the one or more sensors, thereby reducing directionality of the one or more light sensors with respect to the one or more electromagnetic radiation sources. In some cases, the diffuser may cause light to spread evenly across a surface (e.g., a surface of the diffuser), thereby minimizing or removing high intensity bright spots as the light travels through the diffuser.

The diffuser may be disposed between the one or more sources of energy (e.g., one or more electromagnetic radiations) for sensing and the corresponding sensor(s). In an example, the diffuser may diffuse the one or more electromagnetic radiations (e.g., one or more IR lights) and direct the scattered electromagnetic radiations towards a build surface (e.g., a print window), to the film of the viscous liquid, and to the corresponding sensor(s) (e.g., one or more IR sensors). In some cases, the scattered electromagnetic radiations may be directed to the film of the viscous liquid without passing through the build surface. In another example, the diffuser may be adjacent to the one or more sensor(s).

The diffuser may be transparent, semi-transparent, semi-opaque, or opaque. The diffuser may be ceramic, polymeric (e.g., polycarbonate, polytetrafluoroethylene (PTFE), etc.), or a combination thereof. Examples of the diffuser comprise a holographic diffuser, a white diffusing glass, and a ground glass diffuser. Other examples of the diffuser include paper or fabric.

One or more surfaces of the diffuser may comprise a matte finish on its surface to further assist in scattering the one or more electromagnetic radiations. The diffuser may not be a mirror. During the 3D printing process, at least about 1, 2, 3, 4, 5, or more diffusers may be used. During the 3D printing process, at most about 5, 4, 3, 2, or 1 diffuser may be used.

The 3D printing system may be surrounded by an enclosure (e.g., a case or fabric). The enclosure may prevent external energy (e.g., ambient light) from interfering with one or more lights used during the 3D printing.

The term "green body," as used herein, generally refers to a 3D object that has a polymeric material and a plurality of particles (e.g., metal, ceramic, or both) that are encapsulated by the polymeric material. The plurality of particles may be in a polymer (or polymeric) matrix. The plurality of particles may be capable of sintering or melting. The green body may be self-supporting. The green body may be heated in a heater (e.g., in a furnace) to burn off at least a portion of the polymeric material and coalesce the plurality of particles into at least a portion of a larger 3D object or an entirety of the 3D object.

The present disclosure provides methods and systems for forming a 3D object. Such methods may employ application of a film of a liquid adjacent to an open platform and exposing the film to light to subject at least a portion of the film to polymerization and/or cross-linking. The 3D object may be based on a computer model of the 3D object, such as a computer-aided design (CAD) stored in a non-transitory computer storage medium (e.g., medium).

Methods and Systems for 3D Printing

An aspect of the present disclosure provides a method for printing a 3D object. The method may comprise providing, adjacent to a build surface, a film comprising a polymeric precursor. The method may comprise using a sensor to determine a profile of the film, which profile is indicative of a quality of the film. The method may comprise determining if the profile meets a quality threshold. The method may comprise, if the profile meets a quality threshold, using a light source to expose at least a portion of the film to light to initiate formation of a polymeric material from said polymeric precursor, thereby printing at least a portion of said 3D object. Alternatively, the method may comprise, if the profile does not meet the quality threshold, adjusting or redepositing said film.

Adjusting the film may comprise redistributing the film. In some cases, the film may be pressed (e.g., by a doctor blade of a deposition head) to redistribute the viscous liquid in the film, thereby to re-flatten the film and adjust a thickness of the film. In some cases, additional viscous liquid may be deposited on the film (e.g., by the deposition head) to fill in defects (e.g., voids) in the film. In some cases, redistributing the film may comprise treating the film with an external source of energy (e.g., sound energy) to redistribute one or more components (e.g., one or more particles) in the film. In an example, sound energy may be directed to the film to induce sonication within the film, thereby to (i) remove one or more voids in the film, and/or (ii) redistribute one or more particles to adjust the gradient of the one or more particles in the film.

Redepositing the film may comprise removing at least a portion of the film from the build surface and depositing an additional film adjacent to said build surface. In some cases, the at least the portion of the film from the build surface may be used to deposit the additional film. In some cases, an additional viscous liquid may be added (e.g., by the deposition head) to the at least the portion of the film from the build surface to deposit the additional film. In some cases, the at least the portion of the film from the build surface may be removed (e.g., discarded), and new viscous liquid may be used to deposit the additional film.

In some cases, the film may comprise a liquid (e.g., a viscous liquid) that comprises the polymeric precursor. The viscous liquid may be used for printing the at least the portion of the 3D object. The viscous liquid may comprise a photoactive resin to form a polymeric material. The photoactive resin may comprise the polymeric precursor of the polymeric material. The photoactive resin may comprise at least one photoinitiator that is configured to initiate formation of the polymeric material from the polymeric precursor (e.g., initiate formation of the polymeric material from the polymeric precursor away from the print window). The photoactive resin may comprise at least one photoinhibitor that is configured to inhibit formation of the polymeric material from the polymeric precursor (e.g., inhibit formation of the polymeric material from the polymeric precursor adjacent to the print window). The photoinitiator and the photoinhibitor may be activated by two wavelengths that are different. The two wavelengths for the photoinitiator and the photoinhibitors, respectively, may be from a same optical source or different optical sources. The viscous liquid may comprise a plurality of particles usable for forming the at least the portion of the 3D object.

The build surface may comprise a print window, and the film comprising the polymeric precursor may be provided adjacent to the print window. The build surface (e.g., the build surface comprising the print window) may be part of a vat that retains the film. The build surface may be part of an open platform configured to hold the film comprising the polymeric precursor.

At least a portion of the open platform may comprise the window. The window may be the open platform or part of the open platform. For example, at least about 10%, 15%, 20%, 25%, 30%, 35%, 40%, 45%, 50%, 55%, 60%, 65%, 70%, 75%, 80%, 85%, 90%, 95%, or more of open platform may comprise the window. As another example, at most about 95%, 90%, 85%, 80%, 75%, 70%, 65%, 60%, 55%, 50%, 45%, 40%, 35%, 30%, 25%, 20%, 15%, 10%, or less of the open platform may comprise the window. In some cases, the open platform may be the window. A surface of the open platform comprising the window may be flat.

The window may be transparent or semitransparent (translucent). The window may be comprised of an optical window material, such as, for example, glass or a polymeric material (e.g., polymethylmethacrylate (PMMA)). In some cases, the window may be comprised of polydimethylsiloxane (PDMS) that is permeable to oxygen. During printing, the oxygen dissolved in the window may (i) diffuse into a contact surface between the window and the viscous liquid comprising the photoactive resin (the window-viscous liquid interface) and (ii) inhibit curing of the photoactive resin at the contact surface. The window may be positioned above the optical source for photopolymer-based 3D printing using bottom-up illumination. As an alternative, the window may be positioned below the optical source. As another alternative, the window may be positioned between a first optical source and a second optical source.

The quality of the film comprising the polymeric precursor may be determinative of a material or structural quality of the 3D object that is being printed. The profile of the film may be analyzed (e.g. by the computer) to obtain information indicative of the one or more features of the film. The quality of the film may be determined by identifying and/or characterizing one or more features in the film, comprising one or more dimensions (e.g., height or thickness, width, area, defects, etc.), volume, shape or pattern (e.g., a projectile 2D pattern), temperature, and/or viscosity. The quality of the film may be determined by identifying and/or characterizing one or more defects in the film (e.g., on a surface of the film, in the film, etc.). Examples of the one or more defects comprise voids, holes, thinning, thickening, bubbles, lines, wrinkles, phases, foreign artifacts (e.g., dusts), non-uniform densities of one or more components (e.g., one or more metal or non-metal particles), and/or pre-polymerized particulates of the polymeric precursor.

The sensor may be used to determine the quality of the film prior to printing and/or during printing the at least the portion of the 3D object. The quality of the film may be determined optically, e.g., by taking an image or video of the film by using the sensor. The sensor or a controller (e.g., a computer) operatively coupled to the sensor may compare such optical feedback (e.g., the image or video of the film) to a reference to determine the quality of the film. The reference may be a computer model of the film or one or more pre-determined features of the film. In some cases, the sensor may comprise or be operatively coupled to artificial intelligence (e.g., a trained machine learning algorithm) to identify the one or more features in the film indicative of the film quality.

The method of 3D printing may further comprise using the profile of the film comprising the polymeric precursor to determine a variation of one or more profiles of the film. In some cases, an average value and/or variation (e.g., standard deviation, standard error) of one or more features (e.g., thickness, width(s), area, defects, etc.) of the film may be determined (e.g., calculated). Such average value and/or variation may be compared to a reference (e.g., a threshold value) to determine the film quality. The reference may be a threshold value that is pre-determined for the 3D printing process, or pre-determined for each film comprising the polymeric precursor. The threshold value may be a pre-determined value of the one or more features of the film or a predetermined range of values of the one or more features. In some cases, the threshold may be met when the average value and/or its variation is below the threshold value, equal to the threshold value, greater than the threshold value, or any combination thereof. The threshold value may be an upper limit value and/or a lower limit value of the one or more features of the film.

If the variation of the profile of the film meets the threshold value, the at least the portion of the film may be exposed to light to initiate formation of the polymeric material from the polymeric precursor, thereby printing the at least the portion of the 3D object. If the variation of the profile of the film does not meet the threshold value, the film comprising the polymeric precursor may be removed (e.g., by the deposition head) from the build surface, and a new film comprising the polymeric precursor may be deposited on the build surface.

When removing a previously deposited film of a liquid comprising the polymeric precursor and subsequently depositing a new film of the liquid, the liquid comprising the polymeric precursor from the removed film may be re-used to deposit the new film on the build surface. Alternatively or in addition to, an additional liquid comprising the polymeric precursor may be used (e.g., added) to deposit the new film on the build surface. In some cases, one or more operations of the 3D printing process may or may not be adjusted (e.g., by the controller) prior to depositing the new film on the build surface, based on the sensor's feedback comprising the profile of the film. Such feedback may be a closed loop feedback. Examples of the operations of the 3D printing process that may be adjusted based on the closed loop feedback from the sensor include changing an amount of the liquid comprising the polymeric precursor to be used by the deposition head to deposit the film, changing a source of the liquid comprising the polymeric precursor (e.g., selecting a source from a plurality of sources), changing a pre-determined thickness of the film (e.g., changing a distance between a wiper of the deposition head and the print window), changing a speed of movement of the deposition head during deposition of the film on the print window, and changing a direction of movement of the deposition head during deposition of the film (e.g., from left-to-right or right-to-left).

The profile may be a thickness profile of the film, and the quality threshold may be an average or variation (e.g., a variance or standard deviation) of the average thickness of the film. After the film comprising the polymeric precursor is deposited at a pre-determined thickness on a build surface, the sensor may provide an optical feedback (e.g., an image or video based on IR radiation reflected by or transmitted from the film) and determine (e.g., by the controller) the average thickness and/or the variation of the average thickness of the film. In some cases, if the determined average and/or variation of the film thickness meets the quality threshold (e.g., is equal to or below the pre-determined thickness variation value), the 3D printing process may proceed by exposing the at least the portion of the film to light (e.g., photoinitiation light) to initiate formation of the polymeric material from the polymeric precursor, thereby printing the at least the portion of the 3D object. In some cases, if the determined average and/or variation of the film thickness does not meet the quality threshold (e.g., is above the pre-determined thickness variation value), the film may be removed from the build surface (e.g., by the deposition head) and a new film comprising the polymeric precursor may be deposited (e.g., by the deposition head) on the build surface. Subsequently, the sensor may be used to determine a profile of the new film, which profile is indicative of a quality of the new film. If the profile of the new film meets the quality threshold, the 3D printing process may proceed by initiating formation of a polymeric material from the polymeric precursor in the new film. Such methods described herein may be implemented to other features of the film, such as, for example, width of the film, cross-sectional area of the film, or a density of one or more particles (e.g., metallic or non-metallic particles) in the film.

The sensor may be configured to measure a thickness of a single position of the film (e.g., a single point on the xy-plane of the film parallel to the print window) comprising the polymeric precursor. In such a case, the sensor may be operated multiple times to measure a plurality of thicknesses corresponding to a plurality of positions of the film. Alternatively or in addition to, the sensor may be configured to measure a 1D optical profile (e.g. one or more lines), one or more 2D images, or one or more videos of the film and analyze the 1D optical profile, image(s), and/or video(s) to obtain (e.g., by using a computer system), one or more thicknesses of one or more positions of the film.

In some cases, the threshold value of the standard deviation of the average film thickness may range between about 0.001 millimeter (mm) to about 0.1 mm. The threshold value of the standard deviation of the average film thickness may be at least about 0.001 mm, 0.002 mm, 0.003 mm, 0.004 mm, 0.005 mm, 0.006 mm, 0.007 mm, 0.008 mm, 0.009 mm, 0.01 mm, 0.02 mm, 0.03 mm, 0.04 mm, 0.05 mm, 0.06 mm, 0.07 mm, 0.08 mm, 0.09 mm, 0.1 mm, or more. The threshold value of the standard deviation of the average film thickness may be at most about 0.1 mm, 0.09 mm, 0.08 mm, 0.07 mm, 0.06 mm, 0.05 mm, 0.04 mm, 0.03 mm, 0.02 mm, 0.01 mm, 0.009 mm, 0.008 mm, 0.007 mm, 0.006 mm, 0.005 mm, 0.004 mm, 0.003 mm, 0.002 mm, 0.001 mm, or less. In some cases, the threshold value of the standard deviation of the average thickness of the film may range between about 0.1 percent (%) to about 20% of the average thickness of the film. The threshold value of standard deviation of the average thickness of the film may be at least about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 30%, or more. The threshold value of standard deviation of the average thickness of the film may be at most about 30%, 20%, 19%, 18%, 17%, 16%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, 0.1%, or less.

The profile may be a width profile of the film, and the quality threshold may be an average or variation of the width of the film. The width may be parallel or perpendicular to a movement of the deposition head as it moves across the build surface. In an example, the deposition head may move along the y-axis of the build surface, and a dimension of the film along the x-axis of the build surface may be used as the width of the film. The width of the film may be indicative of a volume of the viscous liquid comprising the polymeric precursor in the film. After the film comprising the polymeric precursor is deposited to a pre-determined area, the sensor may provide an optical feedback and determine an average width of the film. The average width of the film may be measured in real time as an indication of a volume of the viscous liquid deposited in the film, and the estimated volume of the viscous liquid may be used as a closed loop control of the volume of the viscous liquid in the film. As such, the controller may be configured to increase and/or decrease an amount of the viscous liquid to be deposited for a subsequent film of the viscous liquid to adhere to a pre-determined setting of the volume of the viscous liquid.

In some cases, if the determined average film width meets the quality threshold (e.g., is equal to or greater than the pre-determined film width), the 3D printing process may proceed by initiating formation of a polymeric material from the polymeric precursor in the film. In some cases, if the determined average film width does not meet the quality threshold (e.g., less than the pre-determined film width), the film comprising the polymeric precursor may be removed and a new film comprising the polymeric precursor may be deposited. The viscous liquid from the removed film and an additional amount of the viscous liquid (e.g., from a nozzle in fluid communication with a source of the viscous liquid) may be combined to deposit the new film, such that the new film may meet the film width quality threshold. In some cases, if the determined average film width does not meet the quality threshold (e.g., less than the pre-determined film width), but the film is determined to be sufficient for printing at least a portion of the 3D object, the 3D printing process may proceed by initiating formation of a polymeric material from the polymeric precursor in the film. When depositing a new layer of the film for a subsequent portion of the 3D object to be printed, an amount of the viscous liquid to be used for the new layer may be adjusted (e.g., increased), such that the new film may meet the film width quality threshold.

In some cases, the determined average film width may not meet the quality threshold by exceeding a pre-determined range of the width of the film. In such a case, the 3D printing process may be adjusted to reduce the additional amount of the viscous liquid (e.g., from the nozzle in fluid communication with the source of the viscous liquid) that is to be added in printing one or more subsequent portions (e.g., layers) of the 3D object.

Alternatively or in addition to, an area (e.g., a projectile area) and/or shape of the film may be used in place of the width of the film to assess film quality.

A relationship between (i) the width or area of the film and (ii) the volume of the viscous liquid in the film may be defined by a factor (e.g. a constant value). The relationship may assume a constant thickness of the film (e.g., about 50 micrometer (m)). The factor may be used to convert (i) the width or area of the film to (ii) the volume of the viscous liquid in the film. The factor may be used by the controller to determine an amount of the viscous liquid in the film prior to and/or subsequent to printing at least a portion (e.g., a layer) of the 3D object. The factor may be used by the controller to determine an amount of the viscous liquid to be added to or removed when depositing a new film of the viscous liquid. In some cases, the factor may be used by the controller to determine an amount of the viscous liquid to be added to or removed from the amount that may otherwise be dispensed onto the build surface to print the new film of the viscous liquid. The factor may be a pre-determined value at a pre-determined constant thickness (e.g., 0.01 milliliter (mL) of viscous liquid per 1 mm of film width, or 0.01 mL of viscous liquid per 1 mm$^2$ of film area). The factor may be universal for a plurality of different viscous liquids (e.g., different compositions) or specific for each type of viscous liquid.

In some cases, the factor may range from about 0.0001 mL/mm to about 1 mL/mm. The factor may range from at least about 0.0001 mL/mm, 0.0002 mL/mm, 0.0003 mL/mm, 0.0004 mL/mm, 0.0005 mL/mm, 0.006 mL/mm, 0.0007 mL/mm, 0.0008 mL/mm, 0.0009 mL/mm, 0.001 mL/mm, 0.002 mL/mm, 0.003 mL/mm, 0.004 mL/mm, 0.005 mL/mm, 0.006 mL/mm, 0.007 mL/mm, 0.008 mL/mm, 0.009 mL/mm, 0.01 mL/mm, 0.02 mL/mm, 0.03 mL/mm, 0.04 mL/mm, 0.05 mL/mm, 0.06 mL/mm, 0.07 mL/mm, 0.08 mL/mm, 0.09 mL/mm, 0.1 mL/mm, 0.2 mL/mm, 0.3 mL/mm, 0.4 mL/mm, 0.5 mL/mm, 0.6 mL/mm, 0.7 mL/mm, 0.8 mL/mm, 0.9 mL/mm, 1 mL/mm, or more. The factor may range from at most about 1 mL/mm, 0.9 mL/mm, 0.8 mL/mm, 0.7 mL/mm, 0.6 mL/mm, 0.5 mL/mm, 0/4 mL/mm, 0.3 mL/mm, 0.2 mL/mm, 0.1 mL/mm, 0.09 mL/mm, 0.08 mL/mm, 0.07 mL/mm, 0.06 mL/mm, 0.05 mL/mm, 0.04 mL/mm, 0.03 mL/mm, 0.02 mL/mm, 0.01 mL/mm, 0.009 mL/mm, 0.008 mL/mm, 0.007 mL/mm, 0.006 mL/mm, 0.005 mL/mm, 0.004 mL/mm, 0.003 mL/mm, 0.002 mL/mm, 0.001 mL/mm, 0.0009 mL/mm, 0.0008 mL/mm, 0.0007 mL/mm, 0.0006 mL/mm, 0.0005 mL/mm, 0.0004 mL/mm, 0.0003 mL/mm, 0.0002 mL/mm, 0.0001 mL/mm, or less.

In some cases, the factor may range from about 0.0001 mL/mm$^2$ to about 1 mL/mm$^2$. The factor may range from at least about 0.0001 mL/mm$^2$, 0.0002 mL/mm$^2$, 0.0003 mL/mm$^2$, 0.0004 mL/mm$^2$, 0.0005 mL/mm$^2$, 0.006 mL/mm$^2$, 0.0007 mL/mm$^2$, 0.0008 mL/mm$^2$, 0.0009 mL/mm$^2$, 0.001 mL/mm$^2$, 0.002 mL/mm$^2$, 0.003 mL/mm$^2$, 0.004 mL/mm$^2$, 0.005 mL/mm$^2$, 0.006 mL/mm$^2$, 0.007 mL/mm$^2$, 0.008 mL/mm$^2$, 0.009 mL/mm$^2$, 0.01 mL/mm$^2$, 0.02 mL/mm$^2$, 0.03 mL/mm$^2$, 0.04 mL/mm$^2$, 0.05 mL/mm$^2$, 0.06 mL/mm$^2$, 0.07 mL/mm$^2$, 0.08 mL/mm$^2$, 0.09 mL/mm$^2$, 0.1 mL/mm$^2$, 0.2 mL/mm$^2$, 0.3 mL/mm$^2$, 0.4 mL/mm$^2$, 0.5 mL/mm$^2$, 0.6 mL/mm$^2$, 0.7 mL/mm$^2$, 0.8 mL/mm$^2$, 0.9 mL/mm$^2$, 1 mL/mm$^2$, or more. The factor may range from at most about 1 mL/mm$^2$, 0.9 mL/mm$^2$, 0.8 mL/mm$^2$, 0.7 mL/mm$^2$, 0.6 mL/mm$^2$, 0.5 mL/mm$^2$, 0/4 mL/mm$^2$, 0.3 mL/mm$^2$, 0.2 mL/mm$^2$, 0.1 mL/mm$^2$, 0.09 mL/mm$^2$, 0.08 mL/mm$^2$, 0.07 mL/mm$^2$, 0.06 mL/mm$^2$, 0.05 mL/mm$^2$, 0.04 mL/mm$^2$, 0.03 mL/mm$^2$, 0.02 mL/mm$^2$, 0.01 mL/mm$^2$, 0.009 mL/mm$^2$, 0.008 mL/mm$^2$, 0.007 mL/mm$^2$, 0.006 mL/mm$^2$, 0.005 mL/mm$^2$, 0.004 mL/mm$^2$, 0.003 mL/mm$^2$, 0.002 mL/mm$^2$, 0.001 mL/mm$^2$, 0.0009 mL/mm$^2$, 0.0008 mL/mm$^2$, 0.0007 mL/mm$^2$, 0.0006 mL/mm$^2$, 0.0005 mL/mm$^2$, 0.0004 mL/mm$^2$, 0.0003 mL/mm$^2$, 0.0002 mL/mm$^2$, 0.0001 mL/mm$^2$, or less.

The method of 3D printing may further comprise (i) exposing the film comprising the polymeric precursor to an additional light (i.e., the sensor light) and (ii) using the sensor to detect at least a portion of the additional light that is transmitted through the film. The sensor and a source of the sensor light may be disposed on a same side (e.g., on a same surface of the print window) or on opposite sides (e.g., on opposite surfaces of the print window) of the film. In an example, the sensor light may be directed from a first side of the print window and towards the print window (e.g., transparent or semi-transparent glass or polymer), transmitted through the print window and into the film on or adjacent to a second side of the print window opposite the first side, and transmitted through the film and into the sensor disposed adjacent to (e.g., above) the film and on the second side of the print window.

Alternatively or in addition to, the method of 3D printing may further comprise (i) exposing the film to the sensor light and (ii) using the sensor to detect at least a portion of the sensor light that is reflected by the film. The sensor and a source of the sensor light may be disposed on a same side (e.g., a same surface) of the film. In some cases, the sensor light may be directed towards an exposed surface of the film, and the film may reflect at least a portion of the sensor light back through the exposed surface of the film and to the sensor. The exposed surface may be a top surface of the film away from the build surface, or one or more vertical sides of the film not in contact with the build surface. In some cases, the sensor light may be directed through the build surface (e.g., the print window) and to the film, and the film may reflect at least a portion of the sensor light back through the build surface and to the sensor disposed adjacent to (e.g., below) the build surface and away from the film.

The controller may be configured to convert transmittance, optical density or absorbance, and/or reflectance of the sensor light into a profile of the film (e.g., thickness, volume, etc.). The transmittance may be defined as the ratio of the light transmitted through the film to the light incident upon it. The optical density or absorbance may be defined as the logarithm of the reciprocal of the transmittance. The reflectance may be defined as the ratio of the light reflected from the film to the light incident upon it. In an example, films with different known and verified thicknesses may be printed to obtain a film thickness transmittance and/or reflectance of the sensor light. Subsequently, the thickness vs. sensor light transmittance/reflectance plot may be used to convert any future detection of the sensor light transmittance/reflectance into a respective film thickness.

The optical feedback of the sensor may be an optical profile (e.g., a 2D optical image and/or video) of the film of the viscous liquid or a portion thereof. The optical profile may be transmittance of the sensor light through the film of the viscous liquid and/or reflectance of the sensor light by the film of the viscous liquid. The controller operatively in communication with the sensor may be configured to quantitatively measure optical density of the transmitted and/or reflected sensor light in the optical profile of the film, thereby generating a densitometry of the film. Thus, the sensor, the sensor light source that is configured to provide the sensor light, and the controller may serve as a densitometer to measure 0D, 1D, 2D, and/or 3D optical density of the film. The optical density of the film may be indicative of the density of one or more components in the film, such as, for example, one or more particles in the film. While a profilometer may be able to provide a surface profile (e.g., smoothness, roughness, etc.) of the film of the viscous liquid, the profilometer may not be able to provide the optical density of the film of the viscous liquid.

The light (i.e., photoinitiation light) to initiate formation of the polymeric material from the polymeric precursor may have a first wavelength, and the additional light (i.e., sensor light) for the sensor may have a second wavelength. In some cases, the second wavelength may be different than the first wavelength. In some cases, the photoinitiation light may comprise wavelengths ranging between about 420 nanometers (nm) to about 510 nm. In an example, the first wavelength to induce photoinitiation is about 460 nm. In some cases, the additional light may comprise IR wavelengths ranging between about 700 nm to about 1000 nm. In some cases, the additional light may comprise a IR wavelength of about 850 nm. In an example, the additional light may comprise (i) near IR wavelengths ranging between about 700 nm to about 1.5 micrometer (µm), (ii) medium IR wavelengths ranging between about 1.5 µm to about 4 µm, (iii) and/or far IR wavelengths ranging between about 4 µm to about 1 millimeter. In some cases, the additional light may comprise the visible red wavelengths ranging between about 620 nm to about 700 nm.

In some cases, the light for photoinitiation and the additional light for the sensor may be provided by a same light source (e.g., a dual-wavelength projector, such as a dual-wavelength laser). Such light source may be adjacent to the build surface (e.g., the print window) and away from the film comprising the polymeric precursor. Alternatively or in addition to, such light source may be disposed on a same side of the build surface as the film comprising the polymeric precursor.

In some cases, the light for photoinitiation may be provided by a light source (i.e., a photoinitiation light source), and the additional light for the sensor may be provided by an additional light source (i.e., a sensor light source). The photoinitiation light source and the sensor light source may be different. In an example, the photoinitiation light source and the sensor light source are different. The photoinitiation light source and the sensor light source may be on a same side or opposite sides of the build surface. The photoinitiation light source and/or the sensor light source may be adjacent to the build surface (e.g., print window) and away from the film comprising the polymeric precursor. Alternatively or in addition to, the photoinitiation light source and/or the sensor light source may be disposed on a same side of the build surface as the film comprising the polymeric precursor.

The method of 3D printing may further comprise using a diffuser (e.g., an optical diffuser), located adjacent to the build surface (e.g., print window) and away from the film comprising the polymeric precursor, to diffuse the additional light (i.e., the sensor light). In some cases, sensor light source (e.g., the radiation source) may direct the sensor light (e.g., IR radiation) towards the diffuser, and the diffuser may scatter at least a portion of the IR radiation and direct the scattered sensor light towards the film comprising the polymeric precursor. Alternatively or in addition to, the diffuser maybe located adjacent to the film comprising the polymeric precursor and away from the build surface.

The diffuser may be stationary with respect to the build surface (e.g., the print window). The diffuser may be movable with respect to the build surface. Such movement may be a relative movement, and thus the moving piece may be the diffuser and/or the build surface. The diffuser may be stationary with respect to the additional light source (i.e., the sensor light source). The diffuser may be movable with respect to the additional light source. Such movement may be a relative movement, and thus the moving piece may be the diffuser and/or the additional light source. The diffuser may be configured to move parallel and/or vertical to the build surface. In some cases, the diffuser may be configured to move at least in a linear or non-linear (e.g., circular) direction that is parallel to the build surface. In some cases, the diffuser may be moved away from the build surface such that the diffuser does not interfere with the path of the light (i.e., the photoinitiation light) from the light source and towards the film of polymeric precursor disposed on or adjacent to the build surface. As such, in some cases, the diffuser may be mechanically coupled to various mechanical structures (e.g., motors) for moving the diffuser in a direction towards or away from the path of the light. The various mechanical structures may be configured to move the diffuser in a direction towards or away from the build surface.

At least about 1, 2, 3, 4, 5, 6, 7, 8, 9, 10, or more diffusers may be used to diffuse the additional light. At most about 10, 9, 8, 7, 6, 5, 4, 3, 2, or 1 diffuser may be used to diffuse the additional light. When using a plurality of diffusers, the plurality of diffusers may or may not be disposed on top of each other. The plurality of diffusers may move relative to each other.

The profile of the film comprising the polymeric precursor may be an optical profile (i.e., densitometry). The optical profile may be comprised of at least a portion of the electromagnetic radiation (e.g., at least a portion of IR radiation). The profile of the film may be a zero-dimensional (e.g., individual point or xy-coordinate in the film), 1D (e.g., a line parallel or perpendicular to the build surface), 2D (e.g., a plane parallel or perpendicular to the build surface), and/or 3D (e.g., one or more voxels in the film). In some cases, the profile may be a 2D profile. In some cases, the method may further comprise using the profile to determine a cross-sectional dimension of the film. The cross-sectional dimension of the film may be parallel, perpendicular, or angled (e.g., not parallel or perpendicular) to the build surface.

The film comprising the polymeric precursor may further comprise a plurality of particles, and the profile may be a density profile of the plurality of particles in the film. The plurality of particles may comprise at least one metal particle, at least one ceramic particle, or a combination thereof. Upon solidifying (e.g., curing, cross-linking) at least a portion of the polymeric precursor in the film into a polymeric material, the polymeric material may encapsulate one or more of the plurality of particles.

The method may comprise providing a build head for holding at least a portion of the 3D object. Prior to directing the light through the print window and to the film of the viscous liquid, the method may further comprise moving the build head towards the print window and bringing in contact with the film of the viscous liquid. Subsequent to directing the light to cure at least a portion of the photoactive resin in the film of viscous liquid between the print window and the build head, the method may further comprise moving the build head in a direction away from the print window. In some cases, the method may further comprise moving the build head in the direction away from the window while forming the 3D object. The rate of movement of the build head may be controlled to adjust a thickness of one or more layers in the 3D object. A surface of the build head in contact with a first layer of the 3D object may be smooth, knurled, or serrated to adjust contact surface area and/or frictional force between the surface and the first layer of the 3D object. Alternatively or in addition to, the first layer of the 3D object may be a support layer for the 3D object that may be removed post-processing.

The method may further comprise using a build head. The build head may be configured to hold and/or support at least a portion (e.g., a layer) of the 3D object. During printing, the at least the portion of the 3D object may be printed on the build head. The build head may be configured to move relative to the print window during printing. The build head may be configured to move along a direction away from the print window during printing. Such movement may be relative movement, and thus the moving piece may be the build head, the print window, or both. In some cases, the build head may be connected to a build head actuator for moving the build head relative to the print window. The build head actuator may be a mechanical, hydraulic, pneumatic, or electro-mechanical actuator. Alternatively or in addition to, the open platform comprising the print window may be connected to an open platform actuator for moving the open platform relative to the build head. The open platform actuator may be a mechanical, hydraulic, pneumatic, or electro-mechanical actuator. The controller may be operatively coupled to the build head actuator and/or the open platform actuator to control the relative distance between the build head and the print window. The relative distance between the build head and the print window may be adjusted to adjust a thickness of a layer within the at least the portion of the 3D object.

The method may further comprise exposing the at least the portion of the film to the light to initiate formation of the polymeric material from the polymeric precursor with a build head in contact with the film. The method may further comprise moving the build head away from the build surface. Subsequently, the method may further comprise using the sensor to measure an additional profile (e.g., optical profile) of the film adjacent to the build surface. The additional profile of the film may be a profile of any excess of the film that is remaining on the build surface after printing a previously deposited portion (e.g., layer) of the 3D object. The additional profile may be a negative or inverted profile (e.g., a negative or inverted optical profile) of the at least the portion of the 3D object that is printed. The negative profile may be analyzed (e.g., by the controller) to determine a cross-sectional image (i.e., a tomography, contour, or silhouette) of the at least the portion of the 3D object that has been printed. The determined cross-sectional image of the at least the portion of the 3D object may be compared to an initial 3D model of the 3D object to assess print quality. In some cases, the cross-sectional area and/or shape of a layer of the 3D object based on the negative image may be compared to a theoretical cross-sectional area and/or shape of a corresponding layer of the 3D object based on the initial 3D model of the 3D object, thereby to assess print quality.

A plurality of negative profiles of a plurality of portions of the 3D object may be combined (e.g., by the controller) to re-construct a 3D model of at least a portion of the 3D object that is printed. A plurality of cross-sectional images based on the plurality of negative profiles may be combined to generate the re-constructed 3D model of the at least the portion of the 3D object. Combining the plurality of negative profiles (or the respective plurality of cross-sectional images) may comprise stacking the plurality of negative profiles (or the respective plurality of cross-sectional images). The plurality of portions of the 3D object may be sequential portions of the 3D object. The plurality of portions of the 3D object may not be sequential portions of the 3D object. The virtual model of the at least the portion of the 3D object may be compared the initial 3D model of the 3D object, thereby to assess print quality. The virtual model may be as informative as a reconstruction of the printed 3D object using micro-computed tomography.

The sensor(s) may be used prior to, during, and/or subsequent to depositing the film of viscous liquid on the build surface. The sensor(s) may be used prior to, during, and/or subsequent to forming (e.g., curing, polymerizing, cross-linking, etc.) at least a portion of the film of viscous liquid into a polymer. The sensor(s) may be used prior to, during, and/or subsequent to removing any excess viscous liquid from the build surface.

The method may comprise exposing the resin (e.g., the viscous liquid) to the light (i.e., photoinitiation light) under conditions sufficient to cause the at least one photoinitiator to initiate formation of the polymeric material from the polymeric precursor. The polymeric material may encapsulate the plurality of particles. The method may comprise exposing the resin to a different light (i.e., photoinhibition light) under conditions sufficient to cause the at least one photoinhibitor to inhibit formation of the polymeric material adjacent to the build surface. In some cases, the photoinitiation light may comprise a first wavelength and the photoinhibition light may comprise a third wavelength. The first and third wavelengths may be different. The first wavelength may be sufficient to activate the at least one photoinitiator, and the third wavelength may be sufficient to activate the at least one photoinhibitor.

The method may further comprise directing the light (i.e., photoinitiation light) through the print window and to the film to initiate formation (e.g., curing or cross-linking) of the polymeric material from the polymeric precursor. The light may be directed from an optical source that provides the light through the print window and to the film to initiate formation of the polymeric material from the polymeric precursor. The optical source may provide the first light through the print window (or above the print window) for forming the at least a portion of the 3D object adjacent to the print window.

The method may further comprise directing the different light (i.e., photoinhibition light) through the print window and to the film to inhibit formation (e.g., inhibit curing or cross-linking) of the polymeric material from the polymeric precursor on or adjacent to the print window. The different light may be directed from an optical source that provides the different light through the print window and to the film to inhibit formation of the polymeric material from the polymeric precursor on or adjacent to the print window. The optical source may provide the different light through the print window (or above the print window) to inhibit formation of the polymeric material from the polymeric precursor on or adjacent to the print window.

In some situations, the print window may be precluded. In such a scenario, light may be provided to the film of the viscous liquid from above the open platform, such as directly above or from a side of the open platform.

Prior to providing the film comprising the polymeric precursor on or adjacent to the build surface, the method may comprise receiving or generating a computer model of the 3D object, wherein the at least the portion of the 3D object is in accordance to the computer model of the 3D object. The method may further comprise determining an amount of the liquid (e.g., the viscous liquid) comprising the polymeric precursor to be dispensed on or adjacent to the build surface for printing a portion (e.g., a layer) of the 3D object.

In some cases, the viscous liquid may be the photoactive resin. The viscosity of the photoactive resin may range between about 4,000 cP to about 2,000,000 cP. The viscosity of the photoactive resin may be at least about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. The viscosity of the photoactive resin may be at most about 2,000,000 cP, 1,000,000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

The viscous liquid may be a non-Newtonian fluid. The viscosity of the viscous liquid may vary based on a shear rate or shear history of the viscous liquid. As an alternative, the viscous liquid may be a Newtonian fluid.

In some cases, the viscous liquid may comprise the photoactive resin and the plurality of particles. The viscosity of the viscous liquid may range between about 4,000 cP to about 2,000,000 cP. The viscosity of the viscous liquid may be at least about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. The viscosity of the viscous liquid may be at most about 2,000,000 cP, 1,000,000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

In the viscous liquid comprising the photoactive resin and the plurality of particles, the photoactive resin may be present in an amount ranging between about 5 volume % (vol %) to about 80 vol % in the viscous liquid. The photoactive resin may be present in an amount of at least about 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 30 vol %, 35 vol %, 40 vol %, 45 vol %, 50 vol %, 55 vol %, 60 vol %, 65 vol %, 70 vol %, 75 vol %, 80 vol %, or more in the viscous liquid. The photoactive resin may be present in an amount of at most about 80 vol %, 75 vol %, 70 vol %, 65 vol %, 60 vol %, 55 vol %, 50 vol %, 45 vol %, 40 vol %, 35 vol %, 30 vol %, 25 vol %, 24 vol %, 23 vol %, 22 vol %, 21 vol %, 20 vol %, 19 vol %, 18 vol %, 17 vol %, 16 vol %, 15 vol %, 14 vol %, 13 vol %, 12 vol %, 11 vol %, 10 vol %, 9 vol %, 8 vol %, 7 vol %, 6 vol %, 5 vol %, or less in the viscous liquid.

The polymeric precursor in the photoactive resin may comprise monomers to be polymerized into the polymeric material, oligomers to be cross-linked into the polymeric material, or both. The monomers may be of the same or different types. An oligomer may comprise two or more monomers that are covalently linked to each other. The oligomer may be of any length, such as at least 2 (dimer), 3 (trimer), 4 (tetramer), 5 (pentamer), 6 (hexamer), 7, 8, 9, 10, 20, 30, 40, 50, 100, 200, 300, 400, 500, or more monomers. Alternatively or in addition to, the polymeric precursor may include a dendritic precursor (monodisperse or polydisperse). The dendritic precursor may be a first generation (G1), second generation (G2), third generation (G3), fourth generation (G4), or higher with functional groups remaining on the surface of the dendritic precursor. The resulting polymeric material may comprise a monopolymer and/or a copolymer. The copolymer may be a linear copolymer or a branched copolymer. The copolymer may be an alternating copolymer, periodic copolymer, statistical copolymer, random copolymer, and/or block copolymer.

Examples of monomers include one or more of hydroxyethyl methacrylate; n-Lauryl acrylate; tetrahydrofurfuryl methacrylate; 2, 2, 2-trifluoroethyl methacrylate; isobornyl methacrylate; polypropylene glycol monomethacrylates, aliphatic urethane acrylate (i.e., Rahn Genomer 1122); hydroxyethyl acrylate; n-Lauryl methacrylate; tetrahydrofurfuryl acrylate; 2, 2, 2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethyleneglycol diacrylate; triethylene glycol dimethacrylate; tetrathyleneglycol diacrylate; tetrathylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethyleneglycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; and ditrimethylolpropane tetraacrylate.

Polymeric precursors may be present in an amount ranging between about 3 weight % (wt %) to about 90 wt % in the photoactive resin of the viscous liquid. The polymeric precursors may be present in an amount of at least about 3 wt %, 4 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or more in the photoactive resin of the viscous liquid. The polymeric precursors may be present in an amount of at most about 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, 4 wt %, 3 wt %, or less in the photoactive resin of the viscous liquid.

Photopolymerization of the polymeric precursors into the polymeric material may be controlled by one or more photoactive species, such as the at least one photoinitiator and the at least one photoinhibitor. The at least one photoinitiator may be a photon-absorbing compound that (i) is activated by a light (i.e., photoinitiation light) comprising a first wavelength and (ii) initiates photopolymerization of the polymeric precursors. The at least one photoinhibitor may be another photon-absorbing compound that (i) is activated by a different light (i.e., photoinhibition light) comprising a third wavelength and (ii) inhibits the photopolymerization of the polymeric precursors. The first wavelength and the third wavelength may be different. The light and the different light may be directed by the same light source. As an alternative, the light may be directed by a first light source (i.e., photoinitiation light source) and the different light may be directed by a different light source (i.e., photoinhibition light source). In some cases, the light may comprise wavelengths ranging between about 420 nanometers (nm) to about 510 nm. In some cases, the different light may comprise wavelengths ranging between about 350 nm to about 410 nm. In an example, the first wavelength to induce photoinitiation is about 460 nm. In an example, the third wavelength to induce photoinhibition is about 365 nm.

Relative rates of the photoinitiation by the at least one photoinitiator and the photoinhibition by the at least one photoinhibitor may be controlled by adjusting the intensity and/or duration of the light, the different light, or both. By controlling the relative rates of the photoinitiation and the photoinhibition, an overall rate and/or amount (degree) of polymerization of the polymeric precursors into the polymeric material may be controlled. Such process may be used to (i) prevent polymerization of the polymeric precursors at the window-viscous liquid interface, (ii) control the rate at which polymerization takes place in the direction away from the window, and/or (iii) control a thickness of the polymeric material within the film of the viscous liquid.

Examples of types of the at least one photoinitiator include one or more of benzophenones, thioxanthones, anthraquinones, benzoylformate esters, hydroxyacetophenones, alkylaminoacetophenones, benzil ketals, dialkoxyacetophenones, benzoin ethers, phosphine oxides acyloximino esters, alphahaloacetophenones, trichloromethyl-S-triazines, titanocenes, dibenzylidene ketones, ketocoumarins, dye sensitized photoinitiation systems, maleimides, and mixtures thereof.

Examples of the at least one photoinitiator in the photoactive resin include one or more of 1-hydroxy-cyclohexyl-phenyl-ketone (Irgacure™ 184; BASF, Hawthorne, N.J.); a 1:1 mixture of 1-hydroxy-cyclohexyl-phenyl-ketone and benzophenone (Irgacure™ 500; BASF); 2-hydroxy-2-methyl-1-phenyl-1-propanone (Darocur™ 1173; BASF); 2-hydroxy-1-[4-(2-hydroxyethoxy)phenyl]-2-methyl-1-propanone (Irgacure™ 2959; BASF); methyl benzoylformate (Darocur™ MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (Irgacure™ 754; BASF); alpha,alpha-dimethoxy-alpha-phenylacetophenone (Irgacure™ 651; BASF); 2-benzyl-2-(dimethylamino)-1-[4-(4-morpholinyl)-phenyl]-1-butanone (Irgacure™ 369; BASF); 2-methyl-1-[4-(methylthio)phenyl]-2-(4-morpholinyl)-1-propanone (Irgacure™ 907; BASF); a 3:7 mixture of 2-benzyl-2-(dimethylamino)-1-[4-(4-morpholinyl) phenyl]-1-butanone and alpha, alpha-dimethoxy-alpha-phenylacetophenone per weight (Irgacure™ 1300; BASF); diphenyl-(2,4,6-trimethylbenzoyl) phosphine oxide (Darocur™ TPO; BASF); a 1:1 mixture of diphenyl-(2,4,6-trimethylbenzoyl)-phosphine oxide and 2-hydroxy-2-methyl-1-phenyl-1-propanone (Darocur™ 4265; BASF); phenyl bis(2,4,6-trimethyl benzoyl) phosphine oxide, which can be used in pure form (Irgacure™ 819; BASF, Hawthorne, N.J.) or dispersed in water (45% active, Irgacure™ 819DW; BASF); 2:8 mixture of phosphine oxide, phenyl bis(2,4,6-trimethyl benzoyl) and 2-hydroxy-2-methyl-1-phenyl-1-propanone (Irgacure™ 2022; BASF); Irgacure™ 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (Irgacure™ 784; BASF); (4-methylphenyl) [4-(2-methylpropyl) phenyl]-iodonium hexafluorophosphate (Irgacure™ 250; BASF); 2-(4-methylbenzyl)-2-(dimethylamino)-1-(4-morpholinophenyl)-butan-1-one (Irgacure™ 379; BASF); 4-(2-hydroxyethoxy)phenyl-(2-hydroxy-2-propyl)ketone (Irgacure™ 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2 hydroxy-2-methyl-1-phenyl-propanone (Irgacure™ 1700; BASF); 4-Isopropyl-9-thioxanthenone; and mixtures thereof.

The at least one photoinitiator may be present in an amount ranging between about 0.1 wt % to about 10 wt % in the photoactive resin. The at least one photoinitiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The at least one photoinitiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The at least one photoinhibitor in the photoactive resin may comprise one or more radicals that may preferentially terminate growing polymer radicals, rather than initiating polymerization of the polymeric precursors. Examples of types of the at least one photoinhibitor include: one or more of sulfanylthiocarbonyl and other radicals generated in photoiniferter polymerizations; sulfanylthiocarbonyl radicals used in reversible addition-fragmentation chain transfer polymerization; and nitrosyl radicals used in nitroxide mediate polymerization. Other non-radical species that can be generated to terminate growing radical chains may include the numerous metal/ligand complexes used as deactivators in atom-transfer radical polymerization (ATRP). Thus, additional examples of the types of the at least one photoinhibitor include: one or more of thiocarbamates, xanthates, dithiobenzoates, hexaarylbiimidazoles, photoinitiators that generate ketyl and other radicals that tend to terminate growing polymer chains radicals (i.e., camphorquinone (CQ) and benzophenones), ATRP deactivators, and polymeric versions thereof.

Examples of the at least one photoinhibitors in the photoactive resin include one or more of zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide (TEDS); tetramethylthiuram monosulfi de; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl] trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio] propionate; 1-Succinimidyl-4-cyano-4-[N-methyl-N-(4-pyridyl)carbamothioylthio]pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate; 2-Cyanopropan-2-yl N-methyl-N-(pyridin-4-yl)carbamodithioate; 2,2'-Bis(2-chlorophenyl)-4,4',5,5'-tetraphenyl-1,2'-biimidazole; 2-(2-ethoxyphenyl)-1-[2-(2-ethoxyphenyl)-4,5-diphenyl-2H-imidazol-2-yl]-4,5-diphenyl-1H-imidazole; 2,2',4-tris-(2-Chlorophenyl)-5-(3,4-dimethoxyphenyl)-4',5'-diphenyl-1,1'-biimidazole; and Methyl 2-[methyl(4-pyridinyl) carbamothioylthio]propionate.

In some cases, the photoinhibitor may comprise a hexaarylbiimidazole (HABI) or a functional variant thereof. In some cases, the hexaarylbiimidazole may comprise a phenyl group with a halogen and/or an alkoxy substitution. In an example, the phenyl group comprises an ortho-chloro-substitution. In another example, the phenyl group comprises an ortho-methoxy-substitution. In another example, the phenyl group comprises an ortho-ethoxy-substitution.

Examples of the functional variants of the hexaarylbiimidazole include: 2,2'-Bis(2-chlorophenyl)-4,4',5,5'-tetraphenyl-1,2'-biimidazole; 2-(2-methoxyphenyl)-1-[2-(2-methoxyphenyl)-4,5-diphenyl-2H-imidazol-2-yl]-4,5-diphenyl-1H-imidazole; 2-(2-ethoxyphenyl)-1-[2-(2-ethoxyphenyl)-4,5-diphenyl-2H-imidazol-2-yl]-4,5-diphenyl-1H-imidazole; and 2,2',4-tris-(2-Chlorophenyl)-5-(3,4-dimethoxyphenyl)-4',5'-diphenyl-1,1'-biimidazole.

The at least one photoinhibitor may be present in an amount ranging between about 0.1 wt % to about 10 wt % in the photoactive resin. The at least one photoinhibitor may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 7 wt %, 8 wt %, 9 wt %, 10 wt %, or more in the photoactive resin. The at least one photoinhibitor may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

Alternatively or in addition to, the photoactive resin may include a co-initiator. The co-initiator may be used to enhance the polymerization rate of the polymeric precursors. Suitable classes of the co-initiators may include: primary, secondary, and tertiary amines; alcohols; and thiols. Examples of the co-initiators may include: one or more of isoamyl 4-(dimethylamino)benzoate, 2-ethylhexyl 4-(dimethylamino)benzoate; ethyl 4-(dimethylamino)benzoate (EDMAB); 3-(dimethylamino)propyl acrylate; 2-(dimethylamino)ethyl methacrylate; 4-(dimethylamino)benzophenones, 4-(diethylamino)benzophenones; 4,4'-Bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (Sartomer); CN371 (Sartomer), CN373 (Sartomer), Genomer 5142 (Rahn); Genomer 5161 (Rahn); Genomer (5271 (Rahn); Genomer 5275 (Rahn), and TEMPIC (Bruno Boc, Germany).

In some cases, the at least one photoinitiator and the co-initiator may be activated by the same light. The at least one photoinitiator and the co-initiator may be activated by the same wavelength and/or two different wavelengths of the same light. Alternatively or in addition to, the at last one photoinitiator and the co-initiator may be activated by different lights comprising different wavelengths. The method may comprise providing a co-initiator light source configured to direct a co-initiation light comprising a wavelength sufficient to activate the co-initiator to the film of the viscous liquid.

The co-initiator may be a small molecule (e.g., a monomer). Alternatively or in addition to, the co-initiator may be an oligomer or polymer comprising a plurality of small molecules. The co-initiator may be present in an amount ranging between about 0.1 wt % to about 10 wt % in the photoactive resin. The co-initiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The co-initiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The photoactive resin may comprise one or more dyes. The one or more dyes may be used to attenuate light, to transfer energy to the photoactive species, or both. The one or more dyes may transfer energy to the photoactive species to increase sensitivity of the photoactive resin to the light for the photoinitiation process, the different light for the photoinhibition process, or both. In an example, the photoactive resin comprises at least one dye configured to absorb the different light having the third wavelength, which third wavelength is for activating the at least one photoinhibitor. Exposing the photoactive resin to the different light may initiate the at least one dye to absorb the different light and (i) reduce an amount of the different light exposed to the at least one photoinhibitor, thereby controlling the depth of penetration of the different light into the film of the viscous liquid, and/or (ii) transfer (e.g., via Förster resonance energy transfer (FRET)) some of the absorbed energy from the different light to the at least one photoinhibitor, thereby improving the efficiency of photoinhibition. Examples of the one or more dyes may include compounds commonly used as ultraviolet (UV) light absorbers, including 2-hydroxyphenyl-benzophenones, 2-(2-hydroxyphenyl)-benzotriazoles, and 2-hydroxyphenyl-s-triazines. Alternatively or in addition to, the one or more dyes may include those used for histological staining or dying of fabrics, including Martius yellow, Quinoline yellow, Sudan red, Sudan I, Sudan IV, eosin, eosin Y, neutral red, and acid red.

A concentration of the one or more dyes in the photoactive resin may be dependent on the light absorption properties of the one or more dyes. The one or more dyes may be present in an amount ranging between about 0.1 wt % to about 10 wt % in the photoactive resin. The one or more dyes may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The one or more dyes may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The viscous liquid may comprise the plurality of particles for forming the at least the portion of the 3D object. In some cases, the amount of the plurality of particles in the viscous liquid may be sufficient to minimize shrinking of the green body during sintering. The plurality of particles may comprise any particulate material (a particle) that can be melted or sintered (e.g., not completely melted). The particulate material may be in powder form. The particular material may be inorganic materials. The inorganic materials may be metallic, intermetallic, ceramic materials, or any combination thereof. The one or more particles may comprise at least one metallic material, at least one intermetallic material, at least one ceramic material, or any combination thereof.

Whereas powdered metals alone may be a severe safety hazard and may explode and/or require extensive safety infrastructures, using powdered metals that are dispersed in the viscous liquid may avoid or substantially reduce the risks relevant to using the powdered metals that are not dispersed in a liquid medium. Additionally, photopolymer-based 3D printing using the viscous liquid comprising the photoactive resin and the powdered metals may be performed without using heat, thereby avoiding or substantially reducing thermal distortion to the at least the portion of the 3D object during printing.

The metallic materials for the particles may include one or more of aluminum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, and gold. In some cases, the particles may comprise a rare earth element. The rare earth element may include one or more of scandium, yttrium, and elements of the lanthanide series having atomic numbers from 57-71.

An intermetallic material may be a solid-state compound exhibiting metallic bonding, defined stoichiometry and ordered crystal structure (i.e., alloys). The intermetallic materials may be in prealloyed powder form. Examples of such prealloyed powders may include, but are not limited to, brass (copper and zinc), bronze (copper and tin), duralumin (aluminum, copper, manganese, and/or magnesium), gold alloys (gold and copper), rose-gold alloys (gold, copper, and zinc), nichrome (nickel and chromium), and stainless steel (iron, carbon, and additional elements including manganese, nickel, chromium, molybdenum, boron, titanium, silicon, vanadium, tungsten, cobalt, and/or niobium). In some cases, the prealloyed powders may include superalloys. The superalloys may be based on elements including iron, nickel, cobalt, chromium, tungsten, molybdenum, tantalum, niobium, titanium, and/or aluminum.

The ceramic materials may comprise metal (e.g., aluminum, titanium, etc.), non-metal (e.g., oxygen, nitrogen, etc.), and/or metalloid (e.g., germanium, silicon, etc.) atoms primarily held in ionic and covalent bonds. Examples of the ceramic materials include, but are not limited to, an aluminide, boride, beryllia, carbide, chromium oxide, hydroxide, sulfide, nitride, mullite, kyanite, ferrite, titania zirconia, yttria, and magnesia.

In some cases, the viscous liquid may comprise a pre-ceramic material. The pre-ceramic material may be a polymer that can be heated (or pyrolyzed) to form a ceramic material. The pre-ceramic material may include polyorganozirconates, polyorganoaluminates, polysiloxanes, polysilanes, polysilazanes, polycarbosilanes, polyborosilanes, etc. Additional examples of the pre-ceramic material include zirconium tetramethacrylate, zirconyl dimethacrylate, or zirconium 2-ethylhexanoate; aluminum III s-butoxide, aluminum III diisopropoxide-ethylacetoacetate; 1,3-bis(chloromethyl) 1,1,3,3-Tetrakis(trimethylsiloxy)disiloxane; 1,3-bis(3-carboxypropyl)tetramethyldisiloxane; 1,3,5,7-tetraethyl-2,4,6,8-tetramethylcyclotetrasilazane; tris(trimethylsilyl) phosphate; tris(trimethylsiloxy)boron; and mixtures thereof.

A cross-sectional dimension of the plurality of particles may range between about 1 nanometers (nm) to about 500 micrometers (μm). The cross-sectional dimension of the plurality of particles may be at least about 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, or greater. The cross-sectional dimension of the plurality of particles may be at most about 500 μm, 400 μm, 300 μm, 200 μm, 100 μm, 90 μm, 80 μm, 70 μm, 60 μm, 50 μm, 40 μm, 30 μm, 20 μm, 10 μm, 9 μm, 8 μm, 7 μm, 6 μm, 5 μm, 4 μm, 3 μm, 2 μm, 1 μm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 9 nm, 8 nm, 7 nm, 6 nm, 5 nm, 4 nm, 3 nm, 2 nm, 1 nm, or smaller.

The plurality of particles (e.g., metallic, intermetallic, and/or ceramic particles) may be present in an amount ranging between about 5 vol % to about 90 vol % in the viscous liquid. The plurality of particles may be present in an amount of at least about 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, or more in the viscous liquid. The plurality of particles may be present in an amount of at most about 90 vol %, 85 vol %, 80 vol %, 75 vol %, 70 vol %, 65 vol %, 60 vol %, 55 vol %, 50 vol %, 45 vol %, 40 vol %, 35 vol %, 30 vol %, 25 vol %, 20 vol %, 15 vol %, 10 vol %, 5 vol %, or less in the viscous liquid.

The viscous liquid may comprise an anti-settling component to prevent settling of the plurality of particles and keep them suspend in the viscous liquid. The anti-settling component may sterically limit the plurality of particles from moving closer to each other. The anti-settling component may not scatter light (e.g., the photoinitiation light and/or the photoinhibition light) to avoid negatively affecting the penetration depth of the light into the viscous liquid. The anti-settling component may be present in an amount ranging between about 5 vol % to about 90 vol % in the viscous liquid. The anti-settling component may be present in an amount of at least about 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, or more in the viscous liquid. The anti-settling component may be present in an amount of at most about 90 vol %, 85 vol %, 80 vol %, 75 vol %, 70 vol %, 65 vol %, 60 vol %, 55 vol %, 50 vol %, 45 vol %, 40 vol %, 35 vol %, 30 vol %, 25 vol %, 20 vol %, or less in the viscous liquid. In some cases, the plurality of particles are present in an amount below the critical volume fraction ($V_C$) in the viscous liquid, and the anti-settling component may be added to approximately reach the critical volume fraction ($V_C$) in the viscous liquid.

Examples of the anti-settling component include, but are not limited to, one or more additional particles and a thixotropic additive. The one or more additional particles may be configured to prevent settling of the plurality of particles in the viscous liquid. The one or more additional particles may decrease free space and increase the overall packing density within the viscous liquid, thereby preventing the plurality of particles from settling towards the window during printing. Examples of the one or more additional particles include micronized and/or dispersed waxes such as paraffin, carnuba, montan, Fischer tropsch wax, ethylene bis stearamide, and lignin; micronized polymers such as cellulose, high density polyethylene, polyethylene, polypropylene, oxidized polyethylene (PE), paraformaldehyde, polyethylene glycol, phenolics, and melamine-formaldehyde based materials; and microspheres made from crosslinked polystyrene, polymethyl methacrylate, and/or other copolymers. An example of the one or more additional particles is Byk Ceraflour 929 (micronized, modified polyethylene wax).

The thixotropic additive may be a gel-like or static material that becomes fluid-like when physically disturbed. Such property may be reversible. In the viscous liquid, the thixotropic additive may be configured to create a network to prevent settling of the plurality of particles. The network of the thixotropic additive may be easily disturbed by shearing (e.g., dispensing through the nozzle) the viscous liquid to allow flow. Upon being dispensed through the nozzle, the thixotropic additive may form another network within the viscous liquid to prevent settling of the plurality of particles during printing. Examples of the thixotropic additive include castor wax, oxidized polyethylene wax, amide wax, modified ureas, castor oil derivatives, fumed silica and alumina, Bentonite clays, and mixtures thereof.

In some cases, the anti-settling component of the viscous liquid may be the one or more additional particles, the thixotropic additive, or both.

The viscous liquid may comprise at least one additional additive that is configured to prevent foaming (or induce deaeration) of the viscous liquid. Preventing foaming of the viscous liquid may improve quality of the resulting 3D object. The at least one additional additive may be an amphiphilic material. The at least one additional additive may be a low surface energy material to allow association with each other within the viscous liquid. Such association of the at least one additional additive may trap air bubbles present inside the viscous liquid, migrate towards the viscous liquid-air interface, and release the air bubbles. In some cases, during curing of the photoactive resin, the at least one additional additive may polymerize and/or cross-link with the polymeric precursor. Examples of the one additional additive include silcones, modified silicones, lauryl acrylates, hydrophobic silicas, and modified ureas. An example of the one additional additive may be Evonik Tegorad 2500 (silicon acrylate).

The viscous liquid may comprise an extractable material. Accordingly, the method may comprise additional operations of treating the green body prior to subjecting the green body to heating (e.g., sintering).

The extractable material may be soluble in the polymeric precursor and/or dispersed throughout the viscous liquid. During printing, curing of the polymeric precursor of the photoactive resin of the at least the portion of the viscous liquid may create a first solid phase comprising the polymeric material and a second solid phase comprising the extractable material within the at least the portion of the 3D object. Such process may be a polymerization-induced phase separation (PIPS) operation. At least a portion of the plurality of particles may be encapsulated by the first solid phase comprising the polymeric material. In some cases, the at least the portion of the 3D object may be a green body that can be heated to sinter at least a portion of the plurality of particles and burn off at least a portion of other components (i.e., organic components).

Prior to sintering the plurality of particles, the green body may be treated (e.g., immersed, jetted, etc.) with a solvent (liquid or vapor). The solvent may be an extraction solvent. The extractable material may be soluble in the solvent. A first solubility of the extractable material in the solvent may be higher than a second solubility of the polymeric material in the solvent. The solvent may be a poor solvent for the polymeric material. Thus, treating the green body with the solvent may solubilize and extract at least a portion of the extractable material out of the green body into the solvent, and create one or more pores in the at least the portion of the 3D object. In some cases, the one or more pores may be a plurality of pores. In some cases, the green body may be treated with the solvent and heat at the same time. The one or more pores may create at least one continuous porous network in the at least the portion of the 3D object. Such process may be a solvent de-binding operation.

The solvent for the solvent de-binding process may not significantly swell the polymeric material in the green body. In some cases, the viscous liquid may comprise acrylate-based polymeric precursors. Since acrylate-based polymers are of intermediate polarity, both protic polar solvents (e.g., water and many alcohols such as isopropanol) and non-polar solvents (e.g., heptane) may be used. Examples of the solvent for the solvent de-binding process include water, isopropanol, heptane, limolene, toluene, and palm oil. On the other hand, intermediate polarity solvents (e.g., acetone) may be avoided.

In some cases, the solvent de-binding process may involve immersing the green body in a container comprising the liquid solvent. A volume of the solvent may be at least about 2 times the volume of the green body. The volume of the solvent may be at least about 2, 3, 4, 5, 6, 7, 8, 9, 10 times or more than the volume of the green body. The container comprising the liquid solvent and the green body may be heated to a temperature ranging between about 25 degrees Celsius to about 50 degrees Celsius. The container comprising the liquid solvent and the green body may be heated (e.g., a water bath, oven, or a heating unit from one or more sides of the green body) to a temperature of at least about 25 degrees Celsius, 26 degrees Celsius, 27 degrees Celsius, 28 degrees Celsius, 29 degrees Celsius, 30 degrees Celsius, 35 degrees Celsius, 40 degrees Celsius, 45 degrees Celsius, 50 degrees Celsius, or more. The container comprising the liquid solvent and the green body may be heated to a temperature of at most about 50 degrees Celsius, 45 degrees Celsius, 40 degrees Celsius, 35 degrees Celsius, 30 degrees Celsius, 29 degrees Celsius, 28 degrees Celsius, 27 degrees Celsius, 26 degrees Celsius, 25 degrees Celsius, or less. The solvent de-binding process may last between about 0.1 hours (h) to about 48 h. The solvent de-binding process may last between at least about 0.1 h, 0.2 h, 0.3 h, 0.4 h, 0.5 h, 1 h, 2 h, 3 h, 4 h, 5 h, 6 h, 12 h, 18 h, 24 h, 30 h, 36 h, 42 h, 48 h, or more. The solvent de-binding may last between at most about 48 h, 42 h, 36 h, 30 h, 24 h, 18 h, 12 h, 6 h, 5 h, 4 h, 3 h, 2 h, 1 h, 0.5 h, 0.4 h, 0.3 h, 0.2 h, 0.1 h, or less. After the solvent de-binding process, the solvent may be removed and the green body may be allowed to dry. A weight of the green body may be measured before and after the solvent de-binding to determine the amount of material extracted from the green body.

After the solvent de-binding process, the green body may be heated (e.g., sintered) and/or cooled as abovementioned. During heating (e.g., sintering), at least a portion of the organic components (e.g., the polymeric material, additives, etc.) may decompose and leave the green body in part through the at least one continuous porous network. The presence of the at least one continuous porous network from the solvent de-binding operation may improve the speed of the sintering process.

Subsequent to heating the green body, the heated (e.g., sintered) particles as part of a nascent 3D object may be further processed to yield the 3D object. This may include, for example, performing surface treatment, such as polishing, on the nascent 3D object.

The method may further comprise providing a deposition head adjacent to an open platform comprising a print window. The deposition head may be movable across the open platform. The deposition head may comprise a nozzle in fluid communication with a source of a viscous liquid comprising a photoactive resin. The deposition head may comprise a wiper. The method may comprise moving the deposition head across the open platform and dispensing the viscous liquid through the nozzle to deposit a film of the viscous liquid over the print window. The method may comprise directing light through the print window to the film to cure the photoactive resin in at least a portion of the film, thereby printing at least a portion of the 3D object.

The method may further comprise providing at least one deposition head (e.g., at least about 1, 2, 3, 4, 5, or more deposition heads, or at most about 5, 4, 3, 2, or 1 deposition head) adjacent to the build surface and moving the deposition head across the build surface to deposit the film adjacent to the build surface. The deposition head may comprise at least one nozzle (e.g., at least about 1, 2, 3, 4, 5, or more nozzles, or at most about 5, 4, 3, 2, or 1 nozzle) in fluid communication with a source of the viscous liquid.

The deposition head may be configured to move across the open platform and deposit the film of the viscus liquid over the print window. The film of the viscous liquid may have a thickness ranging between about 1 μm to about 1000 μm. The film of the viscous liquid may have a thickness of at least about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 100 μm, 200 μm, 300 μm, 400 μm, 500 μm, 600 μm, 700 μm, 800 μm, 900 μm, 1000 μm, or more. The film of the viscous liquid may have a thickness of at most about 1000 μm, 900 μm, 800 μm, 700 μm, 600 μm, 500 μm, 400 μm, 300 μm, 200 μm, 100 μm, 90 μm, 80 μm, 70 μm, 60 μm, 50 μm, 40 μm, 30 μm, 20 μm, 10 μm, 9 μm, 8 μm, 7 μm, 6 μm, 5 μm, 4 μm, 3 μm, 2 μm, 1 μm, or less. The thickness of the film of the viscous liquid may have a tolerance ranging between about 1 μm to about 10 μm. The thickness of the film of the viscous liquid may have a tolerance of at least about 1 μm, 2 μm, 3 μm, 4 μm, 5 μm, 6 μm, 7 μm, 8 μm, 9 μm, 10 μm, or more. The thickness of the film of the viscous liquid may have a tolerance of at most about 10 μm, 9 μm, 8 μm, 7 μm, 6 μm, 5 μm, 4 μm, 3 μm, 2 μm, 1 μm, or less.

The viscous liquid may be stored in the source of the viscous liquid. The source of the viscous liquid may be a cup, container, syringe, or any other repository that can hold the viscous liquid. The source of the viscous liquid may be in fluid communication (e.g., via a passageway) with the nozzle in the deposition head. The source of the viscous liquid may be connected to a flow unit. The flow unit may provide and control flow of the viscous liquid from the source of the viscous liquid towards the nozzle, thereby dispensing the viscous liquid. Alternatively or in addition to, the flow unit may provide and control flow of the viscous liquid in a direction away from the nozzle and towards the source of the viscous liquid, thereby retrieving the viscous liquid. In some cases, the flow unit may use pressure mechanisms to control the speed and direction of the flow of the viscous liquid. The flow unit may be a syringe pump, vacuum pump, an actuator (e.g., linear, pneumatic, hydraulic, etc.), a compressor, or any other suitable device to exert pressure (positive or negative) to the viscous liquid in the source of the viscous liquid. The controller may be operatively coupled to the flow unit the control the speed, duration, and/or direction of the flow of the viscous liquid.

The source of the viscous liquid may comprise a sensor (e.g., an optical sensor) to detect the volume of the viscous liquid. The controller may be operatively coupled to the sensor to determine when the source of the viscous liquid may be replenished with new viscous liquid. Alternatively or in addition to, the source of the viscous liquid may be removable. The controller may determine when the source of the viscous liquid may be replaced with a new source of the viscous liquid comprising with the viscous liquid.

The deposition head may comprise the nozzle. The nozzle may be in fluid communication with the source of the viscous liquid. The deposition head may dispense the viscous liquid over the print window through the nozzle as a process of depositing the film of the viscous liquid over the print window. In some cases, the deposition head may retrieve any excess viscous liquid from the print window back into the source of the viscous liquid through the nozzle. In some cases, the source of the viscous liquid may be connected to the flow unit to provide and control flow of the viscous liquid towards or away from the nozzle of the deposition head. Alternatively or in addition to, the nozzle may comprise a nozzle flow unit that provides and controls flow of the viscous liquid towards or away from the print window. Examples of the nozzle flow unit include a piezoelectric actuator and an auger screw that is connected to an actuator.

In some cases, the method may further comprise configuring the wiper to be in contact with the print window, and using the wiper to reduce or inhibit flow of the viscous liquid out of the deposition head while moving the deposition head to deposit the film.

In some cases, the method may further comprise configuring the wiper at a distance away from the print window, and using the wiper to flatten the film of the viscous liquid into a desired thickness while moving the deposition head. The desired thickness of the film of the viscous liquid may be substantially the same as the distance between the wiper and the print window. The distance between the wiper and the print window may be adjustable. Thus, the thickness of the film of the viscous liquid may be adjustable. The thickness of the film may be adjusted to control a thickness of the at least the portion of the 3D object. In some cases, after printing the at least the portion of the 3D object, the method may further comprise moving the deposition head across the open platform in a first direction, and using the wiper of the deposition head that is in contact with the print window to remove any excess of the viscous liquid from the print window. Furthermore, in some cases, the deposition head may further comprise an additional wiper. After moving the deposition head in the first direction and using the wiper to remove the excess of the viscous liquid from the print window, the method may further comprise moving the deposition head in the second direction opposite of the first direction and using the additional wiper to collect the excess of the viscous liquid between the additional wiper and the wiper within the deposition head.

The deposition head may comprise a wiper. The wiper may be movable along a direction towards and/or away from the print window. The wiper may have a variable height relative to the print window. The deposition head may comprise an actuator connected to the wiper to control movement of the wiper in a direction towards and away from the print window. The actuator may be a mechanical, hydraulic, pneumatic, or electro-mechanical actuator. The controller may be operatively coupled to the actuator to control the movement of the wiper in a direction towards and away from the print window. Alternatively or in addition to, a vertical distance between the wiper and the print window (e.g., a distance perpendicular to the print window) may be static. In some cases, the deposition head may comprise a plurality of wipers with different configurations. In some cases, the deposition head may comprise the nozzle and three wipers.

The wiper of the deposition head may be configured to (i) reduce or inhibit flow of the viscous liquid out of the deposition head, (ii) flatten the film of the viscous liquid, and/or (iii) remove any excess of the viscous liquid. In an example, the wiper may be configured to be in contact with the print window and reduce or inhibit flow of the viscous liquid out of the deposition head. In another example, the wiper may be movable along a direction away from the print window and configured to flatten the film of the viscous liquid. The wiper may flatten the film of the viscous liquid to a defined height (or thickness). In a different example, the wiper may be movable along a direction away from the print window and configured to remove the excess of the viscous liquid.

The wiper may comprise polymer (e.g., rubber, silicone), metal, or ceramic. In some cases, the wiper may comprise (e.g., entirely or as a coating) one or more fluoropolymers that prevent adhesion of the viscous liquid on the wiper. Examples of the one or more fluoropolymers include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA).

In some cases, the wiper of the deposition head may be a blade (e.g., a squeegee blade, a doctor blade). The blade may have various shapes. In some cases, the blade may be straight and/or curved. In some cases, the wiper may be a straight blade with a flat surface. In some cases, the wiper may be a straight blade with a curved surface. In some cases, the wiper may be a curved blade (curved along the long axis of the wiper) with a flat surface. In some cases, the wiper may be a curved blade (curved along the long axis of the wiper) with a curved surface. In some cases, the wiper may comprise at least one straight portion and at least one curved portion along its length. In an example, the wiper may be a blade comprising a straight central portion between two curved portions.

In some cases, the wiper of the deposition head may be a roller. The roller may have a surface that is flat or textured. The roller may be configured to rotate clockwise and/or counterclockwise while the deposition head moves across the print window. Alternatively or in addition to, the roller may be configured to be static while the deposition head moves across the print window. In some cases, the wiper of the deposition head may be a rod. The rod may have a surface that is flat or textured. The rod may be configured to rotate clockwise and/or counterclockwise while the deposition head moves across the print window. Alternatively or in addition to, the rod may be configured to be static while the deposition head moves across the print window. In an example, the rod may be a wire wound rod, also known as a Meyer rod.

The deposition head may comprise a slot die. The slot die may be configured to move along a direction away from the print window. The slot die may be height adjustable with respect to the print window. The slot die may comprise a channel in fluid communication with the source of the viscous liquid. The channel may comprise a first opening to receive the viscous liquid from the source of the viscous liquid. The channel may comprise a second opening opposite of the first opening to dispense the viscous liquid to the print window. The second opening may be an injection point. In some cases, the channel may have a reservoir between the first and second openings to hold a volume of the viscous liquid. The injection point of the slot die may comprise a flat surface to flatten the film of the viscous liquid to a defined height (or thickness).

The deposition head comprising the slot die may include a separate nozzle to suction and retrieve any excess viscous liquid from the film of the viscous liquid during printing. The separate nozzle of the deposition head comprising the slot die may be in fluid communication with a repository to collect the excess viscous liquid. The repository may be a recycling bin. The repository may also be in fluid communication with the slot die to send the excess viscous liquid collected in the repository back into the reservoir of the slot die. Alternatively or in addition to, the collected excess viscous liquid may be removed for reprocessing. The reprocessing of the collected excess viscous liquid may comprise (i) filtering out any polymerized solid particulates, (ii) filtering out any of the plurality of particles that may be greater than a target particle size, (iii) remixing the viscous liquid to ensure homogeneity, and/or (iv) removing at least a portion of air entrapped in the viscous liquid. In some cases, the at least the portion of air entrapped in the viscous liquid may be removed by centrifuging the viscous liquid.

The excess of the viscous liquid may be collected and used (recycled) to deposit an additional film of the viscous liquid over the print window. In some cases, if a volume of the excess of viscous liquid collected by the deposition head is not sufficient to deposit the additional film, the nozzle of the deposition head may dispense more viscous liquid into the collected excess of viscous liquid. In an example, the controller may use a computer model of the 3D object, such as a computer-aided design (CAD) stored in a non-transitory computer storage medium, to determine theoretical amounts of (i) the viscous liquid used in a first printing operation and (ii) the excess of the viscous liquid remaining on the print window. The controller may also use the computer model of the 3D object to determine a theoretical amount of the viscous liquid needed to deposit a film of the viscous liquid for the second printing operation. If the volume of the collected excess of viscous liquid is not sufficient for the second printing operation, the controller may direct the nozzle to dispense more viscous liquid. In some cases, the system may comprise a repository (e.g., vat or container) adjacent to the open platform. After each printing operation, the deposition head may move to the repository and collect the excess viscous liquid into the repository. The collected excess viscous liquid may be reprocessed and used for printing.

The deposition head may be coupled to a motion stage adjacent to the open platform. Thus, the method may comprise moving the motion stage to move the deposition head across the open platform to at least deposit the film of the viscous liquid on the print window. The open platform may have different shapes (e.g., rectangle or ring), and movement of the motion stage may have different paths. In some cases, the motion stage may move linearly, thereby directing the deposition head in a first direction and/or in a second direction that is opposite to the first direction. In some cases, the motion stage may move circularly, thereby direction the deposition clockwise and/or counterclockwise.

The method may comprise using a plurality of viscous liquids for printing the 3D objet. In some cases, the method may comprise providing an additional deposition head comprising an additional nozzle. The additional nozzle may be in fluid communication with an additional source of an additional viscous liquid. The method may further comprise moving the additional deposition head across the open platform and depositing a film of the additional viscous liquid over the print window. In some cases, the method may comprise providing the additional source of the additional viscous liquid that is in fluid communication with the nozzle of the deposition head. The method may further comprise dispensing the additional viscous liquid through the nozzle to the print window during printing. Alternatively or in addition to, the method may comprise providing the additional source of the additional viscous liquid that is in fluid communication with an additional nozzle in the deposition head. The method may further comprise dispensing the additional viscous liquid through the additional nozzle to the print window during printing.

The additional nozzle of the additional deposition head may be in fluid communication with an additional source of an additional viscous liquid. In some cases, the nozzle of the deposition head may be in fluid communication with the source of the viscous liquid and the additional source of the additional viscous liquid. Alternatively or in addition to, the deposition head may comprise a first nozzle in fluid communication with the source of the viscous liquid, and (b) a second nozzle in fluid communication with the additional source of the additional viscous liquid. The presence of the additional source of the additional viscous liquid may allow printing at least a portion of a 3D object comprising multiple materials (multi-materials) in different layers and/or in different portions within the same layer.

The viscous liquid and the additional viscous liquid may be the same. As an alternative, the viscous liquid and the additional viscous liquid may be different. The viscous liquid and the additional viscous liquid may comprise different types of the photoactive resin, the plurality of particles, or both. Alternatively or in addition to, the viscous liquid and the additional viscous liquid may comprise different amounts (concentrations by weight or volume) of the photoactive resin, the plurality of particles, or both. In an example, the viscous liquid may comprise metallic particles, and the additional viscous liquid may comprise ceramic particles. A first concentration of the metallic particles in the viscous liquid and a second concentration of the ceramic particles in the additional viscous liquid may be the same or different. A first photoactive resin in the viscous liquid and a second photoactive resin in the additional viscous liquid may be the same or different. In another example, the viscous liquid may comprise a first type of metallic particles, and the additional viscous liquid may comprise a second type of metallic particles. In a different example, the viscous liquid may comprise ceramic particles at a first concentration, and the additional viscous liquid may comprise the same ceramic particles at a second concentration that is different from the first concentration.

The method may comprise providing a cleaning zone. The cleaning zone may be configured adjacent to the open platform. The method may further comprise moving the deposition head to the cleaning zone and activating the cleaning zone to clean the deposition head. The deposition head may be cleaned prior to depositing a new film of the viscous liquid. The deposition head may be cleaned subsequent to printing at least a portion of the 3D object. The cleaning zone may be configured in a path of movement of the deposition head across the open platform. The cleaning zone may be configured to clean the deposition head. Cleaning the deposition head may (i) improve reliability and reproducibility of printing at least the portion of the 3D object, and (ii) reduce wear and tear of the deposition head. The deposition head may be static or move relative to the cleaning zone while the cleaning zone cleans the deposition head. The cleaning zone may comprise a wiper, a nozzle configured to provide at least one cleaning solvent, or both. The wiper of the cleaning zone may be a blade (e.g., a doctor blade), a roller, or a rod. In some cases, one or more wipers of the cleaning zone may come in contact with one or more wipers of the deposition head and remove any excess resin remaining on the one or more wipers of the deposition head. In some cases, one or more nozzles of the cleaning zone may dispense or jet the at least one cleaning solvent to the one or more wipers of the deposition head for cleaning. The one or more nozzles of the cleaning zone may be in fluid communication with at least one source of the at least one cleaning solvent. At least a portion of the viscous liquid may be soluble in the at least one cleaning solvent. The cleaning zone may comprise a repository that can hold the excess viscous liquid that is removed from the deposition head and/or the at least one cleaning solvent.

The method may comprise providing a repository (e.g., vat or container) adjacent to the open platform. The repository may be configured to collect the viscous liquid from the film of the deposition head. The repository may be configured to hold any excess viscous liquid that is removed from the print window by the deposition head. After removing any excess viscous liquid from the print window, the deposition head may move and use at least one wiper to collect the excess viscous liquid into the repository. The repository may be a recycling bin. The repository may be in fluid communication with the source of the viscous liquid to recycle the collected excess viscous liquid for printing. Alternatively or in addition to, the collected excess viscous liquid may be removed for reprocessing. The reprocessing of the collected excess viscous liquid may comprise (i) filtering out any polymerized solid particulates, (ii) filtering out any of the plurality of particles that may be greater than a target particle size, (iii) remixing the viscous liquid to ensure homogeneity, and/or (iv) removing at least a portion of air entrapped in the viscous liquid. In some cases, the at least the portion of air entrapped in the viscous liquid may be removed by centrifuging the viscous liquid. In some cases, the repository may comprise a sensor (e.g., an optical sensor or a weight scale) to detect when the repository is full and/or when an amount of the collected excess viscous liquid is above a predefined threshold.

The method may comprise providing a transparent film adjacent to the open platform and configured to hold the film of the viscous liquid. The transparent film may cover the print window. The transparent film may comprise one or more fluoropolymers that reduce adhesion of a cured portion of the viscous liquid on the transparent film. Examples of the one or more fluoropolymers include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). The transparent film may reduce or eliminate any undesirable force (e.g., a sliding or rotational mechanism) that may otherwise be needed to separate the cured portion of the viscous liquid and the print window. This may yield a reduced failure rate and increased printing speed.

The method may comprise providing a motion stage adjacent to the open platform. The motion stage may be coupled to the deposition head and configured to direct movement of the deposition head across the open platform. In addition, the motion stage may be coupled to one or more other components of the system that move across the platform (e.g., an additional deposition head, a sensor, etc.). The motion stage may be connected to an actuator that is configured to direct movement of the motion stage. The actuator may be a mechanical, hydraulic, pneumatic, electro-mechanical, or magnetic actuator. The controller may be operatively coupled to the actuator to control movement of the motion stage. Alternatively or in addition to, the system may comprise an additional motion stage coupled to the open platform to direct movement of the open platform relative to other components of the system.

The method may comprise providing the optical source that provides the light through the print window for curing the at least the portion of the film of the viscous liquid. In some cases, the light of the optical source may comprise a first wavelength for curing the photoactive resin in a first portion of the film of the viscous liquid. The first wavelength may activate the at least one photoinitiator of the photoactive resin, thereby initiating curing of the polymeric precursors into the polymeric material. The light may be a photoinitiation light, and the first portion of the film may be a photoinitiation layer. The optical source may provide a different light having a third wavelength for inhibiting curing of the photoactive resin in a second portion of the film of the viscous liquid. The first wavelength and the third wavelength may be different. The third wavelength may activate the at least one photoinhibitor of the photoactive resin, thereby inhibiting curing of the polymeric precursors into the polymeric material. The different light may be a photoinhibition light, and the second portion of the film of the viscous liquid may be a photoinhibition layer. In some cases, a dual-wavelength projector (e.g., a dual-wavelength laser) may be used as the optical source that provides both the photoinitiation light and the photoinhibition light.

In some cases, the light of the optical source may comprise a first wavelength for curing the photoactive resin in a first portion of the film of the viscous liquid. The first wavelength may activate the at least one photoinitiator of the photoactive resin, thereby initiating curing of the polymeric precursors into the polymeric material. The light may be a photoinitiation light, and the first portion of the film may be a photoinitiation layer. The light may be a patterned light. The method may further comprise providing a different optical source comprising a different light having a third wavelength for inhibiting curing of the photoactive resin in a second portion of the film of the viscous liquid. The first wavelength and the third wavelength may be different. The third wavelength may activate the at least one photoinhibitor of the photoactive resin, thereby inhibiting curing of the polymeric precursors into the polymeric material. The different light may be a photoinhibition light, and the second portion of the film of the viscous liquid may be a photoinhibition layer. The different light may be a flood light. The photoinhibition layer may prevent adhesion of the cured polymeric material to the print window (or to the transparent film on or adjacent to the print window).

The optical source that directs the photoinitiation light may be a mask-based display, such as a liquid crystal display (LCD) device, or light emitting, such as a discrete light emitting diode (LED) array device. Alternatively, the optical source that directs the photoinitiation light may be a digital light processing (DLP) device, including a digital micromirror device (DMD) for producing patterned light that can selectively illuminate and cure 3D printed structures. The initiation light directed from the DLP device may pass through one or more projection optics (e.g., a light projection lens) prior to illuminating through the print window and to the film of the viscous liquid. The one or more projection optics may be integrated in the DLP device. Alternatively or in addition to, the one or more projection optics or may be configured between the DLP device and the print window. A relative position of the one or more projection optics relative to the DLP device and the print window may be adjustable to adjust an area of the photoinitiation layer in the film of the viscous liquid. The area of the photoinitiation layer may be defined as a build area. In some cases, the one or more projection optics may be on a projection optics platform. The projection optics platform may be coupled to an actuator that directs movement of the projection optics platform. The controller may be operatively coupled to the actuator to control movement of the projection optics platform. The controller may direct the actuator (e.g., a screw-based mechanism) to adjust a relative position of the one or more projection optics to the DLP device and the print window during printing the 3D object.

The different optical source that directs the photoinhibition light may comprise a plurality of light devices (e.g., a plurality of light emitting diodes (LEDs)). The light devices may be on a light platform. The light platform may be configured (i) move relative to the print window and (ii) yield a uniform projection of the photoinhibition light within the photoinhibition layer in the film of the viscous liquid adjacent to the print window. In some cases, the position of the light platform may be independently adjustable with respect to a position of the optical source that directs the photoinitiation light. The light platform comprising the plurality of light devices may be arranged with respect to the print window such that a peak intensity of each of the plurality of light devices is directed at a different respective position (e.g., corner or other position) of the build area. In an example, the build area may have four corners and a separate beam of light (e.g., a separate LED) may be directed to each corner of the build area. The beams of photoinhibition light from the plurality of light devices may overlap to provide the uniform projection of the photoinhibition light within the photoinhibition layer. The light platform may be coupled to an actuator that directs movement of the light platform. The controller may be operatively coupled to the actuator to control movement of the light platform. The controller may direct the actuator (e.g., a screw-based mechanism) to adjust a relative position of the plurality of light devices to the print window during printing the 3D object. In some cases, the one or more projection optics to the DLP device (for the photoinitiation light) may be on the light platform.

Whether using one, two, or more optical sources, the photoinhibition light may be configured to create the photoinhibition layer in the film of the viscous liquid adjacent to the print window. In some cases, the photoinhibition light may be configured to form the photoinhibition layer in the film of the viscous liquid adjacent to the transparent film that is covering the print window. Furthermore, the photoinitiation light may be configured to cure the photoactive resin in the photoinitiation layer that resides between the photoinhibition layer and the build head. The photoactive resin in the photoinitiation layer may be cured into at least a portion of the 3D structure. In some cases, the photoinitiation light may be configured to cure the photoactive resin in the photoinitiation layer that resides between the photoinhibition layer and the at least the portion of the 3D structure adjacent to the build head.

A thickness of the photoinitiation layer, the photoinhibition layer, or both may be adjusted by adjusting an intensity and duration of the photoinitiation light, the photoinhibition light, or both. The thickness of the photoinitiation layer, the photoinhibition layer, or both may be adjusted to adjust the thickness of the printed layer of the at least the portion of the 3D object. Alternatively or in addition to, the thickness of the photoinitiation layer, the photoinhibition layer, or both may be adjusted by adjusting the speed at which the build head moves away in a direction away from the print window.

The addition light source (i.e. sensor light source) that directs the additional light (i.e., sensor light) may comprise a plurality of light devices (e.g., a plurality of light emitting diodes (LEDs)). The light devices may be on a light platform. In some cases, the light platform may be configured (i) move relative to the print window and (ii) yield a uniform projection of the sensor light within the film of the viscous liquid adjacent to the print window. In some cases, the position of the light platform may be independently adjustable with respect to a position of the optical source that directs the photoinitiation light. The light platform comprising the plurality of light devices for directing the sensor light may be arranged with respect to the print window such that a peak intensity of each of the plurality of light devices is directed at a different respective position (e.g., corner or other position) of the build area. In an example, the build area may have four corners and a separate beam of light (e.g., a separate LED) may be directed to each corner of the build area. The beams of sensor light from the plurality of light devices may overlap to provide the uniform projection of the sensor light within the photoinhibition layer. The light platform may be coupled to an actuator that directs movement of the light platform. The controller may be operatively coupled to the actuator to control movement of the light platform. The controller may direct the actuator (e.g., a screw-based mechanism) to adjust a relative position of the plurality of light devices to the print window during printing the 3D object. In some cases, the one or more projection optics to the DLP device (for the photoinitiation light) may be on the light platform. In some cases, the additional optical source for directing the photoinhibition light and the sensor light source may be on a same light platform. In some cases, the additional optical source for directing the photoinhibition light and the sensor light source may be on different light platforms.

Once the at least the portion of the 3D object is printed (herein referred to as a green body), the method may further comprise removing the green body from the build head. The green body may be separated from the build head by inserting a thin material (e.g. a steel blade) between the green body and the build head. In some cases, a first layer of the green body that is in contact with the build head may not comprise the plurality of particles for easy removal from the build head by the thin material. The method may further comprise washing the green body. In some cases, the green body may be washed by jetting a solvent (e.g., isopropanol) to remove any excess polymeric precursor.

The method may further comprise subjecting the green body comprising at least the polymeric material to heating (e.g., in a furnace), to thereby heat at least the plurality of particles encapsulated in the at least the polymeric material. The heating may be under conditions sufficient to sinter the plurality of particles to form a final product that is at least a portion of a 3D object or an entire 3D object. During heating (e.g., sintering), the organic components (e.g., the polymeric material, additives, etc.) may decompose and leave the green body. At least a portion of the decomposed organic components may leave the green body in gas phase.

The green body may be heated in a processing chamber. The temperature of the processing temperature may be regulated with at least one heater. The processing chamber may be an oven or a furnace. The oven or furnace may be heated with various heating approaches, such as resistive heating, convective heating and/or radiative heating. Examples of the furnace include an induction furnace, electric arc furnace, gas-fired furnace, plasma arc furnace, microwave furnace, and electric resistance furnace. Such heating may be employed at a fixed or variating heating rate from an initial temperature to a target temperature or temperature range.

A green body comprising metallic and/or intermetallic particles may be heated from room temperature to a processing temperature. The processing temperature may be kept constant or substantially constant for a given period of time, or may be adjusted to one or more other temperatures. The processing temperature may be selected based on the material of the particles in the green body (e.g., the processing temperature may be higher for material having a higher melting point than other materials). The processing temperature may be sufficient to sinter but not completely melt the particles in the green body. As an alternative, the processing temperature may be sufficient to melt the particles in the green body.

The processing temperature for heating (e.g., sintering) the green body (including the metal and/or intermetallic particles) may range between about 300 degrees Celsius to about 2200 degrees Celsius. The processing temperature for sintering the green body may be at least about 300 degrees Celsius, 350 degrees Celsius, 400 degrees Celsius, 450 degrees Celsius, 500 degrees Celsius, 550 degrees Celsius, 600 degrees Celsius, 650 degrees Celsius, 700 degrees Celsius, 750 degrees Celsius, 800 degrees Celsius, 850 degrees Celsius, 900 degrees Celsius, 950 degrees Celsius, 1000 degrees Celsius, 1050 degrees Celsius, 1100 degrees Celsius, 1150 degrees Celsius, 1200 degrees Celsius, 1250 degrees Celsius, 1300 degrees Celsius, 1350 degrees Celsius, 1400 degrees Celsius, 1450 degrees Celsius, 1500 degrees Celsius, 1550 degrees Celsius, 1600 degrees Celsius, 1700 degrees Celsius, 1800 degrees Celsius, 1900 degrees Celsius, 2000 degrees Celsius, 2100 degrees Celsius, 2200 degrees Celsius, or more. The processing temperature for sintering the green body (including the particles) may be at most about 2200 degrees Celsius, 2100 degrees Celsius, 2000 degrees Celsius, 1900 degrees Celsius, 1800 degrees Celsius, 1700 degrees Celsius, 1600 degrees Celsius, 1550 degrees Celsius, 1500 degrees Celsius, 1450 degrees Celsius, 1400 degrees Celsius, 1350 degrees Celsius, 1300 degrees Celsius, 1250 degrees Celsius, 1200 degrees Celsius, 1150 degrees Celsius, 1100 degrees Celsius, 1050 degrees Celsius, 1000 degrees Celsius, 950 degrees Celsius, 900 degrees Celsius, 850 degrees Celsius, 800 degrees Celsius, 750 degrees Celsius, 700 degrees Celsius, 650 degrees Celsius, 600 degrees Celsius, 550 degrees Celsius, 500 degrees Celsius, 450 degrees Celsius, 400 degrees Celsius, 350 degrees Celsius, 300 degrees Celsius, or less.

In an example, a green body comprising aluminum particles may be heated from room temperature to a processing temperature ranging between about 350 degrees Celsius to about 700 degrees Celsius. In another example, a green body comprising copper particles may be heated from room temperature to a processing temperature of about 1000 degrees Celsius. In another example, a green body comprising stainless steel particles may be heated from room temperature to a processing temperature ranging between about 1200 degrees Celsius to about 1500 degrees Celsius. In another example, a green body comprising other tool steel particles may be heated from room temperature to a processing temperature of about 1250 degrees Celsius. In another example, a green body comprising tungsten heavy alloy particles may be heated from room temperature to a processing temperature of about 1500 degrees Celsius.

During sintering the green body comprising the metallic and/or intermetallic particles, the temperature of the processing chamber may change at a rate ranging between about 0.1 degrees Celsius per minute (degrees Celsius/min) to about 200 degrees Celsius/min. The temperature of the processing chamber may change at a rate of at least about 0.1 degrees Celsius/min, 0.2 degrees Celsius/min, 0.3 degrees Celsius/min, 0.4 degrees Celsius/min, 0.5 degrees Celsius/min, 1 degrees Celsius/min, 2 degrees Celsius/min, 3 degrees Celsius/min, 4 degrees Celsius/min, 5 degrees Celsius/min, 6 degrees Celsius/min, 7 degrees Celsius/min, 8 degrees Celsius/min, 9 degrees Celsius/min, 10 degrees Celsius/min, 20 degrees Celsius/min, 50 degrees Celsius/min, 100 degrees Celsius/min, 150 degrees Celsius/min, 200 degrees Celsius/min, or more. The temperature of the processing chamber may change at a rate of at most about 200 degrees Celsius/min, 150 degrees Celsius/min, 100 degrees Celsius/min, 50 degrees Celsius/min, 20 degrees Celsius/min, 10 degrees Celsius/min, 9 degrees Celsius/min, 8 degrees Celsius/min, 7 degrees Celsius/min, 6 degrees Celsius/min, 5 degrees Celsius/min, 4 degrees Celsius/min, 3 degrees Celsius/min, 2 degrees Celsius/min, 1 degrees Celsius/min, 0.5 degrees Celsius/min, 0.4 degrees Celsius/min, 0.3 degrees Celsius/min, 0.2 degrees Celsius/min, 0.1 degrees Celsius/min, or less.

In some cases, during sintering the green body comprising the metallic and/or intermetallic particles, the process may comprise holding at a fixed temperature between room temperature and the processing temperature for a time ranging between about 1 min to about 240 min. The sintering process may comprise holding at a fixed temperature for at least about 10 min, 20 min, 30 min, 40 min, 50 min, 60 min, 90 min, 120 min, 150 min, 180 min, 210 min, 240 min, or more. The sintering process may comprise holding at a fixed temperature for at most about 240 min, 210 min, 180 min, 150 min, 120 min, 90 min, 60 min, 50 min, 40 min, 30 min, 20 min, 10 min, 1 min, or less. In some cases, during the sintering process, the temperature may not be held at a processing temperature for an extended period of time (e.g., once a target temperature is reached, the temperature may be reduced). In an example, the sintering process may increase the temperature to a first temperature and immediately (e.g., without holding at the first temperature for a period of time) lower the temperature to a second temperature that is lower than the first temperature.

A green body comprising ceramic particles may be heated from room temperature to a processing temperature ranging between about 900 degrees Celsius to about 2000 degrees Celsius. The processing temperature may be kept constant or substantially constant for a given period of time, or may be adjusted to one or more other temperatures. The processing temperature for sintering the green body (including the particles) may be at least about 900 degrees Celsius, 950 degrees Celsius, 1000 degrees Celsius, 1050 degrees Celsius, 1100 degrees Celsius, 1150 degrees Celsius, 1200 degrees Celsius, 1300 degrees Celsius, 1400 degrees Celsius, 1500 degrees Celsius, 1600 degrees Celsius, 1700 degrees Celsius, 1800 degrees Celsius, 1900 degrees Celsius, 2000 degrees Celsius, or more. The processing temperature for sintering the green body may be at most about 2000 degrees Celsius, 1900 degrees Celsius, 1800 degrees Celsius, 1700 degrees Celsius, 1600 degrees Celsius, 1500 degrees Celsius, 1400 degrees Celsius, 1300 degrees Celsius, 1200 degrees Celsius, 1150 degrees Celsius, 1100 degrees Celsius, 1050 degrees Celsius, 1000 degrees Celsius, 950 degrees Celsius, 900 degrees Celsius, or less.

In an example, a green body comprising alumina particles may be heated from room temperature to a processing temperature ranging between about 1500 degrees Celsius to about 1950 degrees Celsius. In an example, a green body comprising cemented carbide particles may be heated from room temperature to a processing temperature ranging between about 1700 degrees Celsius. In an example, a green body comprising zirconia particles may be heated from room temperature to a processing temperature ranging between about 1100 degrees Celsius.

During sintering the green body comprising the ceramic particles, the temperature of the processing chamber may change at a rate ranging between about 0.1 degrees Celsius per minute (degrees Celsius/min) to about 200 degrees Celsius/min. The temperature of the processing chamber may change at a rate of at least about 0.1 degrees Celsius/min, 0.2 degrees Celsius/min, 0.3 degrees Celsius/min, 0.4 degrees Celsius/min, 0.5 degrees Celsius/min, 1 degrees Celsius/min, 2 degrees Celsius/min, 3 degrees Celsius/min, 4 degrees Celsius/min, 5 degrees Celsius/min, 6 degrees Celsius/min, 7 degrees Celsius/min, 8 degrees Celsius/min, 9 degrees Celsius/min, 10 degrees Celsius/min, 20 degrees Celsius/min, 50 degrees Celsius/min, 100 degrees Celsius/min, 150 degrees Celsius/min, 200 degrees Celsius/min, or more. The temperature of the processing chamber may change at a rate of at most about 200 degrees Celsius/min, 150 degrees Celsius/min, 100 degrees Celsius/min, 50 degrees Celsius/min, 20 degrees Celsius/min, 10 degrees Celsius/min, 9 degrees Celsius/min, 8 degrees Celsius/min, 7 degrees Celsius/min, 6 degrees Celsius/min, 5 degrees Celsius/min, 4 degrees Celsius/min, 3 degrees Celsius/min, 2 degrees Celsius/min, 1 degrees Celsius/min, 0.5 degrees Celsius/min, 0.4 degrees Celsius/min, 0.3 degrees Celsius/min, 0.2 degrees Celsius/min, 0.1 degrees Celsius/min, or less.

In some cases, during sintering the green body comprising the ceramic particles, the process may comprise holding at a fixed temperature between room temperature and the processing temperature for a time ranging between about 1 min to about 240 min. The sintering process may comprise holding at a fixed temperature for at least about 1 min, 10 min, 20 min, 30 min, 40 min, 50 min, 60 min, 90 min, 120 min, 150 min, 180 min, 210 min, 240 min, or more. The sintering process may comprise holding at a fixed temperature for at most about 240 min, 210 min, 180 min, 150 min, 120 min, 90 min, 60 min, 50 min, 40 min, 30 min, 20 min, 10 min, 1 min, or less. In some cases, during the sintering process, the temperature may not be held at a processing temperature for an extended period of time (e.g., once a target temperature is reached, the temperature may be reduced). In an example, the sintering process may increase the temperature to a first temperature and immediately (e.g., without holding at the first temperature for a period of time) lower the temperature to a second temperature that is lower than the first temperature.

During sintering the green body comprising the plurality of particles (e.g. metal, intermetallic, and/or ceramic), the green body may be subjected to cooling by a fluid (e.g., liquid or gas). The fluid may be applied to the green body and/or the processing chamber to decrease the temperature of the green body. The fluid may be subjected to flow upon application of positive or negative pressure. Examples of the fluid for cooling the green body include water, oil, hydrogen, nitrogen, argon, etc. Cooling the green body during the sintering process may control grain size within the sintered body.

The controller may be configured to control various parts (e.g., actuators, sensors, etc.) of different components of the 3D printing system, as described in detail above.

In another aspect, the present disclosure provides a system for printing a 3D object. The system may comprise a build surface configured to retain a film comprising a polymeric precursor. The system may comprise a sensor in sensing communication with the build surface. The system may comprise a light source in optical communication with the build surface, wherein the light source is configured to provide light. The system may comprise a controller comprising a circuit operatively coupled to the sensor and the light source, wherein the controller is configured to (i) use the sensor to determine a profile of the film, which profile is indicative of a quality of the film, and (ii) determine if the profile meets a quality threshold, and (iii) subsequent to (ii), (1) if said profile meets a quality threshold, direct said light source to expose at least a portion of said film to said light to initiate formation of a polymeric material from said polymeric precursor, thereby printing at least a portion of said 3D object, or (2) if said profile does not meet said quality threshold, direct said film to be adjusted or redeposited. The profile may be a feature of the film. The systems disclosed herein may utilize all components and configurations described in methods for printing a 3D object of the present disclosure.

The controller may be further configured to (i) expose the film to an additional light (i.e., a sensor light) and (ii) use the sensor to detect at least a portion of the additional light that is transmitted through the film. The light (i.e., the photoinitiation light) may have a first wavelength and the additional light may have a second wavelength. The second wavelength of the sensor light may be different than the first wavelength of the photoinitiation light. In an example, the second wavelength of the sensor light and the first wavelength of the photoinitiation light are different. The light source (i.e., a photoinitiation light source) may be configured to provide the additional light. Alternatively or in addition to, an additional light source (i.e., a sensor light source) may be configured to provide the additional light.

The system may further comprise an optical diffuser located adjacent to the build surface and away from the film. The optical diffuser may be configured to diffuse the additional light before at least a portion of the light reaches the sensor. The optical diffuser may be disposed (i) between a source of the additional light and the film comprising the polymeric precursor, and/or (ii) between the film comprising the polymeric precursor and the sensor.

During use, the film comprising the polymeric precursor may further comprise a plurality of particles. The plurality of particles may be at least one metal particle, at least one ceramic particle, or a combination thereof. The plurality of particles may be usable for printing the at least the portion of the 3D object. During use, once at least a portion of the polymeric precursor in the film is formed into the polymeric material, the polymeric material may encapsulate the plurality of particles. During use, the film may further comprise (i) a photoinitiator that initiates formation of the polymeric material from the polymeric precursor away from the print window, and (ii) a photoinhibitor that inhibits formation of the polymeric material from the polymeric precursor adjacent to the print window. The polymeric material formed from at least a portion of the polymeric precursor in the film may encapsulate other components of the film, such as, for example, photoinitiator(s), photoinhibitor(s), light absorber(s), binder(s), etc.

During use, the film comprising the polymeric precursor may further comprise at least one metal particle, at least one ceramic particle, or a combination thereof.

The system may further comprise a build head configured to move relative to the build surface and hold the at least the portion of the 3D object. The system may further comprise a deposition head adjacent to the build surface and configured to move across the build surface to deposit the film adjacent to the build surface. The build surface may comprise a print window configured to retain the film. The build surface may be part of a vat that is configured to retain the film. The build surface may be part of an open platform that is configured to retain the film.

FIGS. 1A to 1D show examples of a 3D printing system 100. Referring to FIG. 1A, the system 100 includes an open platform 101 comprising a print window 102 to hold a film of a viscous liquid 104, which includes a photoactive resin. The photoactive resin includes a polymeric precursor that is configured to form a polymeric material. The open platform 101 may be a build surface for depositing the film 104 comprising the polymeric precursor, as well as for printing at least a portion of the 3D object. The viscous liquid of the film 104 may also include a plurality of particles (e.g., metal, intermetallic, ceramic, and/or polymeric particles). The system 100 includes a deposition head 105 that comprises a nozzle 107 that is in fluid communication with a source of the viscous liquid 109. The source of the viscous liquid 109 may be a syringe. The syringe may be operatively coupled to a syringe pump. The syringe pump can direct the syringe in a positive direction (from the source of the viscous liquid 109 towards the nozzle 107) to dispense the viscous liquid. The syringe pump can direct the syringe in a negative direction (away from the nozzle 107 towards the source of the viscous liquid 109) to retract any excess viscous liquid in the nozzle and/or on the print window back into the syringe. The deposition head 105 is configured to move across the open platform 101 comprising the print window 102 to deposit the film of the viscous liquid 104. In some cases, the system 100 may comprise an additional source of an additional viscous liquid that is in fluid communication with the nozzle 107 or an additional nozzle of the deposition head 105. In some cases, the system 100 may comprise an additional deposition head comprising an additional nozzle that is in fluid communication with an additional source of an additional viscous liquid. In some cases, the system 100 may comprise three or more deposition heads and three or more sources of the same or different viscous liquids.

Referring to FIG. 1A, the system 100 includes one or more sensors 150 in sensing communication with the open platform 101 comprising the print window 102. The sensor(s) 150 may be operatively coupled to a controller comprising a circuit. The sensor(s) 150 are configured to determine a profile of the film 104, which profile is indicative of a quality of the film 104. Examples of the profile of the film 104 include thickness, width, area, volume, shape, densitometry (e.g., density of one or more particles), and defects. The system 100 also includes one or more sensor light sources 152 in in optical communication with the open platform 101 comprising the print window 102. The sensor light source(s) 152 are configured to provide one or more sensor lights 160 that are to be used by the sensor(s) 150 to at least determine the profile of the film 104. The sensor light source(s) 152 can be arranged on a light platform 138. The light platform 138 is mounted on adjustable axis rails 140. The adjustable axis rails 140 allow for movement of the light platform 138 along an axis towards or away from the print window 102. A relative position of the light platform 138 comprising the sensor light source(s) 152 may be adjusted to project the sensor light(s) 160 into the film 104 at the respective peak intensity and/or in a uniform projection manner. In some cases, the light platform 138 functions as a heat-sink for at least the sensor light source(s) 152 arranged on the light platform 138. In some cases, the sensor light(s) 160 may be directed to the open platform 101 non-uniformly (e.g., provided with bright spots corresponding to location(s) of the sensor light source(s) 152. Thus, the system includes one or more diffusers 155 that are movable relative to the sensor light source(s) 152 and the print window 102 of the open platform 101. The diffuser(s) 155 may be located adjacent to the build surface and away from the film 104. The diffuser(s) 155 are configured to cause the sensor light(s) 160 to spread evenly across a surface of the diffuser(s) 155, thereby minimizing or removing high intensity bright spots as the sensor light(s) 160 travel through the diffuser(s) 155. Thus, the non-diffused sensor light(s) 160 pass through the diffuser(s) 155 and are directed to the print window 102 as diffused sensor light(s) 162. The sensor(s) 150 are in sensing communication with a sensing zone 164 adjacent to open platform 101 comprising the print window 102. After the film 104 is printed, the diffused sensor light(s) 162 are directed to the print window 102, and the sensor(s) 150 is configured to detect (e.g., measure, capture one or more images of, etc.) at least a portion of the sensor light(s) 162 that is transmitted through (i) the print window 102 and/or (ii) the print window 102 and the film 104. The sensor light source(s) 152 may provide one or more IR or visible light(s). The sensor(s) may detect an optical densitometry profile of the film 104 to provide a feedback on the profile of the film 104.

Figure 1B:
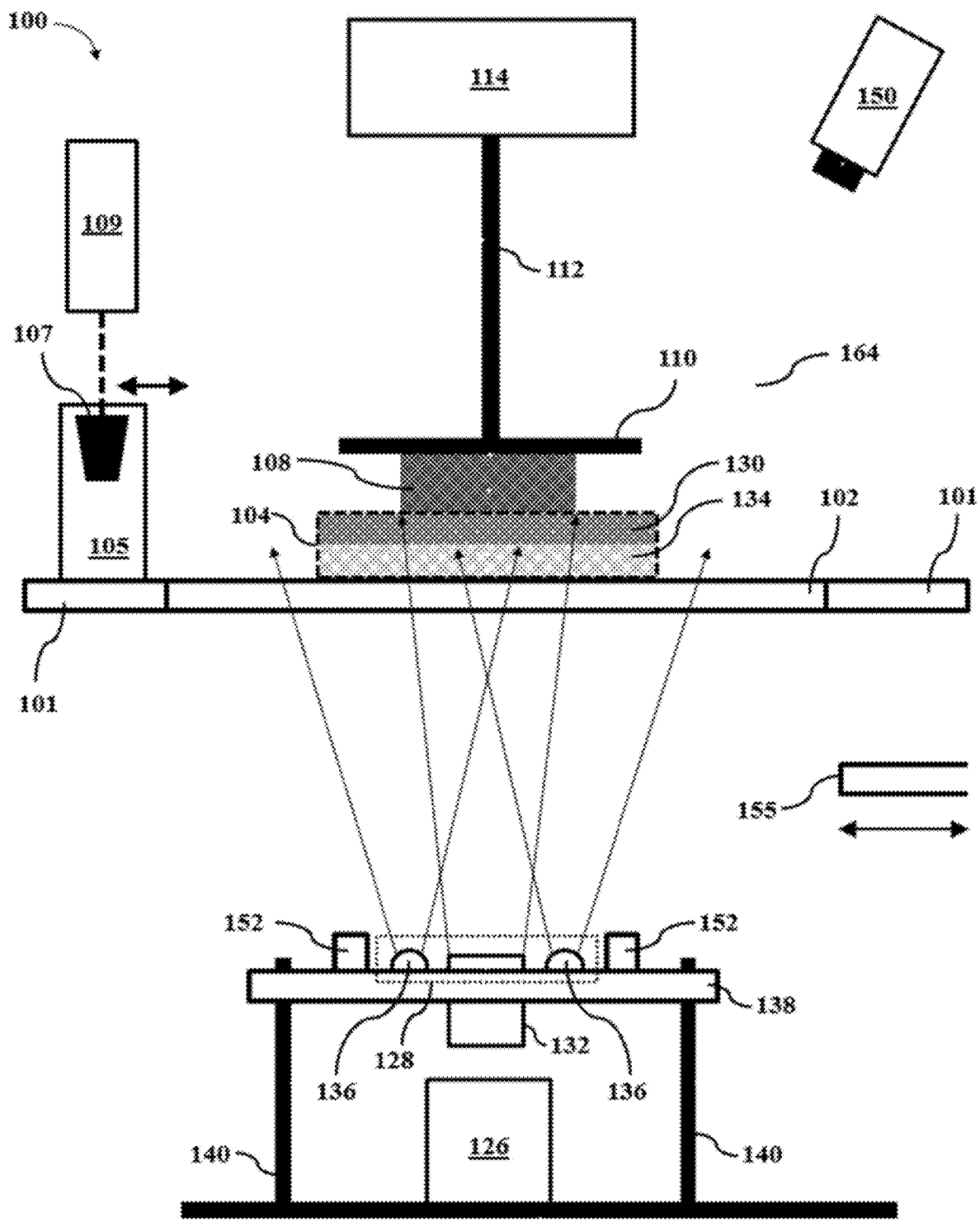

Referring to FIG. 1B, if the profile of the film 104, as detected by the sensor(s) 150, meets a quality threshold (e.g., as determined by the controller operatively coupled to the sensor(s) 150), the diffuser(s) 155 may be moved away from the print window 102, the sensor light source(s) be may be turned off, the build head 110 may be moved towards to film 104 on or adjacent to the print window 102, and a different illumination may be transmitted through the print window 102 to cure at least a portion of the film of the viscous liquid 104 to print at least a portion of a 3D structure. The diffuser(s) 155 may be moved away from the print window 102 to prevent interference with the illumination for curing (and illumination for inhibition of curing). Such different illumination may cure at least a portion of the film of the viscous liquid 104 to print at least a portion of a 3D structure on a previously printed object 108 that is coupled to the build head 110. The previously printed object 108 is shown as a block. However, in practice, a wide variety of complicated shapes may be printed. In some cases, the at least the portion of the 3D structure 108 includes entirely solid structures, hollow core prints, lattice core prints, and generative design geometries. The at least the portion of the 3D structure 108 is printed on a build head 110, which is connected by a rod 112 to one or more 3D printing mechanisms 114. The 3D printing mechanisms 114 may include various mechanical structures for moving the build head 110 in a direction towards and/or away from the open platform 101. This movement is a relative movement, and thus moving pieces can be the build head 110, the open platform 101, or both, in various embodiments. In some cases, the 3D printing mechanisms 114 include Cartesian (xyz) type 3D printer motion systems or delta type 3D printer motion systems. In some cases, the 3D printing mechanisms 114 include one or more controllers to direct movement of the build head 110, the open platform 101, or both.

Referring to FIG. 1B, multiple devices emitting various wavelengths and/or intensities of light, including a light projection device 126 and light sources 128, may be positioned below the print window 102 and in communication with the one or more controllers. In some cases, the light sources 128 can include at least 2, 3, 4, 5, 6, or more light sources. As an alternative to the light sources 128, a single light source may be used. The light projection device 126 directs a light having a first wavelength through the print window 102 and into the film of the viscous liquid 104 adjacent to the print window 102. The first wavelength emitted by the light projection device 126 is selected to produce photoinitiation and is used to create at least a portion of the 3D structure on the at least the portion of the 3D structure 108 that is adjacent to the build head 110 by curing the photoactive resin in the film of the viscous liquid 104 within a photoinitiation layer 130. In some cases, the light projection device 126 is utilized in combination with one or more projection optics 132 (e.g. a projection lens for a digital light processing (DLP) device), such that the light output from the light projection device 126 passes through the one or more projection optics 132 prior to illuminating the film of the viscous liquid 104 adjacent to the print window 102.

Referring to FIG. 1B, in some cases, the light projection device 126 is a DLP device including a digital micro-mirror device (DMD) for producing patterned light that can selectively illuminate and cure the photoactive resin in the photoinitiation layer 130. The light projection device 126, in communication with the one or more controllers, may receive instructions defining a pattern of illumination to be projected from the light projection device 126 into the photoinitiation layer 130 to cure a layer of the photoactive resin onto the at least the portion of the 3D structure 108.

Referring to FIG. 1B, the light sources 128 direct a different light having a third wavelength into the film of the viscous liquid 104 adjacent to the open platform 101 comprising the print window 102. The different light may be provided as multiple beams from the light sources 128 through the print window 102 simultaneously. As an alternative, the different light may be generated from the light sources 128 and provided as a single beam through the print window 102. The third wavelength emitted by the light sources 128 is selected to produce photoinhibition in the photoactive resin in the film of the viscous liquid 104 and is used to create a photoinhibition layer 134 within the film of the viscous liquid 104 directly adjacent to the print window 102. The light sources 128 can produce a flood light to create the photoinhibition layer 134, the flood light being a non-patterned, high-intensity light. In some cases, the light sources 128 are light emitting diodes (LEDs) 136. The light sources 128 can be arranged on the light platform 138. The light platform 138 is mounted on adjustable axis rails 140. The adjustable axis rails 140 allow for movement of the light platform 138 along an axis towards or away from the print window 102. The light platform 138 and the one or more projection optics 132 may be moved independently. A relative position of the light platform 138 comprising the light sources may be adjusted to project the second light into the photoinhibition layer 134 at the respective peak intensity and/or in a uniform projection manner. In some cases, the light platform 138 functions as a heat-sink for at least the light sources 128 arranged on the light platform 138. The first wavelength of the light for photoinitiation, the third wavelength of the different light for photoinhibition, and a second wavelength of the sensor light(s) 160 (as shown in FIG. 1A) may be different. The light for photoinitiation, the different light for photoinhibition, and the sensor light(s) 160 may be provided by a same light source (e.g., a multi-wavelength laser) or two or more different light sources. The different light for photoinhibition and the sensor light(s) 160 may be provided by a same light source (e.g., a multi-wavelength laser) or different light sources. The different light for photoinhibition and the sensor light(s) 160 may be disposed on the same light platform 138 or different light platforms.

Referring to FIG. 1B, the respective thicknesses of the photoinitiation layer 130 and the photoinhibition layer 134 may be adjusted by the one or more controllers. In some cases, this change in layer thickness(es) is performed for each new 3D printed layer, depending on the desired thickness of the 3D printed layer, and/or the type of viscous liquid in the film of the viscous liquid 104. The thickness(es) of the photoinitiation layer 130 and the photoinhibition layer 134 may be changed, for example, by changing the intensity of the respective light emitting devices (126 and/or 128), exposure times for the respective light emitting devices, or both. In some cases, by controlling relative rates of reactions between the photoactive species (e.g., at least one photoinitiator and at least one photoinhibitor), the overall rate of curing of the photoactive resin in the photoinitiation layer 130 and/or the photoinhibition layer 134 may be controlled. This process can thus be used to prevent curing from occurring at the film of the viscous liquid-print window interface and control the rate at which curing of the photoactive resin takes place in the direction normal to the film of the photoactive resin-print window interface.

Figure 1C:
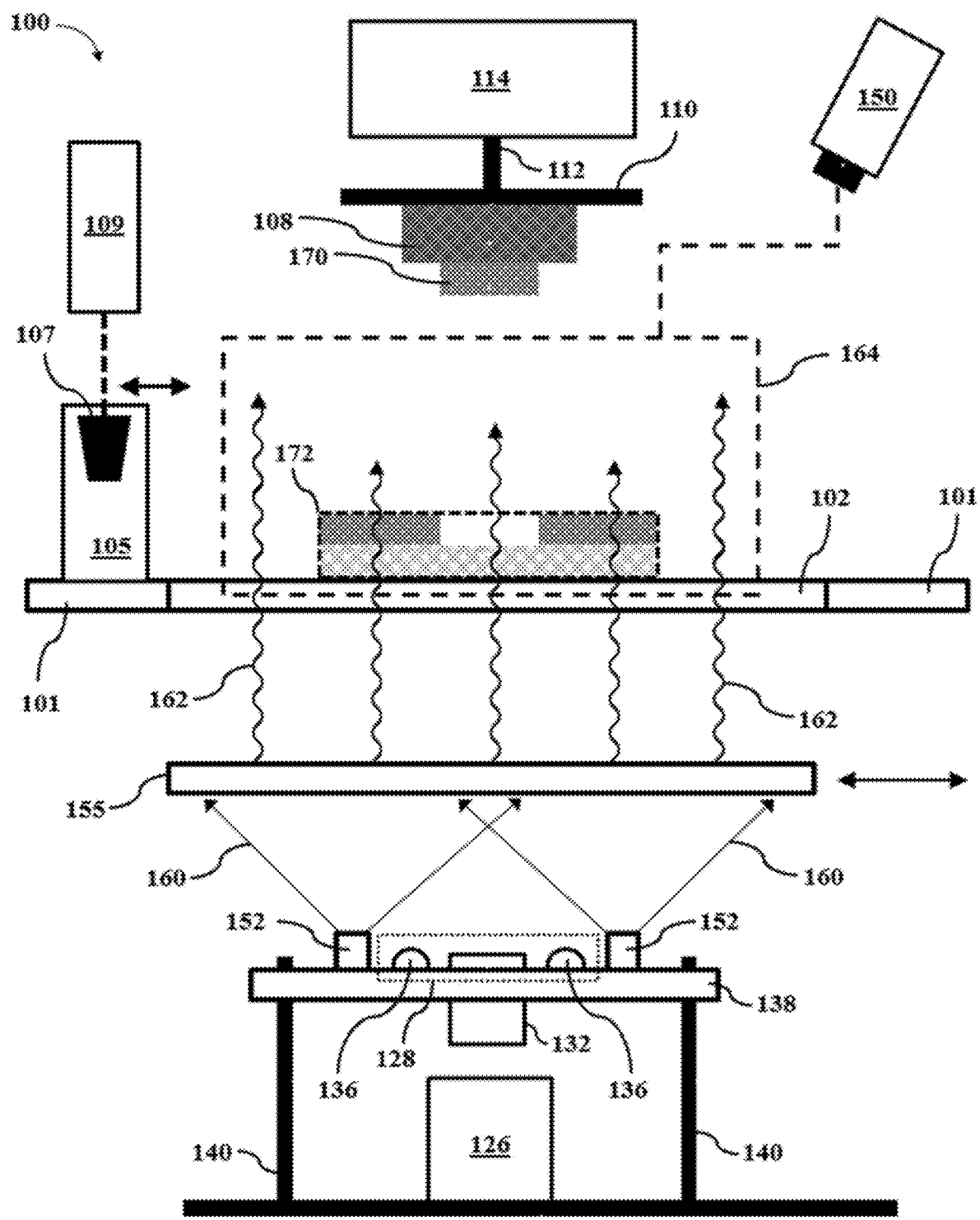

Referring to FIG. 1C, once the at least the portion of the 3D object 170 is printed and coupled to the previously printed object 108 on the build head 110, the build head 110 is moved away from the remainder 172 of the film 104 on or adjacent to the print window 102. The remainder 172 of the film 104 comprises excess viscous liquid from the film 104. The diffuser(s) is moved back towards the print window 102. The sensor light source(s) 152 provide the sensor light(s) 160, which sensor light(s) 160 are transmitted through the diffuser 155 and directed as diffused light(s) 162 towards the print window 102. The sensor(s) 150 in sensing communication with the sensing zone 164 detect (e.g., measure, capture one or more images of, etc.) at least a portion of the diffused sensor light(s) 162 that is transmitted through (i) the print window 102 and/or (ii) the print window 102 and the remainder 172 of the film 104, thereby to obtain a negative image (e.g., a silhouette image) of the recently printed portion 170 of the 3D object. The negative image may be used to assess whether or not the portion 170 of the 3D object was printed in accordance to a computer model of the 3D object (e.g., by the controller). In some cases, the controller may determine that, based at least in part on the negative image, the portion 170 of the 3D object was printed in accordance to the computer model of the 3D object. In such a case, the controller may direct the deposition head 105 to remove the remainder 172 of the film 104 from the print window 102, and deposit a new film of the viscous liquid to print a subsequent portion (e.g., layer) of the 3D object. In some cases, the controller may determine that, based at least in part on the negative image, the portion 170 of the 3D object was not printed in accordance to the computer model of the 3D object. In such a case, the controller may direct the deposition head 105 to remove the remainder 172 of the film 104 from the print window 102, and deposit a new film of the viscous liquid to re-print the previous layer or print a sub-portion of the previous layer that was not printed as part of the portion 170 of the 3D object.

Figure 1D:
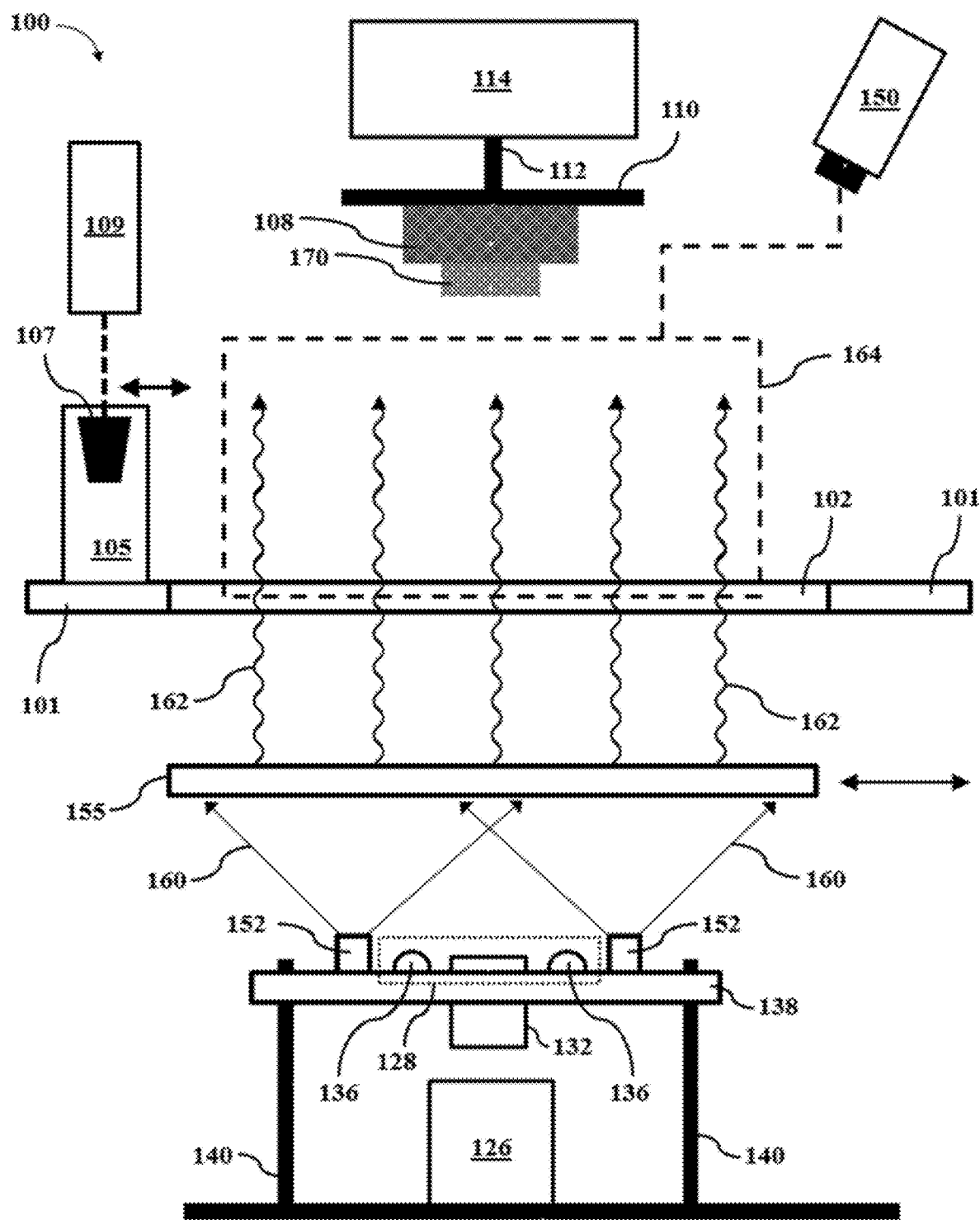

Referring to FIG. 1D, once the film 104 or the remainder 172 of the film 104 is removed from the print window (e.g., by the deposition head 105), the diffused sensor light(s) 162 from the sensor light sources(s) 152 may be directed to the print window 102. The sensor(s) 150 in sensing communication with the sensing zone 164 may detect (e.g., measure, capture one or more images of, etc.) at least a portion of the diffused sensor light(s) 162 that is transmitted through the print window 102 to determine quality of the print window 102 prior to depositing a new film of the viscous liquid.

Computer Systems

The present disclosure provides computer systems that are programmed to implement methods of the disclosure. Computer systems of the present disclosure may be used to regulate various operations of 3D printing, such as providing a film of a viscous liquid adjacent to an open platform and directing a sensor to determine a profile of the film, which profile is indicative of a quality of the film.

Figure 8:
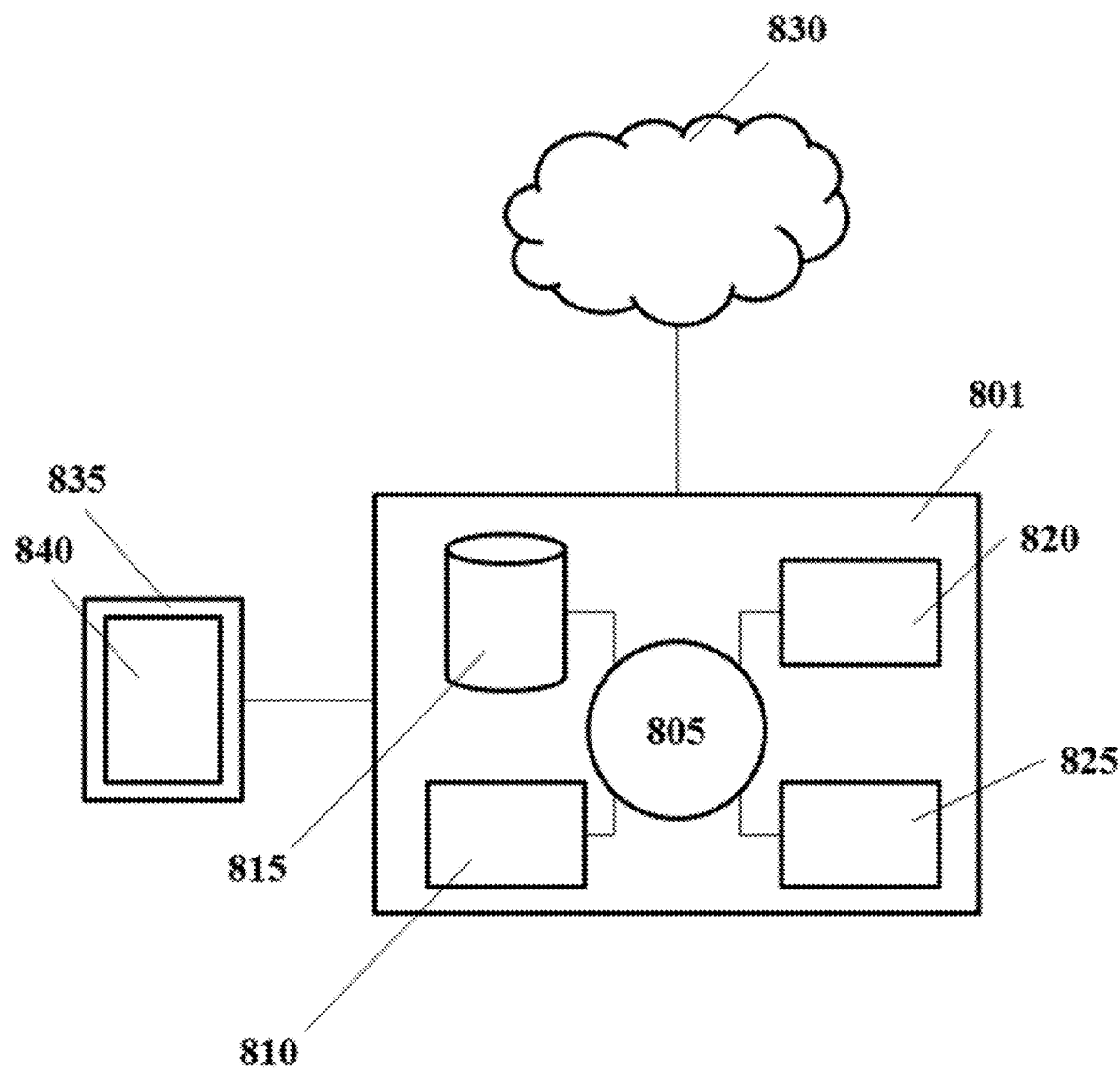
FIG. 8 shows a computer system that is programmed or otherwise configured to implement methods provided herein.

FIG. 8 shows a computer system 801 that is programmed or otherwise configured to communicate with and regulate various aspects of a 3D printer of the present disclosure. The computer system 801 can communicate with the light sensor(s), light sources (e.g., the sensor light source(s)), diffuser, build head, one or more deposition heads, or one or more sources of one or more viscous liquids of the present disclosure. The computer system 801 may also communicate with the 3D printing mechanisms or one or more controllers of the present disclosure. The computer system 801 can be an electronic device of a user or a computer system that is remotely located with respect to the electronic device. The electronic device can be a mobile electronic device.

The computer system 801 includes a central processing unit (CPU, also "processor" and "computer processor" herein) 805, which can be a single core or multi core processor, or a plurality of processors for parallel processing. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data (i.e., a database). The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databas(es), etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and IR data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface (UI) 840 for providing, for example, (i) activate or deactivate a 3D printer for printing a 3D object, (ii) determining when to clean the deposition head, or (iii) determine any defects in the film of the viscous liquid. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 805. The algorithm can, for example, distinguish or differentiate one or more profiles (e.g., features, such as, for example, dimension(s), volume, shape, or pattern) of a film of the viscous liquid on or adjacent to the build surface based on a feedback from the sensor(s).

EXAMPLES

The examples below are illustrative and non-limiting.

Example 1

Figure 2:
FIG. 2 shows an example image of a build surface without a film of a viscous liquid.

FIG. 2 shows an example of a 2D image 200 of the print window prior to deposition of the film of the viscous liquid, as captured by the sensor(s). IR light may be used as the sensor light(s). The print window may or may not include a transparent film (e.g., a fluorinated film) on a surface of the print window. The image 200 may be used as a background image of the print window when analyzing one or more images of the film of the viscous liquid that is deposited on the print window. A 2D transmittance profile of the film may be generated by dividing an image of the film by the background image 200, multiplied by the ratio of the exposure times of those images. In some cases, the image 200 may be captured every time prior to depositing a new film of the viscous liquid. In some cases, the image 200 may be captured once for every two or more depositions of the film of the viscous liquid.

Example 2

Figure 3A:
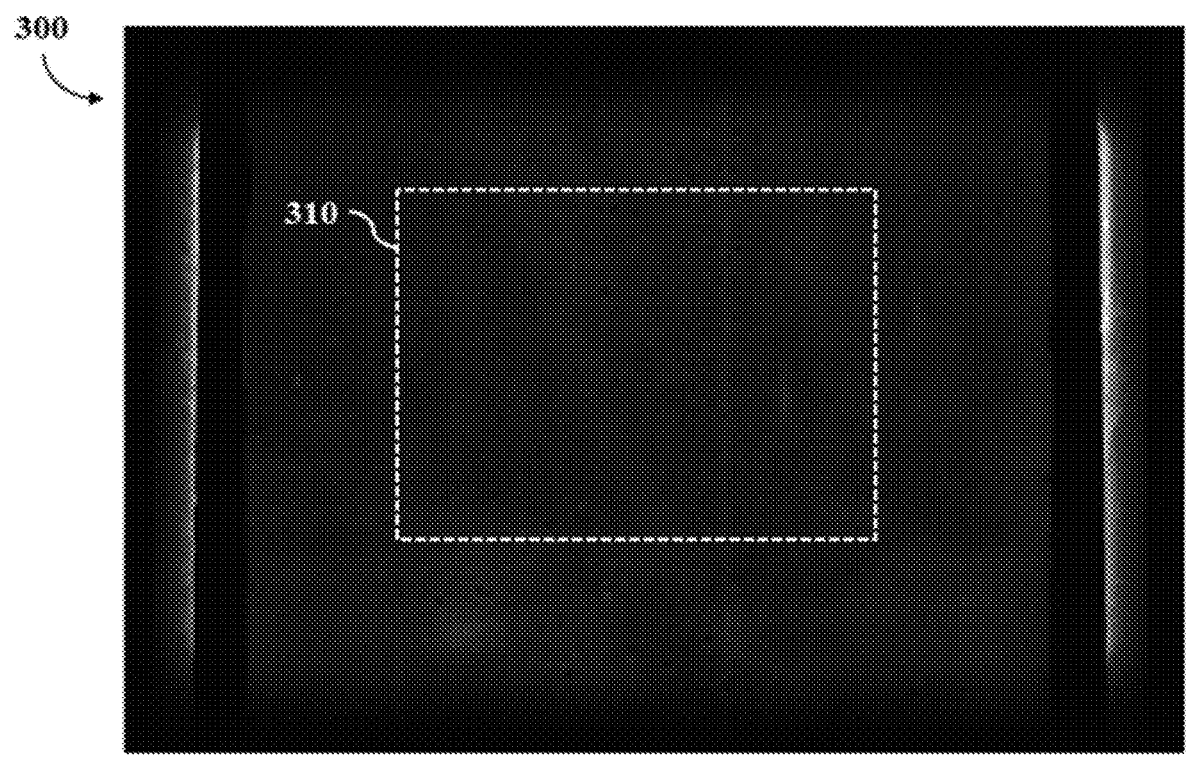
FIG. 3A shows an example image of a film of a viscous liquid.
Figure 3B:
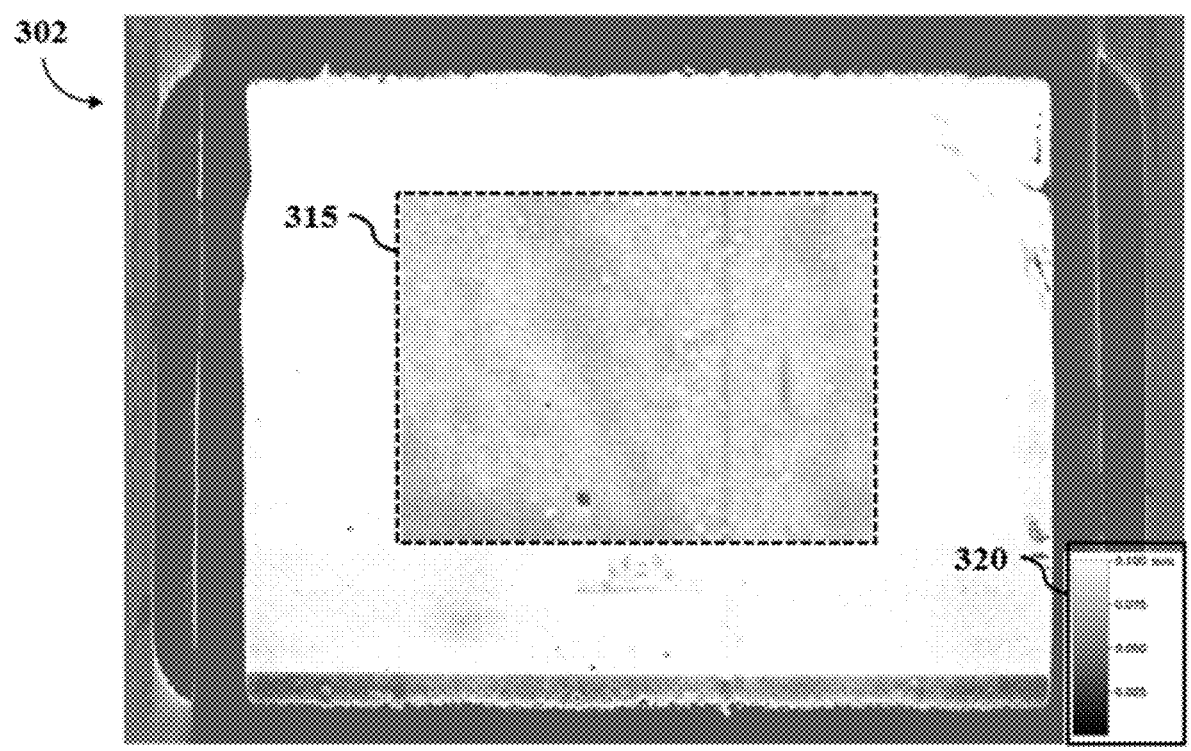
FIG. 3B shows a respective optical profile of the film of the viscous liquid.

FIG. 3A shows an example of a 2D image 300 of a film of viscous liquid deposited on the print window, as captured by the sensor(s). IR light may be used as the sensor light(s). FIG. 3B shows an example of a 2D thickness plot 302 of the film of viscous liquid deposited on the print window. The controller may be configured to use a reference (e.g., a previously obtained plot of film thickness versus sensor light(s) transmittance) to convert at least a portion 310 of the film in the 2D image 300 into a greyscale 2D thickness plot 315, as show in the image 302. At least the portion 310 of the film in the 2D image 300 may be divided by the background image 200 prior to converting into the greyscale 2D thickness plot 315. The image 302 may also exhibit greyscale values 320 (e.g., greyscale vs. thickness of the film) used for the greyscale 2D thickness plot 315. The threshold value of the standard deviation of the average film thickness may be pre-determined at 0.01 mm. The measured standard deviation of the 2D thickness plot 315 may be 0.0055 mm. As the measured standard deviation of the 2D thickness plot 315 may be at or below the pre-determined threshold value, the film shown in the 2D thickness plot 315 may be considered to exhibit a uniform film thickness.

Example 3

Figure 4A:
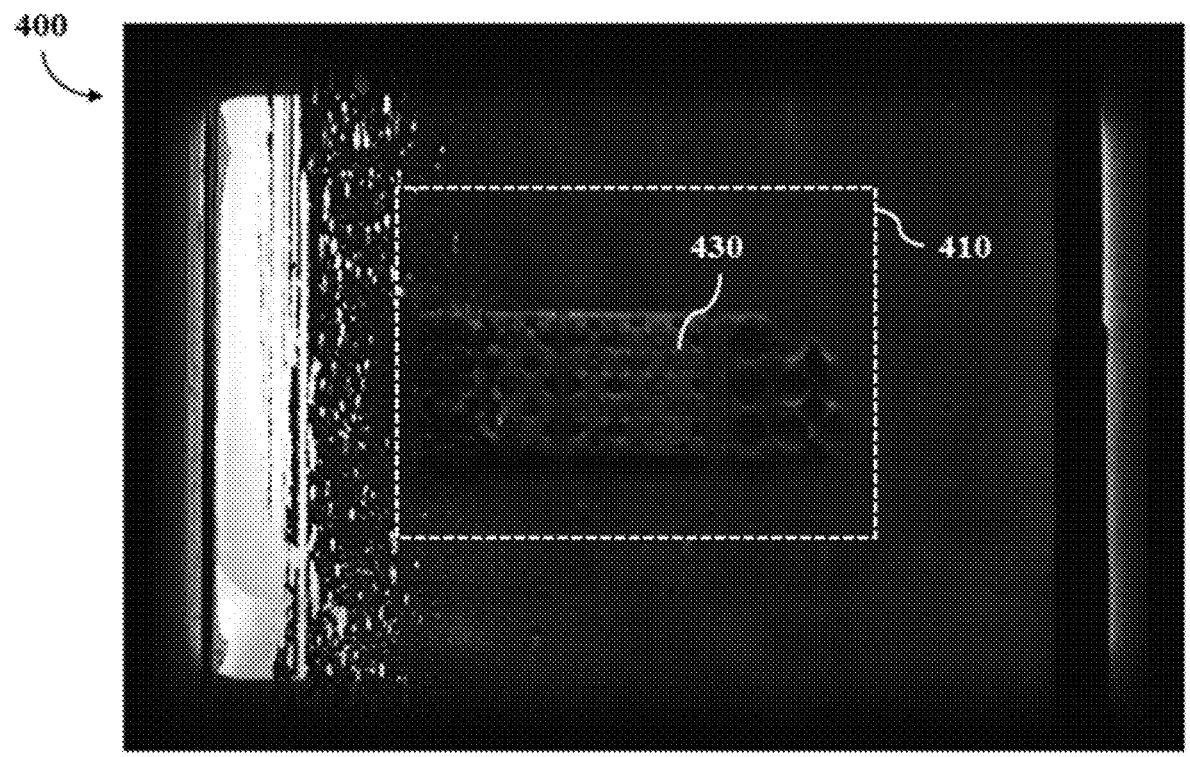
FIG. 4A shows a different example image of a film of a viscous liquid.
Figure 4B:
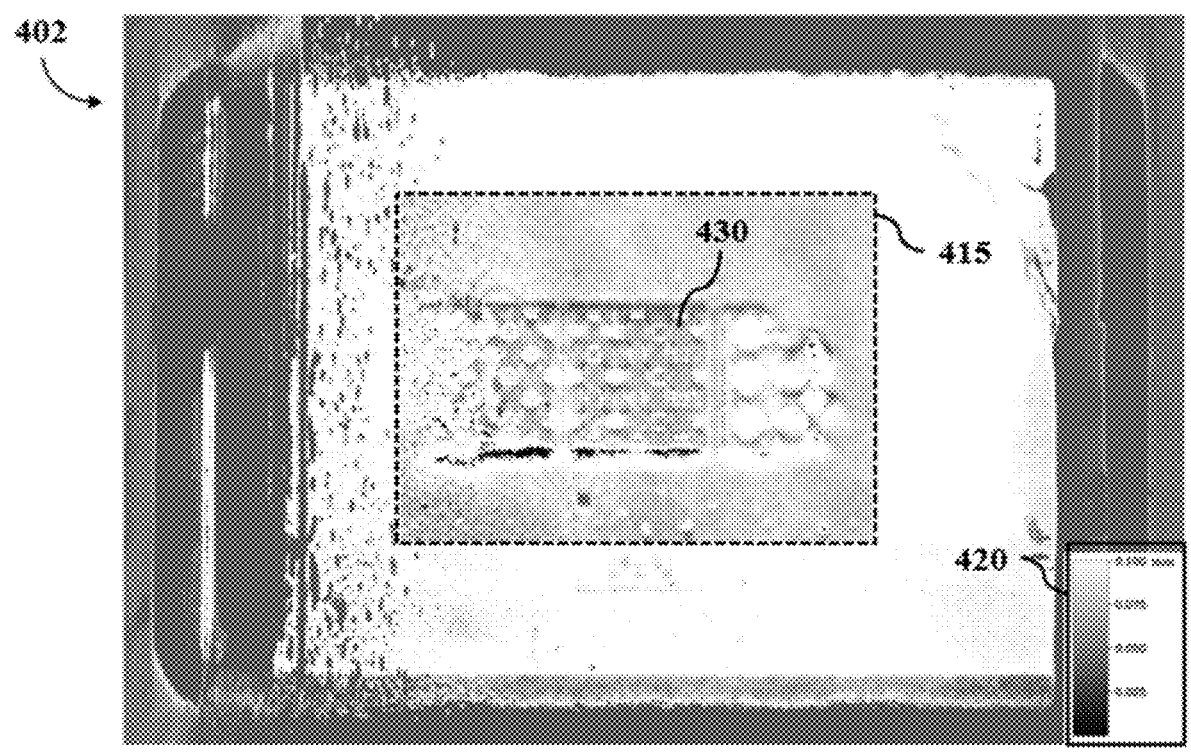
FIG. 4B shows a respective optical profile of the film of the viscous liquid.

FIG. 4A shows an example of a 2D image 400 of a film of viscous liquid deposited on the print window, as captured by the sensor(s). IR light may be used as the sensor light(s). FIG. 4B shows an example of a 2D thickness plot 402 of the film of viscous liquid deposited on the print window. The controller may be configured to use a reference (e.g., a previously obtained plot of film thickness versus sensor light(s) transmittance) to convert at least a portion 410 of the film in the 2D image 400 divided by the background image 200 into a greyscale 2D thickness plot 415, as show in the image 402. At least the portion 410 of the film in the 2D image 400 may be divided by the background image 200 prior to converting into the greyscale 2D thickness plot 415. The image 402 may also exhibit greyscale values 420 (e.g., greyscale vs. thickness of the film) used for the greyscale 2D thickness plot 415. The threshold value of the standard deviation of the average film thickness may be pre-determined at 0.01 mm. The measured standard deviation of the 2D thickness plot 415 may be 0.0185 mm. The measured standard deviation of the 3D thickness plot 415 (e.g., 0.0185 mm) may be higher than the pre-determined threshold value (e.g., 0.01 mm) in part due to one or more parts 430 of one or more previous layers remaining on the print window. As the measured standard deviation of the 2D thickness plot 415 may be above the pre-determined threshold value, the film shown in the 2D thickness plot 415 may be considered to exhibit a non-uniform film thickness. As a result, the 3D printing process may be halted. Alternatively or in addition to, a new film of viscous liquid may be deposited to obtain a uniform film thickness.

Example 4

Figure 5A:
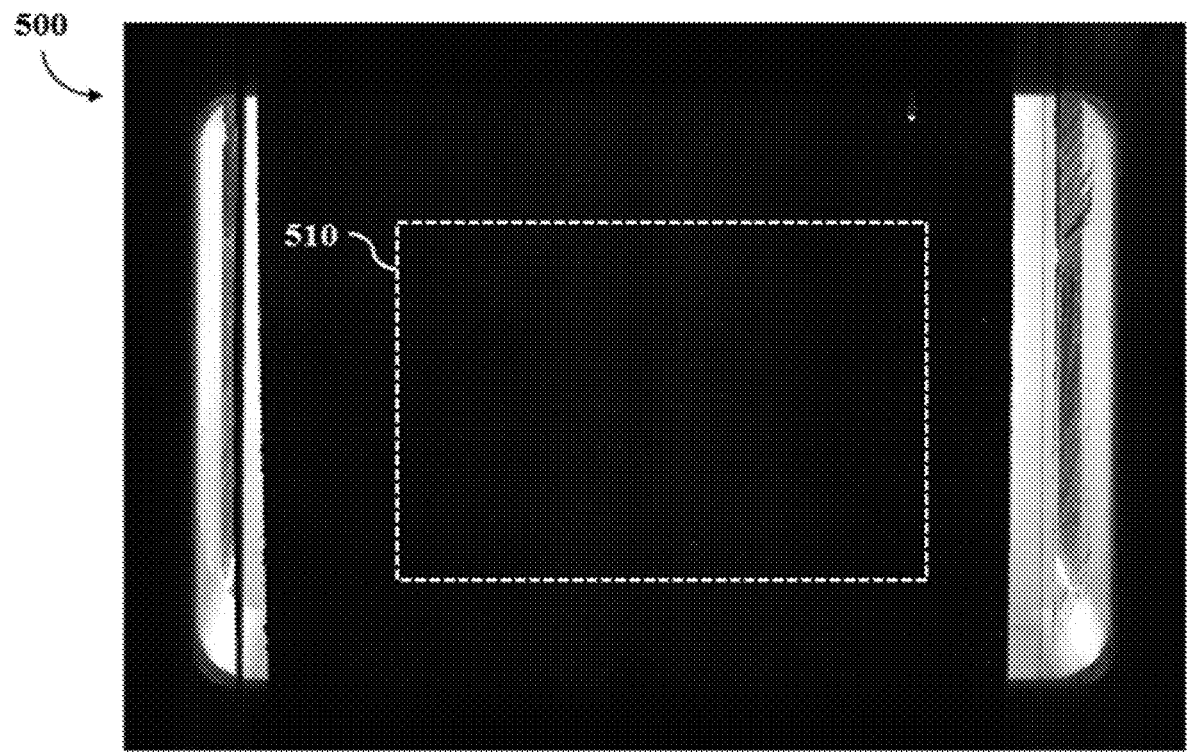
FIG. 5A shows an example image of a film of a viscous liquid prior to printing a layer of a 3D object.
Figure 5B:
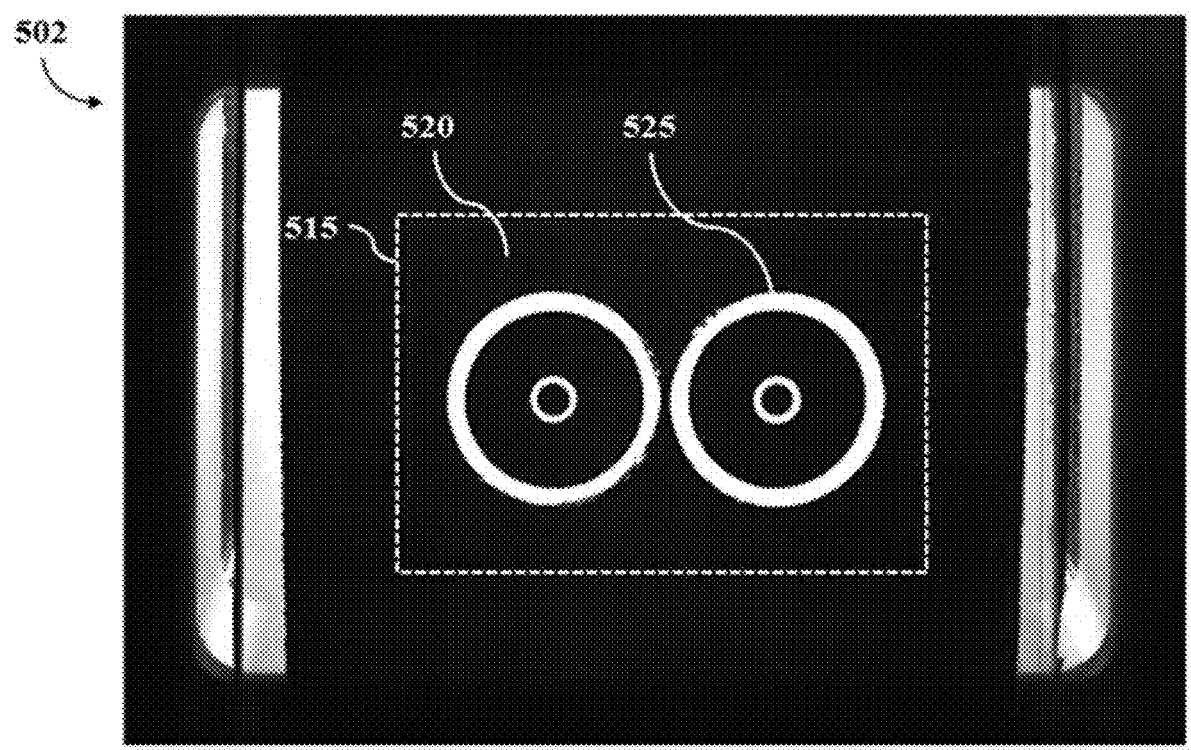
FIG. 5B shows an example image of a remainder of the film of the viscous liquid subsequent to printing the layer of the 3D object.

FIG. 5A shows an example of a 2D image 500, as captured by the sensor(s), of a film of viscous liquid deposited on the print window prior to printing at least a portion of the 3D object. IR light may be used as the sensor light(s). FIG. 5B shows an example of a 2D image 502, as captured by the sensor(s), of an excess of the film of viscous liquid remaining on the print window subsequent to printing the at least the portion of the 3D object. In the 2D image 502, areas of low transmittance 520 of the sensor light(s) may indicate a presence of excess viscous liquid on the print window. On the other hand, areas of high transmittance 525 of the sensor light(s) may indicate an absence or low amount of excess viscous liquid on the print window. Regions of high transmittance 525 of the sensor light(s) in the 3D image 502 may be usable as a negative image of the previously printed layer of the 3D object.

Example 5

Figure 6:
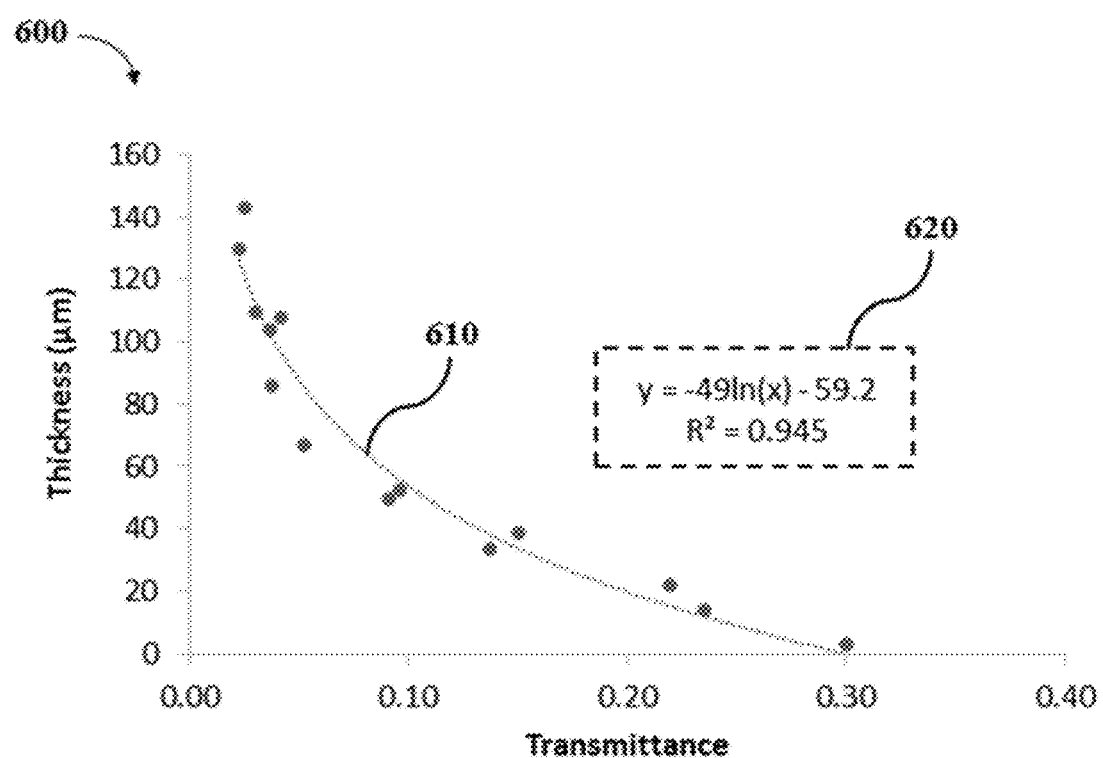
FIG. 6 shows an example plot of a thickness of a film of a viscous liquid and transmittance of sensor light through the film of the viscous liquid.

FIG. 6 shows an example plot 600 of a thickness of the film of viscous liquid (e.g., y-axis) versus transmittance of the sensor light(s) through the film (e.g., x-axis). Films with different thicknesses (e.g., verified thicknesses) may be printed on the print window, and the transmittance of the sensor light(s) through the films may be measured to obtain the curve 610 of the plot 600. Subsequently, a mathematical relationship 620 between the film thickness and the sensor light(s) transmittance as indicated by the curve 610 may be obtained to be used as a reference to convert any future detection of the sensor light(s) transmittance into a respective film thickness.

Example 6

Figure 7:
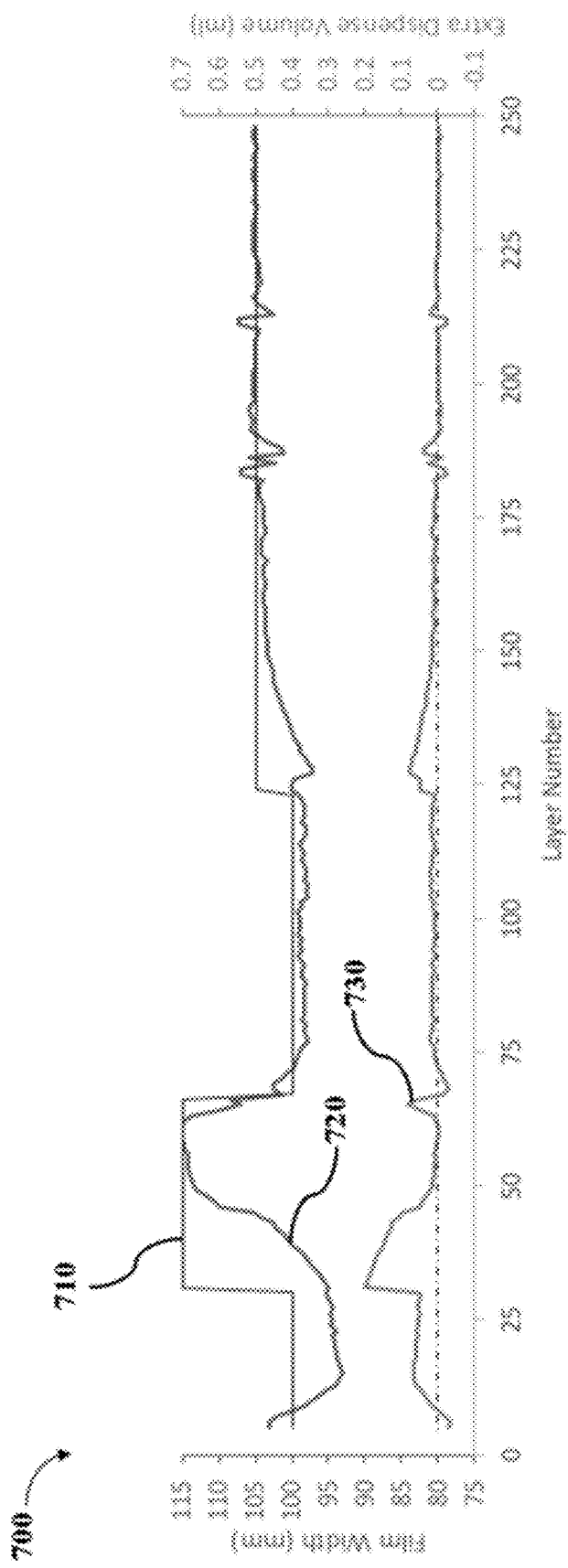
FIG. 7 shows an example of a closed loop control of a width of a plurality of films of a viscous liquid.

FIG. 7 shows an example plot 700 of (i) a target width 710 of the film of viscous liquid, a measured width 720 of the film of the viscous liquid (e.g., as measured by the IR sensor(s)), and a volume of the viscous liquid to be added to or removed from the print window 730 during depositing a plurality of films of the viscous liquid versus (ii) a number of printed layers of a 3D object. As shown by the target width 710, different widths of the film (e.g., thus different volumes of the viscous liquid in the film) may be required for different layers of the 3D object. In an example, according to the target width curve 710, at least the layers 30-60 of the 3D object may require more viscous liquid in the film (thus a wider film) than at least the layers 1-25 of the 3D object. As such, the controller may direct the deposition head to dispense additional viscous liquid onto the print window, thereby to print a wider film of viscous liquid for at least the layers 30-60 of the 3D object. The controller may use the sensor(s) to measure the width of the film 720 for at least the layers 30-60 in real time to adjust the volume of the viscous liquid to be added to or removed from the print window 730, thereby to match the target width 710 of the film of viscous liquid according to in part a computer model of the 3D object. A relationship between the target width 710 of the film, the measured width 720 of the film (e.g., as measured by the IR sensor(s)), and the volume of the viscous liquid to be added to or removed from the print window may be described in Equation 1:

$$\text{Vol. of viscous liquid}_{added\ or\ removed} = \kappa(\text{target width} \cdot \text{measured width}) \quad \text{(Equation 1)}$$

A constant factor (K) may be a pre-determined value at a pre-determined constant thickness (e.g., 0.01 milliliter (mL) of viscous liquid per 1 mm of film width). The factor may be universal for a plurality of different viscous liquids (e.g., different compositions) or specific for each type of viscous liquid. In general, an error function may be used to calculate the deviation of the measured width from the target width, and a control function of that deviation may provide a volume of viscous liquid to be added or removed. The control function may be proportional to that deviation, as provided in Equation 1. The control function may also depend on the integral of the deviation over time, and/or its derivative with respect to time. The control function may also use fuzzy logic or neural networks or artificial intelligence.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for printing a three-dimensional (3D) object, comprising:
   (a) providing, adjacent to a build surface, a film comprising a polymeric precursor;
   (b) using a sensor to determine a profile of said film, which profile (i) is indicative of a quality of said film and (ii) comprises a two-dimensional profile;
   (c) determining if said profile meets a quality threshold; and
   (d) subsequent to (c), (1) if said profile meets said quality threshold, using a light source to expose at least a portion of said film to light to initiate formation of a polymeric material from said polymeric precursor, thereby printing at least a portion of said 3D object, or (2) if said profile does not meet said quality threshold, adjusting or redepositing said film.

2. The method of claim 1, wherein (b) further comprises (i) exposing said film to an additional light and (ii) using said sensor to detect at least a portion of said additional light that is transmitted through said film.

3. The method of claim 2, wherein said light has a first wavelength and said additional light has a second wavelength, wherein said second wavelength is different than said first wavelength.

4. The method of claim 2, wherein said light and said additional light are provided by said light source.

5. The method of claim 2, wherein said light is provided by said light source and said additional light is provided by an additional light source.

6. The method of claim 2, further comprising using an optical diffuser, located adjacent to said build surface and away from said film, to diffuse said additional light.

7. The method of claim 1, further comprising, prior to (c), using said profile to identify a variation in said film with respect to a reference.

8. The method of claim 7, wherein said quality threshold is a threshold of said variation in said film with respect to said reference.

9. The method of claim 1, wherein said profile is an optical profile.

10. The method of claim 9, wherein said optical profile is a transmittance profile.

11. The method of claim 1, further comprising using said profile to determine a cross-sectional dimension of said film.

12. The method of claim 1, wherein, in (a), said film further comprises a plurality of particles, and wherein said profile is a density profile of said plurality of particles in said film.

13. The method of claim 12, wherein, in (a), said polymeric precursor encapsulates said plurality of particles.

14. The method of claim 12, wherein said plurality of particles comprises at least one metal particle, at least one ceramic particle, or a combination thereof.

15. The method of claim 1, wherein (d)(1) is performed with a build head in contact with said film, and wherein, subsequent to (d)(1), said build head is moved away from said build surface.

16. The method of claim 15, further comprising, subsequent to (d)(1), using said sensor to measure an additional profile of said film adjacent to said build surface.

17. The method of claim 16, wherein said additional profile is a negative profile of said at least said portion of said 3D object.

18. The method of claim 16, further comprising, subsequent to (d)(1), providing an additional film adjacent to said build surface and using said sensor to determine a profile of said additional film, which profile is indicative of a quality of said additional film.

19. The method of claim 1, wherein (a) further comprises providing a deposition head adjacent to said build surface and moving said deposition head across said build surface to deposit said film adjacent to said build surface.

20. The method of claim 1, wherein said build surface comprises a print window, and wherein said film is provided adjacent to said print window.

21. The method of claim 20, wherein, in (d)(1), said light is directed through said print window to said film to initiate formation of said polymeric material from said polymeric precursor.

22. The method of claim 21, wherein said film further comprises (i) a photoinitiator that initiates formation of said polymeric material from said polymeric precursor away from said print window, and (ii) a photoinhibitor that inhibits formation of said polymeric material from said polymeric precursor adjacent to said print window.

23. The method of claim 1, further comprising, prior to (a), receiving or generating a computer model of said 3D object, wherein said at least said portion of said 3D object is in accordance to said computer model of said 3D object.

24. The method of claim 1, wherein said build surface is part of a vat that retains said film.

25. The method of claim 1, wherein said build surface is part of an open platform that retains said film.

26. The method of claim 1, wherein redepositing said film comprises removing at least a portion of said film from said build surface and depositing an additional film adjacent to said build surface.

27. The method of claim 1, wherein adjusting said film comprises redistributing said film.

28. The method of claim 1, wherein said profile further comprises a thickness profile of said film.

* * * * *